United States Patent
Yamada et al.

(10) Patent No.: US 8,770,035 B2
(45) Date of Patent: Jul. 8, 2014

(54) SEMICONDUCTOR PRESSURE SENSOR, PRESSURE SENSOR APPARATUS, ELECTRONIC EQUIPMENT, AND METHOD OF MANUFACTURING SEMICONDUCTOR PRESSURE SENSOR

(75) Inventors: Nobuyuki Yamada, Kyoto (JP); Masahiro Sakuragi, Kyoto (JP); Takeshi Yoshida, Kyoto (JP); Kei Hayashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 204 days.

(21) Appl. No.: 13/386,712

(22) PCT Filed: Jul. 12, 2010

(86) PCT No.: PCT/JP2010/061764
§ 371 (c)(1),
(2), (4) Date: Jan. 24, 2012

(87) PCT Pub. No.: WO2011/010571
PCT Pub. Date: Jan. 27, 2011

(65) Prior Publication Data
US 2012/0118068 A1    May 17, 2012

(30) Foreign Application Priority Data

Jul. 24, 2009  (JP) ................................. 2009-173305
Jul. 24, 2009  (JP) ................................. 2009-173306
Sep. 10, 2009  (JP) ................................. 2009-209699

(51) Int. Cl.
*G01L 9/00*       (2006.01)
*H01L 29/84*   (2006.01)

(52) U.S. Cl.
USPC ............. 73/754; 257/415; 257/417; 29/592.1

(58) Field of Classification Search
None
See application file for complete search history.

(56) References Cited

U.S. PATENT DOCUMENTS 4,771,638 A * 9/1988 Sugiyama et al. .............. 73/721
4,975,390 A * 12/1990 Fujii et al. ....................... 438/53
(Continued)

FOREIGN PATENT DOCUMENTS

| JP | 60-029627 | 2/1985 |
| JP | 75637/1993 | 10/1993 |

(Continued)

OTHER PUBLICATIONS

Korean Patent Office communication in patent application No. 10-2012-7004745 (dated Mar. 20, 2014).

*Primary Examiner* — Andre Allen
(74) *Attorney, Agent, or Firm* — Fish & Richardson P.C.

(57) ABSTRACT

A semiconductor pressure sensor (720) includes a thin film piezoelectric element (701) which applies strain to a portion of a semiconductor substrate that corresponds to a thin region (402). The thin film piezoelectric element (701) is formed at a distance away from diffusion resistors (406, 408, 410, and 412) functioning as strain gauges and is extended to the proximity of a bonding pad (716A) connected to an upper electrode layer of the thin film piezoelectric element and a bonding pad (716F) connected to a lower electrode thereof. The diffusion resistors (406, 408, 410, and 412) constitute a bridge circuit by metal wiring (722) and diffusion wiring (724). During self-diagnosis, a prescribed voltage is applied to a thin film piezoelectric element (701). If the output difference of the bridge circuit between before and after the voltage application falls outside a prescribed range, it is determined that a breakage occurs in the semiconductor pressure sensor (720).

20 Claims, 39 Drawing Sheets

(56) References Cited

U.S. PATENT DOCUMENTS

| | | | |
|---|---|---|---|
| 4,993,266 A * | 2/1991 | Omura et al. | 73/720 |
| 5,142,912 A * | 9/1992 | Frische | 73/702 |
| 5,291,788 A * | 3/1994 | Oohata et al. | 73/727 |
| 5,622,901 A * | 4/1997 | Fukada | 438/50 |
| 6,056,888 A | 5/2000 | August | |
| 6,880,406 B2 * | 4/2005 | Yang | 73/754 |
| 7,571,651 B2 * | 8/2009 | Kim et al. | 73/756 |
| 2004/0237661 A1 * | 12/2004 | Yang | 73/754 |
| 2005/0230768 A1 | 10/2005 | Mei | |
| 2008/0061799 A1 * | 3/2008 | Kim et al. | 324/658 |
| 2009/0095072 A1 | 4/2009 | Shimizu et al. | |
| 2013/0126994 A1 * | 5/2013 | Hwang et al. | 257/419 |
| 2013/0264664 A1 * | 10/2013 | Nimura et al. | 257/417 |

FOREIGN PATENT DOCUMENTS

| | | |
|---|---|---|
| JP | 5-322927 | 12/1993 |
| JP | 06-234917 | 8/1994 |
| JP | 10-22509 | 1/1998 |
| JP | 2000-340805 | 12/2000 |
| JP | 2001-349797 | 12/2001 |
| JP | 2007/532909 | 11/2007 |
| JP | 2008-14690 | 1/2008 |
| JP | 2009-49026 | 3/2009 |
| WO | WO 2011124418 A1 * | 10/2011 |

* cited by examiner

SEMICONDUCTOR PRESSURE SENSOR, PRESSURE SENSOR APPARATUS, ELECTRONIC EQUIPMENT, AND METHOD OF MANUFACTURING SEMICONDUCTOR PRESSURE SENSOR

TECHNICAL FIELD

The present invention relates to a semiconductor pressure sensor converting a pressure into an electrical signal based on strain of a diaphragm deformable by pressure application, a pressure sensor apparatus including the semiconductor pressure sensor, electronic equipment including the pressure sensor apparatus, and a method of manufacturing a semiconductor pressure sensor.

BACKGROUND ART

Semiconductor pressure sensors have conventionally been used as compact devices for converting a pressure into an electrical signal in a wide variety of fields including internal combustion engines of automobiles, consumer equipment, measuring equipment, and medical equipment. In the field of consumer equipment, semiconductor pressure sensors are used, for example, in hard disk drives, water heaters, air conditioners, washing machines, dishwashers, and vacuum cleaners. In the field of measuring equipment, semiconductor pressure sensors are used, for example, in air pressure indicators, water pressure indicators, and oil pressure indicators. In the field of medical equipment, semiconductor pressure sensors are used, for example, in sphygmomanometers.

Semiconductor pressure sensors are produced using microfabrication technique for use in manufacturing semiconductor integrated circuits. A semiconductor pressure sensor generally includes a diaphragm formed by processing part of a silicon substrate in the form of a thin film.

Pressure applied to the diaphragm causes strain in the diaphragm. In order to detect strain in the diaphragm, a resistor element (for example, piezoelectric element) whose resistance value changes according to a pressure is arranged on a surface of a silicon substrate. The semiconductor pressure sensor detects the pressure based on the changing resistance values of the resistor element.

For example, Patent Literature 1 (Japanese Patent Laying-Open No. 2009-49026) discloses a semiconductor pressure sensor including four Schottky barrier diodes each functioning as a resistor element. The four Schottky barrier diodes constitute a Wheatstone bridge. The internal resistance of the Shottky barrier diode changes according to strain produced in a Schottky junction portion.

FIG. 47 is a diagram showing an example of a conventional semiconductor pressure sensor. Referring to FIG. 47, a semiconductor pressure sensor 100 has a diaphragm structure formed of a thin portion 102 and a thick portion 104. In FIG. 47, thin portion 102 is shown as a region surrounded by the broken line. Thick portion 104 is located around thin portion 102. Strain gauge resistors 106, 108, 110, and 112 are formed on one main surface of thin portion 102.

FIG. 48 is a XLVIII-XLVIII cross-sectional view of semiconductor pressure sensor 100 shown in FIG. 47. Referring to FIG. 48, a glass substrate 116 is provided on a bottom surface of thick portion 104.

In the structure above, a reference pressure chamber 114 surrounded by thick portion 104 at the outer circumference thereof is formed between thin portion 102 and glass substrate 116. When semiconductor pressure sensor 100 is used for measuring atm absolute, reference pressure chamber 114 is usually in a vacuum state.

Strain is produced in thin portion 102 in accordance with the atmospheric pressure surrounding semiconductor pressure sensor 100. In accordance with the strain, the resistance values of strain gauge resistors 106, 108, 110, and 112 change. Strain gauge resistors 106, 108, 110, and 112 constitute a bridge circuit with not-shown wiring.

FIG. 49 is a diagram showing a bridge circuit 150 configured with strain gauge resistors 106, 108, 110, and 112 shown in FIG. 47. Referring to FIG. 49, a prescribed voltage is applied between input terminals 122A and 122B. A voltage is produced between output terminals 120A and 120B in accordance with the strain of thin portion 102.

It is necessary to reduce the thickness of the thin portion in order to improve the sensitivity of the semiconductor pressure sensor having the structure as shown in FIG. 47 to FIG. 49. However, during production of a semiconductor pressure sensor or during use of a semiconductor pressure sensor, breakage sometimes occurs in the thin portion.

In general, it is difficult to visually confirm breakage of the thin portion. Therefore, in conventional reliability tests, for example, output of a semiconductor pressure sensor is checked while changing the atmospheric pressure in the sealed chamber including the pressure sensor.

However, the method above requires a large-scale device and a long test time for reliability tests. In addition, once a semiconductor pressure sensor is installed in the inside of electronic equipment, it is difficult to test the sensor.

Patent Literature 2 (Japanese Patent Application Laying-Open No. 60-29627 (Examined Patent Publication No. 4-26051) discloses a semiconductor pressure sensor capable of detecting breakage of a diaphragm. FIG. 50 is a diagram for explaining a semiconductor pressure sensor shown in FIG. 1 of Patent Literature 2. Referring to FIG. 50, a semiconductor pressure sensor 200 includes strain gauge resistors 202, 204, wiring 206, and a transistor 208. Strain gauge resistors 202, 204, wiring 206, and transistor 208 are arranged on one main surface of a diaphragm 201.

Wiring 206 is formed in the direction crossing both of cleavage directions A and B of diaphragm 201. When wiring 206 is disconnected due to breakage of diaphragm 201, the breakage of diaphragm 201 is sensed by transistor 208.

Patent Literature 3 (Japanese Patent Application Laying-Open No. 2001-349797) discloses a pressure sensor capable of detecting abnormality of a diaphragm. FIG. 51 is a diagram for explaining a semiconductor pressure sensor shown in FIG. 1 of Patent Literature 3. Referring to FIG. 51, a semiconductor pressure sensor 300 includes a diaphragm 302 including a thin portion 302A, detection portions 304A, 304B, and 304C, a strain applying member 306, a support member 308, and a base 310. Detection portions 304A, 304B, and 304C output electrical signals based on strain of thin portion 302A. Strain applying member 306 forcedly produces strain in thin portion 304A. Support member 308 supports strain applying member 306.

Strain applying member 306 is formed of PZT (lead zirconate titanate) or other piezoelectric element. With a voltage applied to strain applying member 306, strain applying member 306 expands. The expansion of strain applying member 306 pushes thin portion 302A downward. Pushing thin portion 302A downward forcedly produces strain in thin portion 302A.

CITATION LIST

Patent Literature

PTL 1: Japanese Patent Application Laying-Open No. 2009-49026

PTL 2: Japanese Patent Application Laying-Open No. 60-29627 (Japanese Examined Patent Publication No. 4-26051)

PTL 3: Japanese Patent Application Laying-Open No. 2001-349797

SUMMARY OF INVENTION

Technical Problem

Patent Literature 2 discloses a technical concept of sensing breakage of a diaphragm by arranging wiring along the direction crossing the cleavage directions of the diaphragm. However, the configuration disclosed in Patent Literature 2 cannot sense breakage of the diaphragm unless the wiring for sensing breakage is disconnected due to breakage of the diaphragm.

Furthermore, in the configuration disclosed in Patent Literature 2, a transistor is used for detecting breakage of the diaphragm. Therefore, current supply to the transistor is necessary to detect breakage of the diaphragm.

Patent Literature 3 discloses a technique of arranging a piezoelectric element on a surface of a thin portion of a semiconductor pressure sensor and forcedly producing strain in the thin portion using the piezoelectric element.

According to this technique, self-diagnosis of the semiconductor pressure sensor can be performed based on output of the semiconductor pressure sensor after application of voltage to the piezoelectric element.

However, the semiconductor pressure sensor shown in FIG. 1 of Patent Literature 3 has a configuration in which the piezoelectric element is fixed by the support member. Therefore, a complicated process is required to manufacture the semiconductor pressure sensor disclosed in Patent Literature 3. Patent Literature 3 suggests that a piezoelectric element is formed on one main surface of the diaphragm by a well-known IC production technique. However, Patent Literature 3 does not explicitly show a configuration that eliminates the support member for the piezoelectric element by forming the piezoelectric element as a thin film on one main surface of the semiconductor pressure sensor.

When a thin film piezoelectric element is arranged on a surface of the thin portion, consideration should be given to the arrangement of the thin film piezoelectric element. If a thin film piezoelectric element is simply arranged on the whole surface of the thin portion, unexpected strain is produced in the thin portion due to the difference in thermal expansion coefficient between the thin portion and the thin film piezoelectric element. Therefore, an error occurs in the output of the semiconductor pressure sensor.

Furthermore, for normal operation of the self-diagnostic function with the thin film piezoelectric element, consideration should also be given to the arrangement of the thin film piezoelectric element.

The position of the diaphragm and the position of the resistor element may be shifted from each other, depending on the processing accuracy in creating the diaphragm. The shift of the relative position between the diaphragm and the resistor element may cause variations in characteristics of a resistance bridge among pressure sensor apparatuses manufactured through the same process step. The characteristics of a resistance bridge include, for example, the relation between pressure applied to the diaphragm and output voltage of the resistance bridge.

In general, a pressure sensor apparatus is configured to be able to detect pressures over a wide range. For example, the atmospheric pressure changes in the vicinity of the standard atmosphere (about 101.3 [kPa]). When a semiconductor pressure sensor is used for detecting the atmospheric pressure, the sensitivity of the sensor is preferably high in the neighborhood of the standard atmosphere.

However, with the configurations of conventional pressure sensor apparatuses, the pressure sensor apparatuses have a wide detection range. Therefore, it is not easy to configure a pressure sensor apparatus such that the sensitivity of the pressure sensor apparatus is high only in the desired region, specifically, in a region close to the upper limit value of the detection range.

Solution to Problem

An object of the present invention is to provide a semiconductor pressure sensor capable of executing self-diagnosis with a thin film piezoelectric element arranged on a thin portion, and capable of reducing effects of the thin film piezoelectric element on the output.

Another object of the present invention is to prevent an increase of variations in characteristics of a resistance bridge as a result of a shift between a position of a diaphragm and a position of the resistance bridge.

Another object of the present invention is to allow enhancement of detection sensitivity of a semiconductor pressure sensor in a region in the vicinity of the upper limit value of a detection range of the semiconductor pressure sensor.

In this description, "self-diagnostic function" refers to a function of a semiconductor pressure sensor sensing its own structural defect.

In this description, "self-diagnostic reference voltage" refers to a difference of output voltage of the semiconductor pressure sensor when the semiconductor pressure sensor not having a defect such as breakage of the diaphragm carries out self-diagnosis.

In this description, "offset voltage" refers to output of the semiconductor pressure sensor in a state in which no strain is produced in the diaphragm.

In this description, "thin region" refers to a surface of a thin portion formed in a semiconductor substrate, and the thin portion. In this description, "thick region" refers to a surface of a thick portion formed in a semiconductor substrate, and the thick portion.

According to an aspect of the present invention, a semiconductor pressure sensor includes: a semiconductor substrate having a thin region and a thick region provided to surround the thin region; a strain gauge resistor formed on one main surface of the semiconductor substrate and having a resistance value changing according to strain of a portion of the semiconductor substrate that corresponds to the thin region; and at least one thin film piezoelectric element formed in a region at least including part of the thin region on the semiconductor substrate, and having a lower electrode layer, a piezoelectric layer, and an upper electrode layer. The at least one thin film piezoelectric element is formed in a region at a distance away from the strain gauge resistor.

With the configuration above, self-diagnosis of the semiconductor pressure sensor can be performed based on the outputs of the semiconductor pressure sensor before and after voltage application to the thin film piezoelectric element. Furthermore, deformation of the strain gauge resistor due to the difference in thermal expansion coefficient between the thin film piezoelectric element and the semiconductor substrate is reduced, thereby preventing an error in the output of the semiconductor pressure sensor, for example, the offset voltage.

Preferably, the at least one thin film piezoelectric element has an elongated shape having a longitudinal axis in a direction toward a central portion of the thin region.

With the configuration above, the entire thin region can uniformly be distorted by the thin film piezoelectric element of a small area, thereby increasing the accuracy of self-diagnosis.

In an embodiment of the present invention, the at least one thin film piezoelectric element may be provided to extend across a boundary between the thin region and the thick region to reach the thick region.

With the configuration above, part of the thin film piezoelectric element is fixed to the thick region which is physically strong, so that the amount of strain applied to the thin portion during self-diagnosis is stabilized. Accordingly, the accuracy of self-diagnosis can be increased, and metal wiring of the thin film piezoelectric element can be provided only on the thick region.

In an embodiment of the present invention, the at least one thin film piezoelectric element may be provided to further extend along an outer circumference of the thin region, in the thick region.

With the configuration above, part of the thin film piezoelectric element is strongly fixed to the thick region. Therefore, the amount of strain applied to the thin portion during self-diagnosis is stabilized, so that the accuracy of self-diagnosis can be increased.

In an embodiment of the present invention, the at least one thin film piezoelectric element may include a plurality of thin film piezoelectric elements formed on the semiconductor substrate.

With the configuration above, the entire thin portion can uniformly be distorted by applying the same voltage to the plurality of thin film piezoelectric elements formed at different positions on the semiconductor substrate.

In an embodiment of the present invention, the plurality of thin film piezoelectric elements may be coupled to each other on the thick region.

With the configuration above, it is only necessary to provide one wiring each for the upper electrode layers of the thin film piezoelectric elements and for the lower electrode layers of the thin film piezoelectric elements, thereby simplifying the configuration of the semiconductor pressure sensor.

In an embodiment of the present invention, the plurality of thin film piezoelectric elements may be extended to a central portion of the thin region and be coupled to each other at the central portion of the thin region.

In an embodiment of the present invention, the semiconductor pressure sensor may further include a plurality of bonding pads provided on the thick region, and the at least one thin film piezoelectric element may be provided to extend to the proximity of at least one bonding pad of the plurality of bonding pads.

With the configuration above, metal wiring of the thin film piezoelectric element can be shortened, so that the area available for metal wiring of the strain gauge resistors can be increased. Accordingly, the wiring length can be adjusted easily when a bridge circuit is configured by connecting a plurality of strain gauge resistors.

In an embodiment of the present invention, the plurality of bonding pads may be provided side by side on one side of the semiconductor substrate.

With the configuration above, the convenience in wire bonding can be improved.

In an embodiment of the present invention, the upper electrode layer and the lower electrode layer may be connected to a first bonding pad located at a first end and a second bonding pad located at a second end, respectively, of the plurality of bonding pads provided side by side on the one side of the semiconductor substrate.

In an embodiment of the present invention, the semiconductor pressure sensor may include four strain gauge resistors above. The thin region may be approximately quadrilateral, and the strain gauge resistors may be each formed in proximity to a midpoint of each side of the thin region.

With the configuration above, the resistance value of the strain gauge resistor can be varied widely, thereby improving the sensitivity of the semiconductor pressure sensor.

Preferably, the at least one thin film piezoelectric element may be formed on a diagonal line of the thin region.

In an embodiment of the present invention, the thin region may be approximately circular.

With the configuration above, the semiconductor substrate is distorted evenly on the circle, thereby increasing the flexibility of arrangement of strain gauge resistors.

Preferably, the strain gauge resistor is a diffusion resistor formed by diffusing an impurity in one main surface of the semiconductor substrate.

Preferably, a main component of the piezoelectric layer is PZT.

Preferably, the strain gauge resistor is connected to wiring on the thin region, and the wiring includes diffusion wiring.

Preferably, the thickness of the piezoelectric layer is 0.01 μm or more and 5 μm or less.

With the configuration above, the contact hole reaching the upper electrode layer of the thin film piezoelectric element and the contact hole reaching the lower electrode layer of the thin film piezoelectric element can be formed at the same time, thereby reducing the manufacturing time of the semiconductor pressure sensor.

Preferably, the semiconductor substrate is an SOI (Silicon on Insulator) substrate.

With the configuration above, the accuracy of thickness of the thin portion can be improved during production of the thin portion.

According to another aspect of the present invention, a method of manufacturing a semiconductor pressure sensor includes the steps of: preparing a semiconductor substrate having one main surface Si layer having a first conductivity type and the other main surface Si layer; forming a strain gauge resistor having a second conductivity type different from the first conductivity type, on the one main surface Si layer; forming diffusion wiring having the second conductivity type and having a higher impurity concentration than the strain gauge resistor, in a region adjacent to the strain gauge resistor in the one main surface Si layer; forming a first interlayer insulating film on the one main surface Si layer; forming a lower electrode layer on the first interlayer insulating film; forming a piezoelectric layer on the lower electrode layer; forming an upper electrode layer on the piezoelectric layer; forming a second interlayer insulating film on the first interlayer insulating film, the lower electrode layer, the piezoelectric layer, and the upper electrode layer; forming contact holes reaching the diffusion wiring, the lower electrode layer, and the upper electrode layer, in the second interlayer insulating film; forming metal wiring on the second interlayer insulating film and in the contact holes; and forming a reference pressure chamber in the other main surface Si layer.

In the manufacturing method above, the contact hole reaching the lower electrode layer and the contact hole reaching the upper electrode layer are formed at the same time.

According to another aspect of the present invention, a semiconductor pressure sensor includes a semiconductor substrate and at least one resistance bridge. The semiconductor substrate includes a diaphragm and a support portion for supporting an outer edge portion of the diaphragm. The at least one resistance bridge is arranged at a main surface of the semiconductor substrate. The at least one resistance bridge includes a plurality of resistor elements each having a resistance value changing according to a pressure applied to the diaphragm. The plurality of resistor elements are collectively arranged in a partial region in the main surface that includes part of a boundary between the diaphragm and the support portion.

Preferably, the plurality of resistor elements include a first resistor element and a second resistor element. The second resistor element is electrically connected to the first resistor element and is arranged in the region to be adjacent to the first resistor element.

Preferably, the first resistor element is formed in the region so as to extend along a direction parallel to the boundary. The second resistor element is formed in the region so as to extend along a direction crossing the boundary.

Preferably, the at least one resistance bridge is a plurality of resistance bridges electrically connected in parallel with each other.

According to another aspect of the present invention, a pressure sensor apparatus includes a semiconductor substrate and at least one resistance bridge. The semiconductor substrate includes a diaphragm and a support portion for supporting an outer edge portion of the diaphragm. The at least one resistance bridge is arranged at a main surface of the semiconductor substrate. The at least one resistance bridge includes a plurality of resistor elements each having a resistance value changing according to a pressure applied to the diaphragm. The plurality of resistor elements are collectively arranged in a partial region in the main surface that includes part of a boundary between the diaphragm and the support portion. The pressure sensor apparatus further includes a signal processing circuit for outputting a signal indicating the pressure based on the resistance value of each of the plurality of resistor elements.

According to another aspect of the present invention, electronic equipment includes a semiconductor substrate and at least one resistance bridge. The semiconductor substrate includes a diaphragm and a support portion for supporting an outer edge portion of the diaphragm. The at least one resistance bridge is arranged at a main surface of the semiconductor substrate. The at least one resistance bridge includes a plurality of resistor elements each having a resistance value changing according to a pressure applied to the diaphragm. The plurality of resistor elements are collectively arranged in a partial region in the main surface that includes part of a boundary between the diaphragm and the support portion. The electronic equipment further includes a signal processing circuit for outputting a signal indicating the pressure based on the resistance value of each of the plurality of resistor elements, and a main unit for executing prescribed processing based on the signal from the signal processing circuit.

According to another aspect of the present invention, a pressure sensor apparatus includes a sensor configured to change a signal voltage based on a pressure, and a signal processing circuit for processing a signal output from the sensor. The signal processing circuit includes an amplification circuit for amplifying the signal voltage, and an operation circuit for generating a detection voltage changing in accordance with the pressure, based on an output voltage of the amplification circuit. The operation circuit is configured to generate the detection voltage by subtracting a voltage having a prescribed correlation with the output voltage of the amplification circuit from a prescribed offset voltage.

Preferably, the signal processing circuit further includes a second operation circuit for generating a second voltage changing in accordance with the pressure, based on the first voltage. A first rate of change of the first voltage with respect to the pressure is different from a second rate of change of the second voltage with respect to the pressure. The first voltage corresponds to the second voltage, at an upper limit value in a range of the pressure detected by the pressure sensor.

Preferably, an absolute value of the second rate of change is greater than an absolute value of the first rate of change.

Preferably, the second operation circuit generates the second voltage by amplifying the first voltage.

Preferably, the signal processing circuit further includes a first terminal for outputting the first voltage to the outside of the signal processing circuit, and a second terminal for outputting the second voltage to the outside of the signal processing circuit.

Preferably, the range of pressure is determined so as to include a standard value of atmospheric pressure and such that the upper limit value is a value in the neighborhood of the standard value.

According to another aspect of the present invention, electronic equipment includes a sensor configured to change a signal voltage based on a pressure, and a signal processing circuit for processing a signal output from the sensor. The signal processing circuit includes an amplification circuit for amplifying the signal voltage, and an operation circuit for generating a detection voltage changing in accordance with the pressure, based on an output voltage of the amplification circuit. The operation circuit is configured to generate the detection voltage by subtracting a voltage having a prescribed correlation with the output voltage of the amplification circuit from a prescribed offset voltage. The electronic equipment further includes a main unit for executing prescribed processing based on the detection voltage.

Advantageous Effects of Invention

According to the present invention, self-diagnosis of the semiconductor pressure sensor can be performed by applying voltage to the thin film piezoelectric element formed on the thin region. Since the thin film piezoelectric element is formed in a region at a distance away from the strain gauge resistor, it is possible to minimize deformation of the strain gauge resistor due to the difference in thermal expansion coefficient between the thin film piezoelectric element and the semiconductor substrate. Therefore, an error in output of the semiconductor pressure sensor can be prevented.

According to the present invention, the thin film piezoelectric element is formed to extend to a prescribed position on the thick region. Accordingly, part of the thin film piezoelectric element can be fixed to the thick region, and in addition, the metal wiring of the thin film piezoelectric element can be shortened. This increases the accuracy of self-diagnosis and increases the area available for the metal wiring of the strain gauge resistor.

According to the present invention, it is possible to prevent an increase of variations in characteristics of a resistance bridge as a result of a shift between the position of the diaphragm and the position of the resistance bridge.

According to the present invention, it is possible to enhance the detection sensitivity of the pressure sensor apparatus in a region in the vicinity of the upper limit value of the detection range.

DESCRIPTION OF EMBODIMENTS

Figure 1:
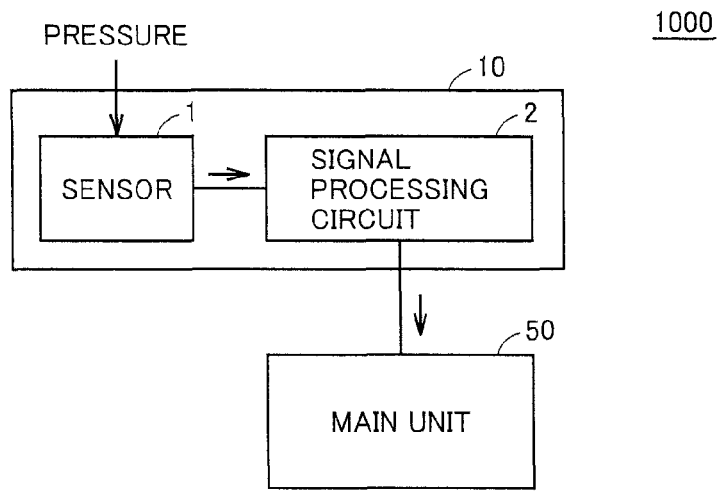
FIG. 1 is a block diagram conceptually showing a configuration of electronic equipment including a pressure sensor apparatus according to an embodiment of the present invention.

In the following, embodiments of the present invention will be described in detail with reference to the drawings. It is noted that in the figures the same or corresponding parts are denoted with the same reference numerals and a description thereof will not be repeated.

FIG. 1 is a block diagram conceptually showing a configuration of electronic equipment including a pressure sensor apparatus according to an embodiment of the present invention. Referring to FIG. 1, electronic equipment 1000 according to an embodiment of the present invention includes a pressure sensor apparatus 10 and a main unit 50. Pressure sensor apparatus 10 includes a semiconductor pressure sensor (hereinafter also simply referred to as "sensor") 1 and a signal processing circuit 2. In one embodiment, pressure sensor apparatus 10 is used for detecting atmospheric pressure. However, the usage of pressure sensor apparatus 10 is not limited to detection of atmospheric pressure.

Semiconductor pressure sensor 1 detects a pressure (for example, atmospheric pressure) applied to semiconductor pressure sensor 1 and sends a signal voltage indicative of the detection result to signal processing circuit 2. Semiconductor pressure sensor 1 changes the signal voltage according to the pressure applied to semiconductor pressure sensor 1.

Signal processing circuit 2 generates a detection voltage (signal) indicating the pressure applied to semiconductor pressure sensor 1, based on the signal voltage from semiconductor pressure sensor 1. Signal processing circuit 2 outputs the detection voltage to main unit 50. Main unit 50 executes prescribed processing based on the detection voltage output from signal processing circuit 2 (that is, the detection voltage output from pressure sensor apparatus 10).

The kind of electronic equipment 1000 according to the embodiment of the present invention is not specifically limited. For example, electronic equipment 1000 is a hard disk. In the case of a hard disk, the distance between the magnetic disk and the head may fluctuate with the atmospheric pressure in the surroundings of the hard disk. For example, main unit 50 includes a magnetic disk, a head, and a mechanism for adjusting the distance between the magnetic disk and the head. Main unit 50 adjusts the distance between the magnetic disk and the head such that the distance between the magnetic disk and the head is kept constant, based on the detection voltage from pressure sensor apparatus 10.

As another example, electronic equipment 1000 is a car navigation system. The atmospheric pressure surrounding a vehicle changes with the altitude of the vehicle. Main unit 50 calculates the present altitude of the vehicle, based on the detection voltage from pressure sensor apparatus 10. Accordingly, the system can obtain information on the altitude of the vehicle.

Figure 2:
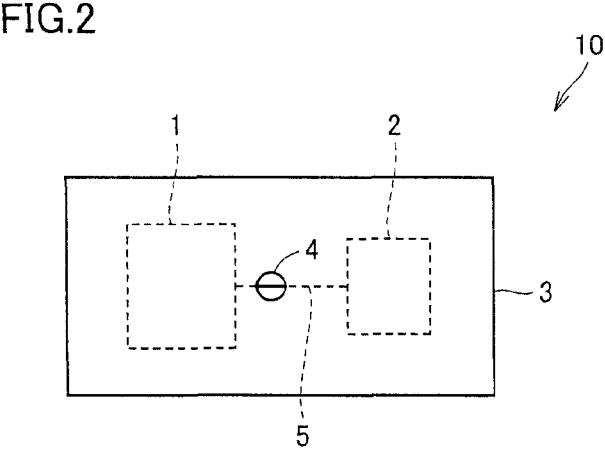
FIG. 2 is a top view of a pressure sensor apparatus 10 shown in FIG. 1.
Figure 3:
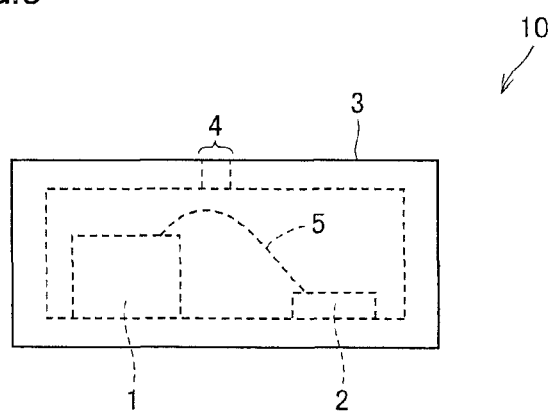
FIG. 3 is a side view of pressure sensor apparatus 10 shown in FIG. 1.

FIG. 2 is a top view of pressure sensor apparatus 10 shown in FIG. 1. FIG. 3 is a side view of pressure sensor apparatus 10 shown in FIG. 1. Referring to FIG. 2 and FIG. 3, semiconductor pressure sensor 1 and signal processing circuit 2 are accommodated in the inside of a package 3. Semiconductor pressure sensor 1 and signal processing circuit 2 are electrically connected with each other by wiring 5. An opening portion 4 is formed in package 3 to introduce the air from the outside of package 3 to the inside of package 3.

Figure 4:
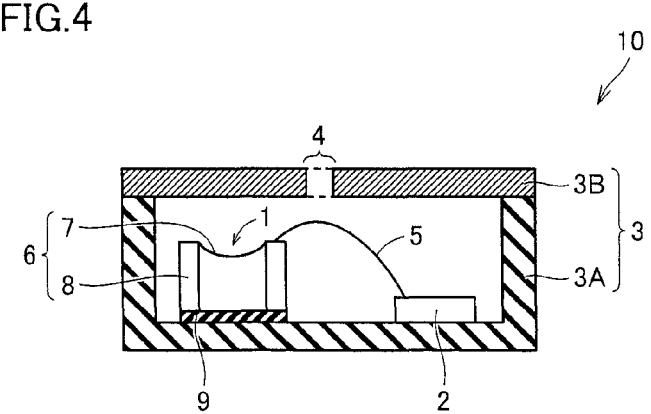
FIG. 4 is a cross-sectional view showing the interior of pressure sensor apparatus 10 shown in FIG. 2 and FIG. 3.

FIG. 4 is a cross-sectional view showing the interior of pressure sensor apparatus 10 shown in FIG. 2 and FIG. 3. Referring to FIG. 4, package 3 includes a container 3A and a cover 3B for closing container 3A. Container 3A is formed, for example, of ceramic. Cover 3B is formed, for example, of metal. Opening portion 4 (through hole) is formed in cover 3B.

Semiconductor pressure sensor 1 includes a silicon substrate 6 in which a diaphragm 7 and a support portion 8 supporting an outer edge of diaphragm 7 are integrally formed. Diaphragm 7 is formed by processing part of silicon substrate 6 in the form of a thin film. For example, a back surface of silicon substrate 6 is etched through a prescribed etching mask to form diaphragm 7 and support portion 8.

Silicon substrate 6 is installed on a base 9. An opening formed at the back surface of silicon substrate 6 is closed by base 9. Therefore, a pressure chamber with a pressure kept constant is formed in the inside of silicon substrate 6. In the present embodiment, the inside of the pressure chamber is almost a vacuum (0 [Pa]). The internal pressure of the pressure chamber is also referred to as "reference pressure" hereinafter.

Signal processing circuit 2 is, for example, a semiconductor integrated circuit formed on a silicon chip. The configuration of the signal processing circuit will be described in detail later. A resistor element (now shown) is formed on a main surface of silicon substrate 6 having diaphragm 7. This resistor element and signal processing circuit 2 are connected by wiring 5. Wiring 5 is, for example, wire made of gold.

In order to enhance moisture resistance of the semiconductor chip having signal processing circuit 2, for example, the silicon chip may be encapsulated in resin. Similarly, in teams of moisture resistance, the space inside package 3 may be filled with a material less permeable to moisture (for example, gel). Here, the gel is requested to be deformable such that the atmospheric pressure surrounding pressure sensor apparatus 10 applies a pressure to diaphragm 7.

Next, embodiments of semiconductor pressure sensor 1 shown in FIG. 1 to FIG. 3 will be described. In the configuration of the semiconductor pressure sensor according to each embodiment, a thin region corresponds to diaphragm 7 shown in FIG. 4 and a thick region corresponds to support portion 8 shown in FIG. 4.

First Embodiment

Figure 5:
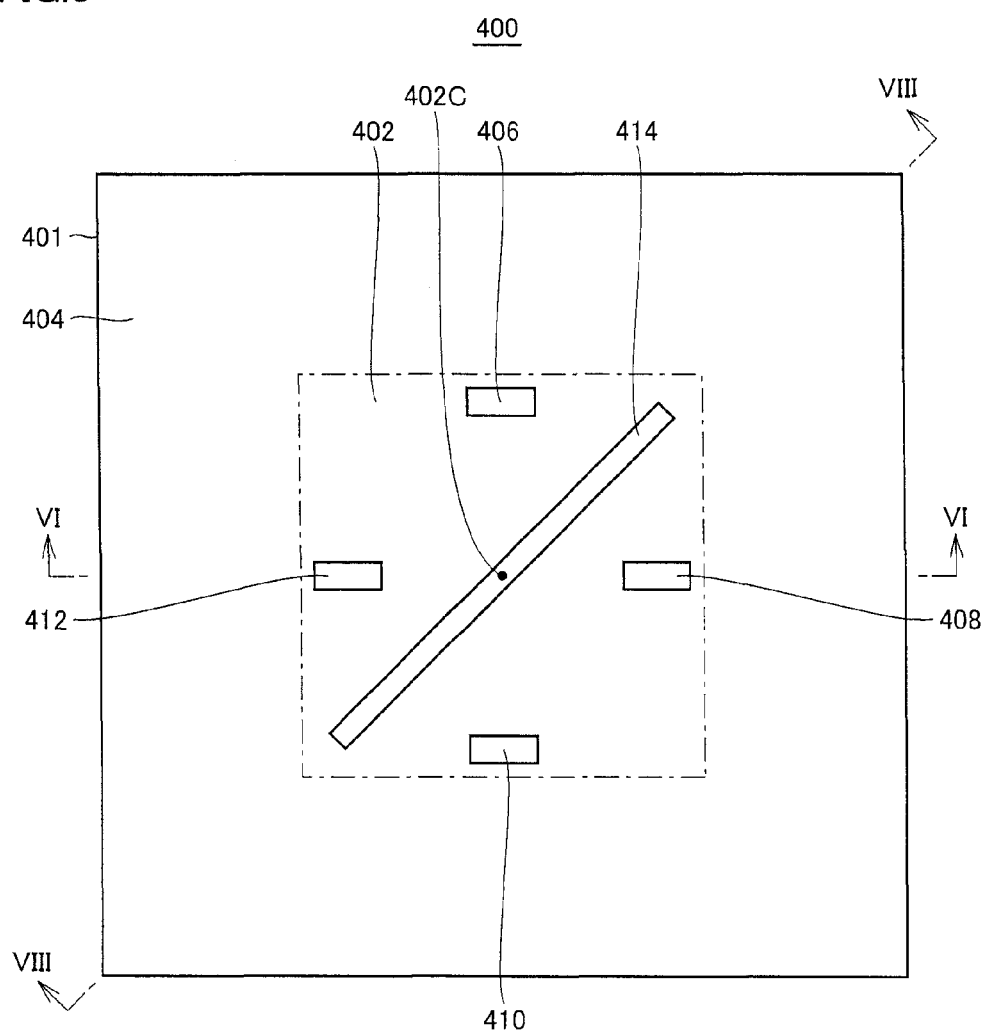
FIG. 5 is a top view of a semiconductor pressure sensor 400 according to a first embodiment of the present invention.

FIG. 5 is a top view of a semiconductor pressure sensor 400 according to a first embodiment of the present invention. Referring to FIG. 5, semiconductor pressure sensor 400 has a semiconductor substrate 401. Semiconductor substrate 401 has a thin region 402 and a thick region 404. Thin region 402 is provided approximately at the middle of a main surface of semiconductor substrate 401. Thick region 404 is provided to surround thin region 402. Semiconductor substrate 401 has a diaphragm structure formed of a thin portion and a thick portion.

Diffusion resistors 406, 408, 410, and 412 are formed on one main surface of the thin portion. Diffusion resistors 406, 408, 410, and 412 are formed by impurity diffusion in one main surface of the thin portion. Diffusion resistors 406, 408, 410 and 412 are strain gauge resistors sensing strain of the thin portion. Diffusion resistors 406, 408, 410, and 412 constitute a bridge circuit by not-shown wiring.

A thin film piezoelectric element 414 is arranged on thin region 402 so as not to lie on diffusion resistors 406, 408, 410, and 412. Thin film piezoelectric element 414 is used for self-diagnosis of semiconductor pressure sensor 400. A method of self-diagnosis will be described later.

Semiconductor substrate 401 and thin film piezoelectric element 414 have different thermal expansion coefficients. Therefore, when a temperature change occurs in semiconductor pressure sensor 400, unexpected strain may be caused in the vicinity of the contact surface of semiconductor substrate 401 with thin film piezoelectric element 414.

Usually, when thin film piezoelectric element 414 is formed in semiconductor pressure sensor 400, a piezoelectric material is burned at high temperatures of 500° C. to 800° C., and semiconductor pressure sensor 400 is thereafter cooled down to the room temperature. Therefore, the above-noted strain is already generated in the manufacturing process of semiconductor pressure sensor 400.

In order to prevent this strain from affecting the resistance values of diffusion resistors 406, 408, 410, and 412, thin film piezoelectric element 414 is arranged at the largest possible distance from diffusion resistors 406, 408, 410, and 412.

Furthermore, in order to uniformly distort the entire thin region 402 during self-diagnosis, thin film piezoelectric element 414 desirably has an elongated shape having a longitudinal axis in a direction toward a center 402C of thin region 402. The deformation direction of thin film piezoelectric element 414 and the distortion manner of thin region 402 during self-diagnosis will be described later.

Figure 6:
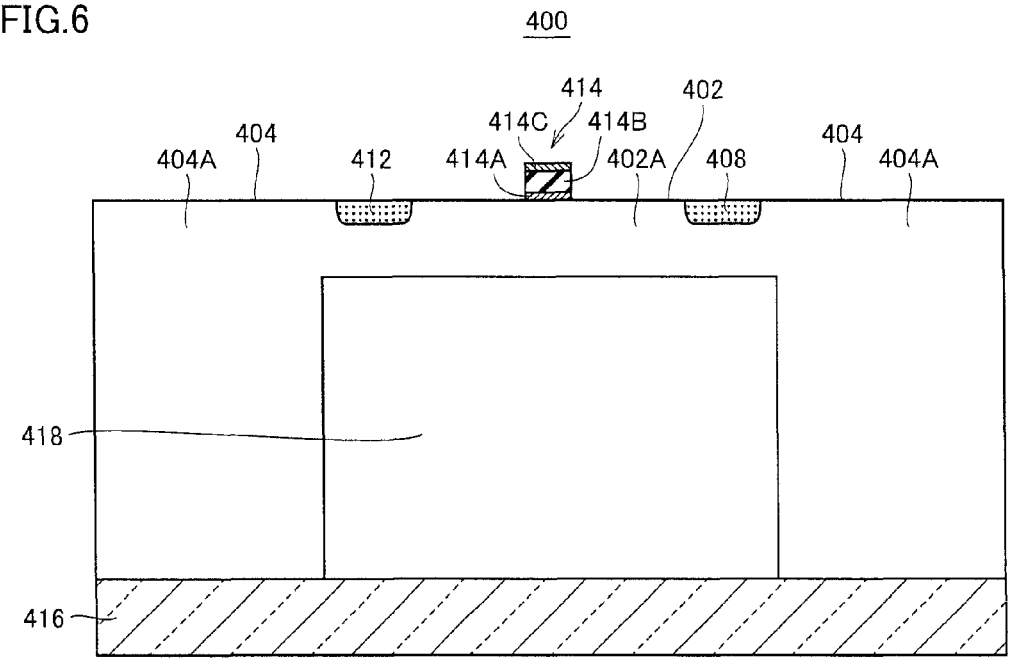
FIG. 6 is a VI-VI cross-sectional view of semiconductor pressure sensor 400 shown in FIG. 5.

FIG. 6 is a VI-VI cross-sectional view of semiconductor pressure sensor 400 shown in FIG. 5. Referring to FIG. 6, a glass substrate 416 serving as a base is securely attached to a bottom portion of thick portion 404A. A reference pressure chamber 418 is formed between thin portion 402A and glass substrate 416.

Thin portion 402A is strained with a pressure difference between the internal pressure of reference pressure chamber 418 and the external atmospheric pressure. Therefore, when semiconductor pressure sensor 400 is used for measuring absolute pressure, reference pressure chamber 418 is usually set in a vacuum state. The semiconductor pressure sensor according to the present invention is applicable to both an absolute pressure measurement-type pressure sensor and a relative pressure measurement-type pressure sensor, in all the embodiments below.

Thin film piezoelectric element 414 has a lower electrode layer 414A, a piezoelectric layer 414B, and an upper electrode layer 414C. Piezoelectric layer 414B is formed, for example, of a piezoelectric material such as PZT. With a voltage applied between lower electrode layer 414A and upper electrode layer 414C, piezoelectric layer 414B expands or shrinks as a whole. In the embodiment of the present invention, self-diagnosis is performed by shrinking piezoelectric layer 414B in a direction parallel to thin region 402 thereby intentionally producing strain in thin region 402. A method of self-diagnosis will be described later.

Figure 7:
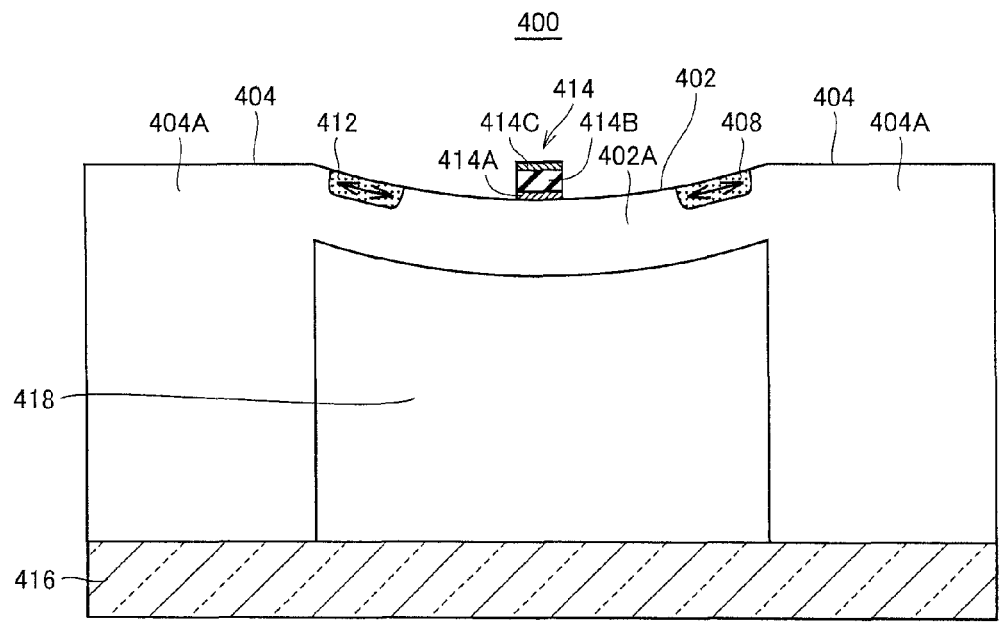
FIG. 7 is a diagram schematically showing a state of semiconductor pressure sensor 400 shown in FIG. 5, in which strain is produced in a thin region 402 due to a pressure difference between the internal pressure of a reference pressure chamber 418 and the external atmospheric pressure.

FIG. 7 is a diagram schematically showing a state of semiconductor pressure sensor 400 shown in FIG. 5, in which strain is produced in thin region 402 due to a pressure difference between the internal pressure of reference pressure chamber 418 and the external atmospheric pressure.

Referring to FIG. 7, strain is produced in thin portion 402A due to a pressure difference between the external atmospheric pressure and the internal pressure of reference pressure chamber 418. Diffusion resistors 408 and 412 have the longitudinal axis in the direction toward center 402C of thin region 402. As shown in FIG. 7, when strain is produced in thin portion 402A, each of diffusion resistors 408 and 412 becomes longer. Therefore, the resistance values of diffusion resistors 408 and 412 increase.

On the other hand, diffusion resistors 406 and 410 shown in FIG. 5 are different from diffusion resistors 408 and 412 in that they have the longitudinal axis vertical to the direction toward center 402C of thin region 402. When strain is produced in thin portion 402A, the widths of diffusion resistors 406 and 410 increase. Therefore, the resistance values of diffusion resistors 406 and 410 decrease.

Semiconductor pressure sensor 400 can measure the external atmospheric pressure based on the changing resistance values of diffusion resistors 406, 408, 410, and 412. For example, diffusion resistors 406, 408, 410, and 412 may be bridge-connected. An example of connection of diffusion resistors 406, 408, 410, and 412 will be described later.

Next, the self-diagnostic function of semiconductor pressure sensor 400 with thin film piezoelectric element 414 will be described.

Figure 8:
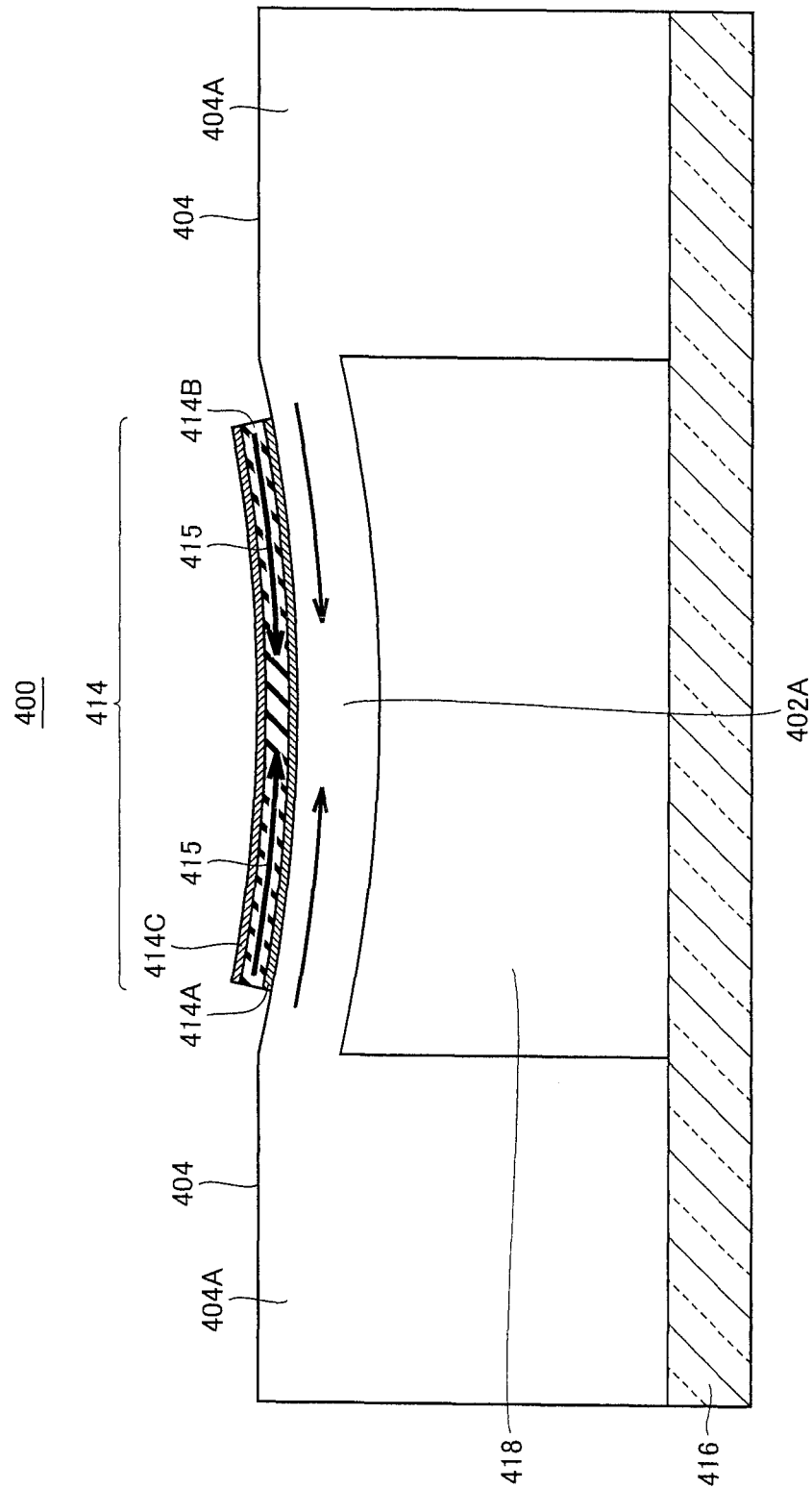
FIG. 8 is a cross-sectional view schematically showing a VIII-VIII cross section of semiconductor pressure sensor 400 shown in FIG. 5.

FIG. 8 is a cross-sectional view schematically showing a VIII-VIII cross section of semiconductor pressure sensor 400 shown in FIG. 5. FIG. 8 shows a cross section of semiconductor pressure sensor 400 in a state in which voltage is applied to thin film piezoelectric element 414.

Referring to FIG. 8, when voltage is applied between lower electrode layer 414A and upper electrode layer 414C, piezoelectric layer 414B shrinks in the direction along arrow 415. When piezoelectric layer 414B shrinks, one main surface (the side facing piezoelectric layer 414B) of thin portion 402A shrinks at the same time. However, the other main surface (the surface on the side facing glass substrate 416) of thin portion 402A is not subject to constraint of piezoelectric layer 414B. This makes a difference between the area of one main surface of thin portion 402A and the area of the other main surface of thin portion 402A. Therefore, as shown in FIG. 8, thin portion 402A is strained so as to be depressed as a whole toward glass substrate 416. In other words, with voltage applied to thin film piezoelectric element 414, semiconductor pressure sensor 400 can artificially create a state in which a pressure difference is generated between the internal pressure of reference pressure chamber 418 and the external atmospheric pressure.

In order to uniformly distort the entire thin portion 402A, thin film piezoelectric element 414 desirably has an elongated shape having the longitudinal axis in the direction toward center 402C of thin region 402. If thin film piezoelectric element 414 is arranged at a distance away from diffusion resistors 406, 408, 410, and 412 shown in FIG. 1, the shape of thin film piezoelectric element 414 may be approximately rectangular or approximately oval. This is applicable to other embodiments in this description.

During self-diagnosis of semiconductor pressure sensor 400, if the difference of sensor output between before and after voltage application to thin film piezoelectric element 414 falls within a prescribed range from a diagnostic reference voltage, it is determined that semiconductor pressure sensor 400 is not broken. The diagnostic reference voltage can be set based on sensor outputs before and after voltage application to the thin film piezoelectric element in a semiconductor pressure sensor that is previously known not to be broken. Although the sensor output difference between before and after voltage application to thin film piezoelectric element 414 is employed as a diagnostic reference voltage in this embodiment, the sensor output after voltage application may be employed as a diagnostic reference voltage. This is applicable to other embodiments in this description.

Figure 9:
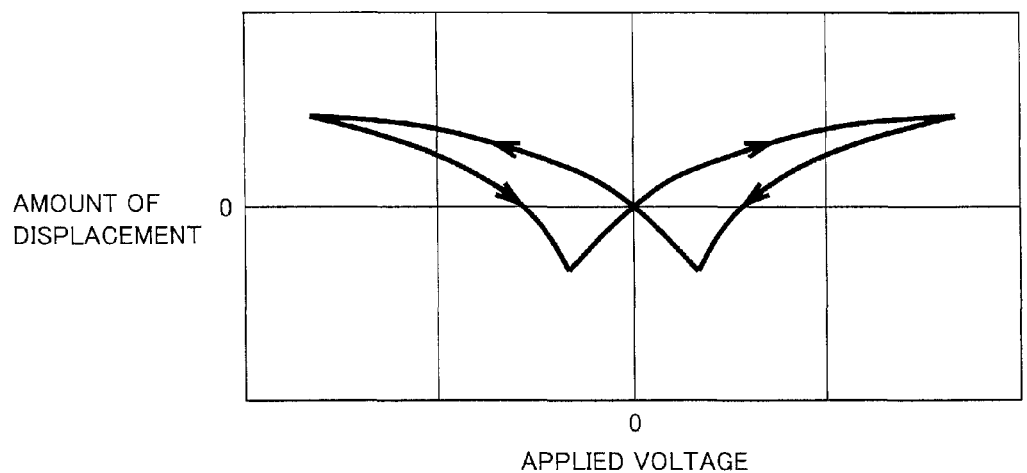
FIG. 9 is a diagram showing that an exemplary amount of displacement at the center of thin region 402 is plotted with voltage applied to a thin film piezoelectric element 414 being varied.

FIG. 9 is a diagram showing that an exemplary amount of displacement at the center of thin region 402 is plotted with voltage applied to thin film piezoelectric element 414 being varied. As shown by an example in FIG. 9, the amount of displacement of thin region 402 with voltage applied to thin film piezoelectric element 414 usually has a hysteresis property. Therefore, before self-diagnosis of the semiconductor pressure sensor is performed, caution must be taken to avoid application of unexpected voltage to thin film piezoelectric element 414. The amount of displacement of thin region 402 varies, for example, according to the material, thickness, shape, etc. of thin film piezoelectric element 414.

According to a method other than the method above, self-diagnosis of semiconductor pressure sensor 400 may be performed by applying AC voltage to thin film piezoelectric element 414 to vibrate thin region 402. In this case, self-diagnosis of the sensor is performed based on an output waveform of semiconductor pressure sensor 400 at a time when AC voltage is applied to thin film piezoelectric element 414.

Figure 10:
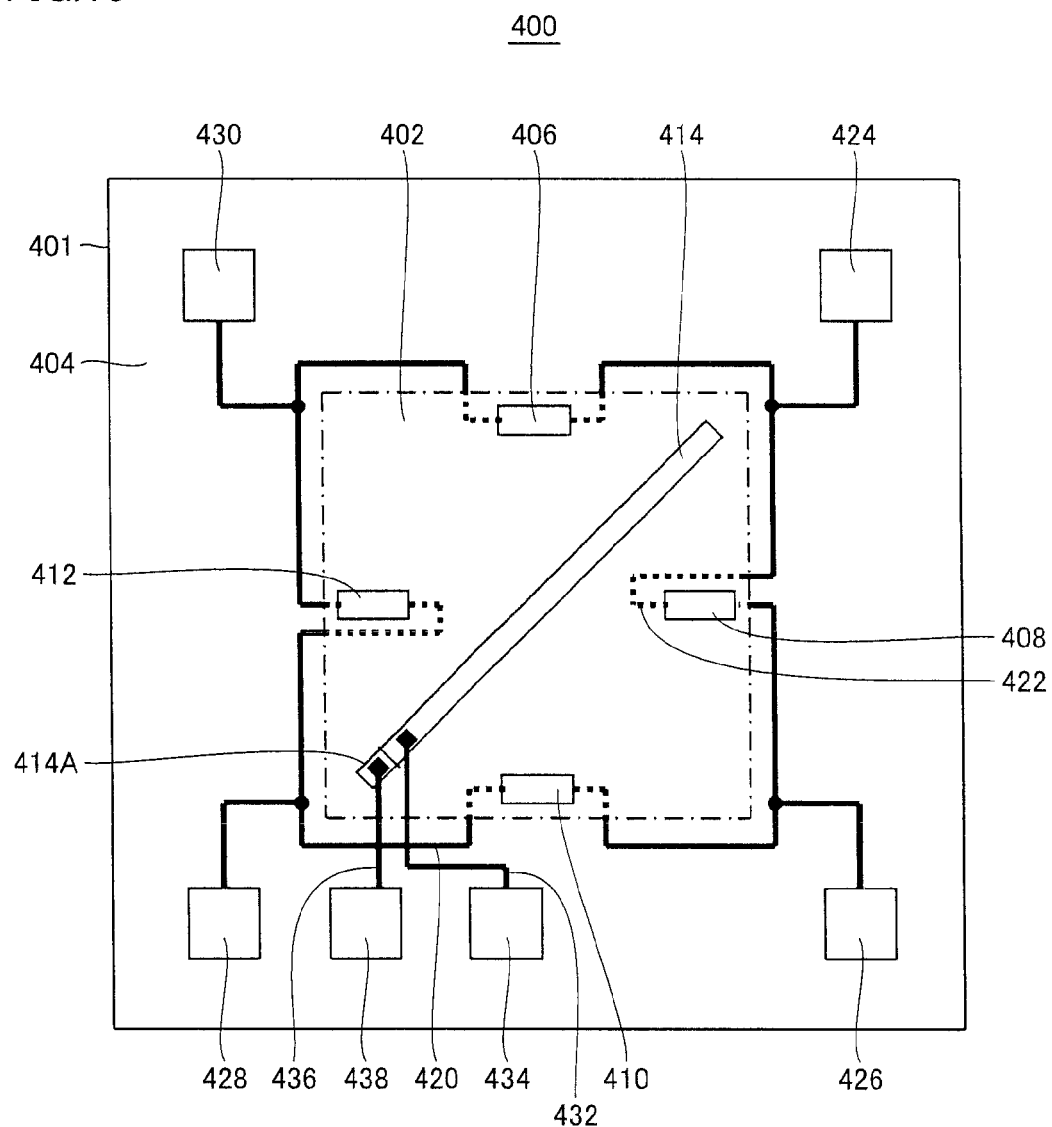
FIG. 10 is a diagram showing an exemplary wiring pattern of diffusion resistors 406, 408, 410, 412 and thin film piezoelectric element 414 in semiconductor pressure sensor 400 shown in FIG. 1.

FIG. 10 is a diagram showing an exemplary wiring pattern of diffusion resistors 406, 408, 410, 412 and thin film piezoelectric element 414 in semiconductor pressure sensor 400 shown in FIG. 1. Referring to FIG. 10, metal wiring 420 is shown by the solid line and diffusion wiring 422 formed by impurity diffusion is shown by the dotted line. Reference numerals 424, 426, 428, 430, 434, and 438 indicate bonding pads.

In order to alleviate the strain of thin region 402 due to the difference in thermal expansion coefficient between metal wiring 420 and semiconductor substrate 401, it is desirable that diffusion wiring should be used as the wiring on thin region 402. Diffusion wiring 422 is formed by doping a selective region of semiconductor substrate 401 with an impurity of high concentration.

For example, a voltage of 5 V is applied as a reference voltage between bonding pads 426 and 430 (or bonding pads 424 and 428). The voltage between bonding pads 424 and 428 (or bonding pads 426 and 430) serves as output of the semiconductor pressure sensor. Bonding pads 424 and 428 may be connected to a not-shown amplification circuit. This is applicable to other embodiments in this description.

In order to eliminate an offset voltage between bonding pad 424 and bonding pad 428, it is desirable that the resistance ratio between diffusion resistors 406 and 408 should be equal to the resistance ratio between diffusion resistors 412 and 410. Each resistance value is set to a prescribed value according to the configuration of semiconductor pressure sensor 400. All the resistance values of diffusion resistors 406, 408, 410, and 412 may be equal. This is applicable to other embodiments in this description.

The resistance values of diffusion resistor 406 and diffusion resistor 410 decrease as the strain of thin region 402 increases. On the other hand, the resistance values of diffusion resistor 408 and diffusion resistor 412 increase as the strain of thin region 402 increases. Therefore, a voltage in accordance with the amount of strain of thin region 402 is generated between bonding pads 424 and 428.

Bonding pad 438 is connected to lower electrode layer 414A of thin film piezoelectric element 414. Bonding pad 434 is connected to the upper electrode layer (shown by reference numeral 414C in FIG. 6) of thin film piezoelectric element 414. Strain can intentionally be produced in thin region 402 by applying voltage between bonding pads 438 and 434.

During self-diagnosis of semiconductor pressure sensor 400, if the difference of output voltage between bonding pads 424 and 428 between before and after voltage application to thin film piezoelectric element 414 falls within a prescribed range from the diagnostic reference voltage, it is determined that the diaphragm is not broken. On the other hand, if outside the prescribed range from the diagnostic reference voltage, it is determined that the diaphragm is broken.

Figure 11:
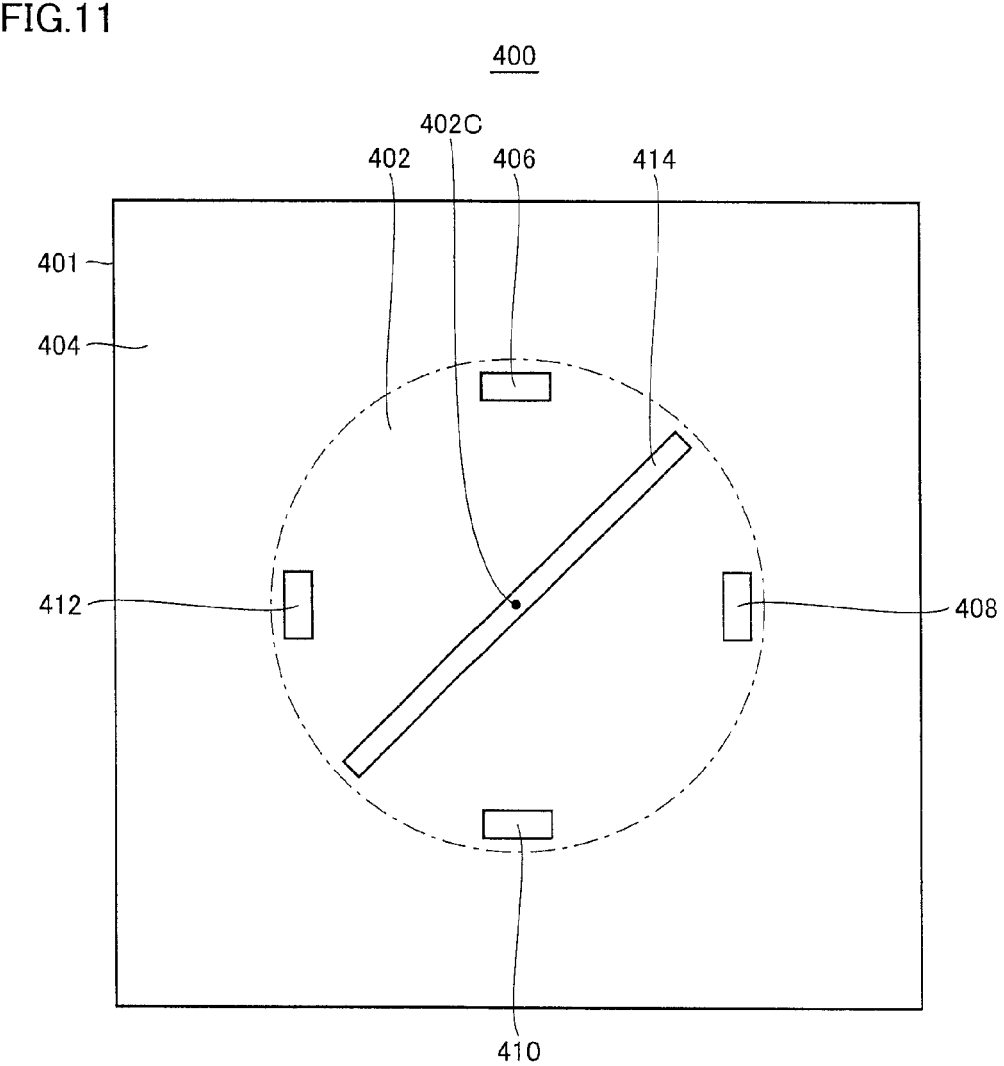
FIG. 11 is a top view showing a modification of semiconductor pressure sensor 400 according to the first embodiment of the present invention.

In FIG. 5 and FIG. 10, the shape of thin region 402 is shown to be approximately square. However, the shape of thin region 402 is not specifically limited. As shown in FIG. 11, the shape of the main surface of thin region 402 may be, for example, approximately circular. This is applicable in other embodiments in this description.

In the case where the shape of thin region 402 is approximately square, when strain is produced in the thin portion, the proximity of the midpoint of each side of thin region 402 is deformed greater than the proximity of the vertex of thin region 402. The diffusion resistor is arranged in proximity to the midpoint of each side of the thin region, so that the sensitivity of the semiconductor pressure sensor is improved as compared with when the shape of the thin region is approximately circular. In this case, the thin film piezoelectric element can be arranged at a position away from the diffusion resistors, for example, on the diagonal line of the thin region.

On the other hand, in the case where the shape of thin region 402 is approximately circular, when strain is produced in thin region 402, the amount of displacement is approximately equal on the circle of thin region 402. Therefore, the flexibility of arrangement of diffusion resistors can be increased.

In the configuration of semiconductor pressure sensor 400 shown in FIG. 10, thin film piezoelectric element 414 is formed only within thin region 402. Therefore, the wiring of the lower electrode and the upper electrode of thin film piezoelectric element 414 (metal wiring 432 and 436) extends across the bridge circuit of diffusion resistors 406, 408, 410, and 412. In this case, some way should be devised, for example, in such a manner that metal wiring 420 of the bridge circuit and metal wiring 432 and 436 of thin film piezoelectric element 414 are fowled of metal wiring on different levels. This may impose restrictions on wiring of the semiconductor pressure sensor. The semiconductor pressure sensor that can solve this problem will be described in a second embodiment.

Second Embodiment

Figure 12:
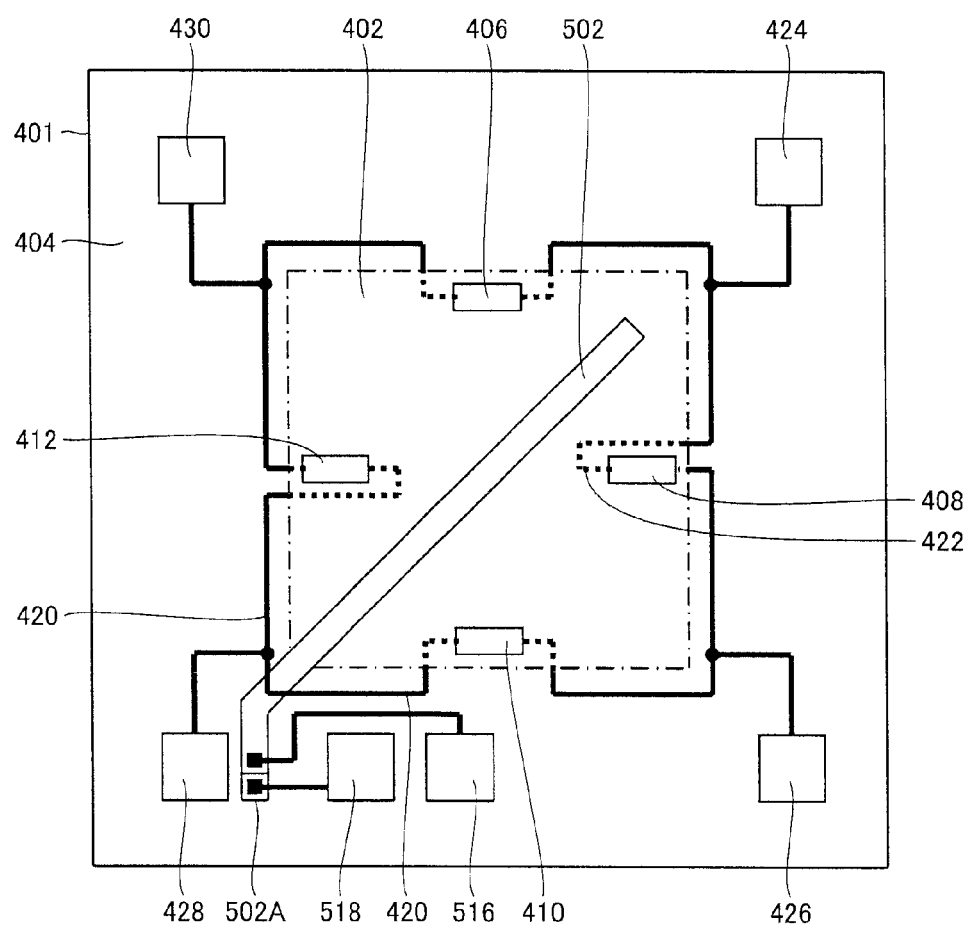
FIG. 12 is a top view of a semiconductor pressure sensor 500 according to a second embodiment of the present invention.

FIG. 12 is a top view of a semiconductor pressure sensor 500 according to a second embodiment of the present invention. Referring to FIG. 12, semiconductor pressure sensor 500 includes a thin film piezoelectric element 502 in place of thin film piezoelectric element 414. Thin film piezoelectric element 502 extends across metal wiring 420 of the bridge circuit to thick region 404. In this respect, the configuration of semiconductor pressure sensor 500 is different from the configuration shown in FIG. 10. Thin film piezoelectric element 502 is formed on a different level electrically insulated from metal wiring 504. This is applicable in other embodiments in this description. A method of manufacturing a semiconductor pressure sensor in the present invention will be described later.

Thin film piezoelectric element 502 has a lower electrode layer 502A, a piezoelectric layer, and an upper electrode layer. Lower electrode layer 502A is connected to a bonding pad 518 through metal wiring. The upper electrode layer of thin film piezoelectric element 502 is connected to a bonding pad 516 through metal wiring. In this configuration, the metal wiring connected to the lower electrode or the upper electrode of thin film piezoelectric element 502 can be arranged in the outside of the bridge circuit. Accordingly, the metal wiring of semiconductor pressure sensor 500 can be formed of wiring of a single layer, and in addition, the flexibility of layout of metal wiring 420 of the bridge circuit is increased.

When the offset voltage of semiconductor pressure sensor 500, that is, the output of semiconductor pressure sensor 500 having no strain in thin region 402 is set to zero, it is desirable that the wiring lengths of metal wiring 420 and diffusion wiring 422 are matched in order to set the wiring resistance from each bonding pad to each diffusion resistor to the same value. In semiconductor pressure sensor 500 according to the present embodiment, thin film piezoelectric element 502 is arranged such that thin film piezoelectric element 502 extends to any given position on thick region 404. Accordingly, the metal wiring of thin film piezoelectric element 502 can be arranged at any given position. This makes it easy to adjust the arrangement of bonding pads 424, 426, 428, 430, 516, and 518 or the wiring length of metal wiring 420 and diffusion wiring 422 of the bridge circuit.

Furthermore, thin film piezoelectric element 502 is fixed to part of thick region 404. Therefore, as compared with semiconductor pressure sensor 400 shown in FIG. 10, the amount of strain applied to thin region 402 by thin film piezoelectric element 502 can be stabilized. Accordingly, the accuracy of self-diagnosis can be improved.

Figure 13:
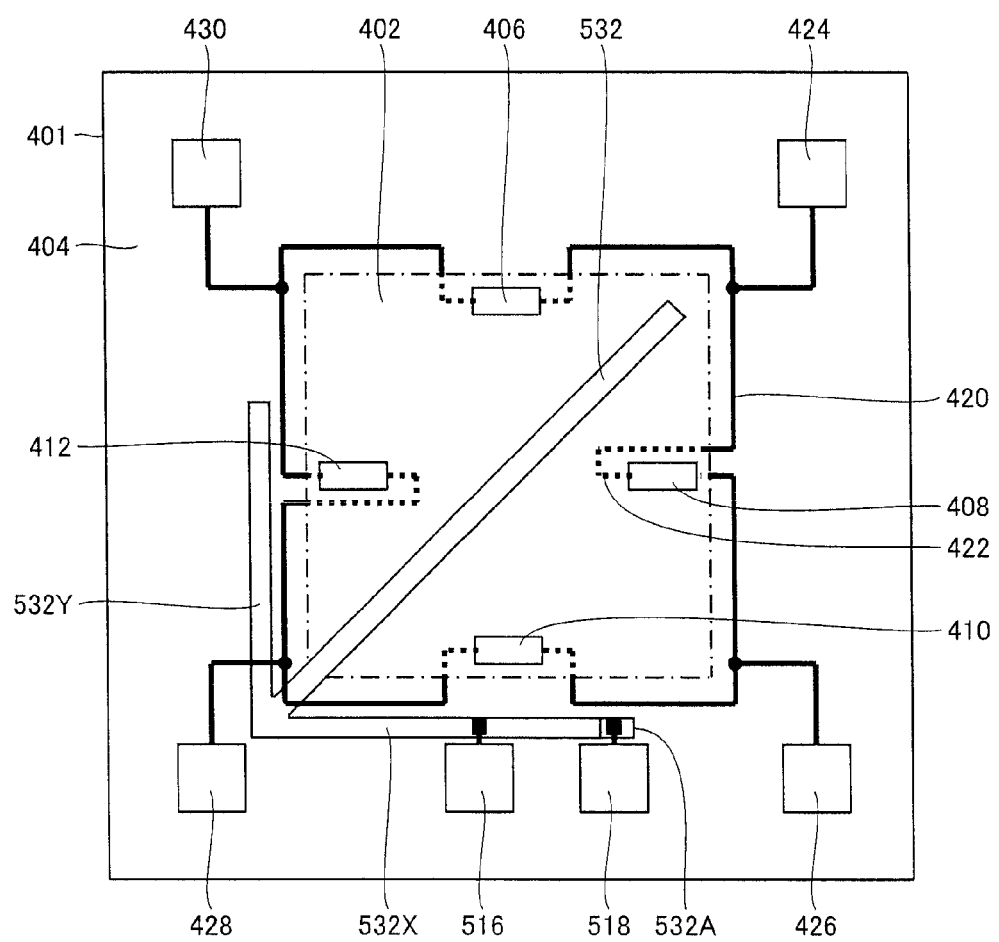
FIG. 13 is a diagram showing a modification of semiconductor pressure sensor 500 shown in FIG. 12.

FIG. 13 is a diagram showing a modification of semiconductor pressure sensor 500 shown in FIG. 12. Referring to FIG. 13, a semiconductor pressure sensor 530 has a thin film piezoelectric element 532 in place of thin film piezoelectric element 502. Thin film piezoelectric element 532 has extension portions 532X and 532Y. In this respect, semiconductor pressure sensor 530 is different from semiconductor pressure sensor 500 shown in FIG. 12. Extension portions 532X and 532Y are formed on thick region 404 to extend along the outer circumference of thin region 402.

Thin film piezoelectric element 532 has a lower electrode layer 532A, a piezoelectric layer, and an upper electrode layer. Lower electrode layer 532A is connected to bonding pad 518. The upper electrode layer of thin film piezoelectric element 532 is connected to bonding pad 516. In this configuration, thin film piezoelectric element 532 is fixed to thick region 404 by extension portions 532X and 532Y, thereby further stabilizing the amount of strain applied to thin region 402 by thin film piezoelectric element 532. Accordingly, the accuracy of self-diagnosis can be improved.

Figure 14:
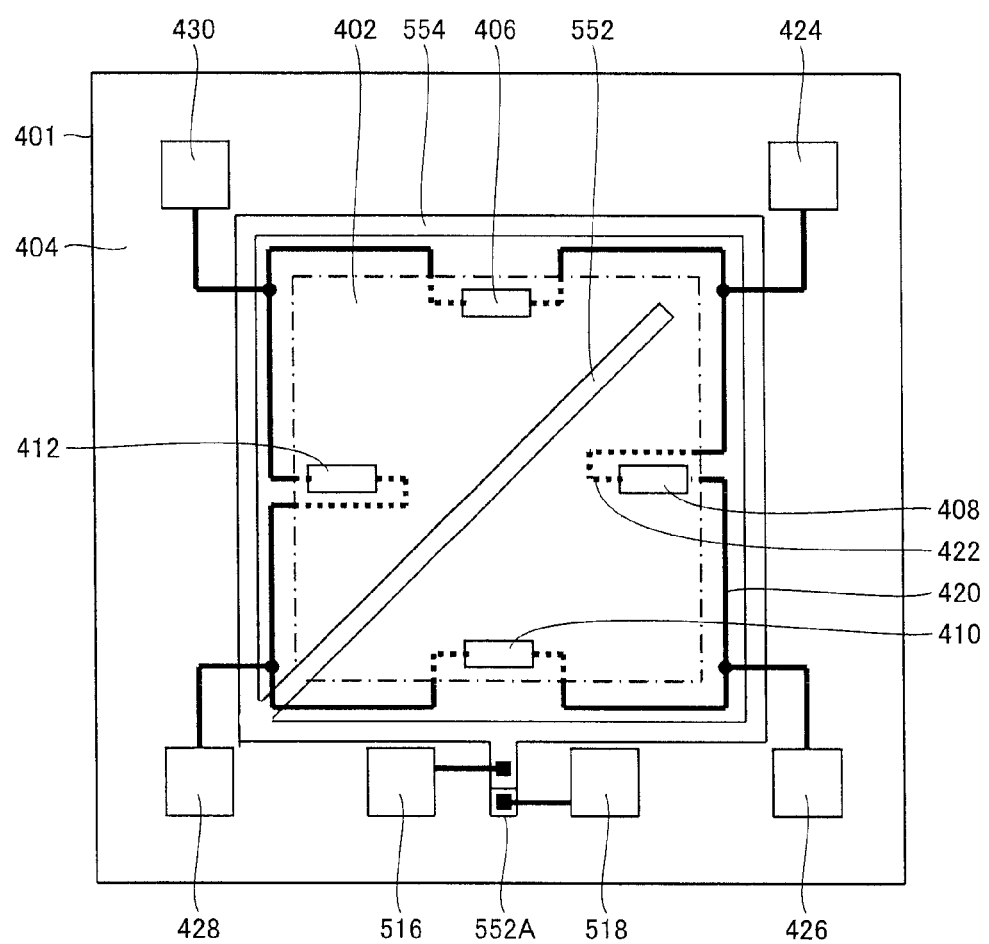
FIG. 14 is a diagram showing another modification of semiconductor pressure sensor 500 shown in FIG. 12.

FIG. 14 is a diagram showing another modification of semiconductor pressure sensor 500 shown in FIG. 12. Referring to FIG. 14, a semiconductor pressure sensor 550 includes a thin film piezoelectric element 552 in place of thin film piezoelectric element 502. Thin film piezoelectric element 552 is formed on thick region 404 to surround the outer circumference of thin region 402. In this respect, semiconductor pressure sensor 550 is different from semiconductor pressure sensor 500 shown in FIG. 12. Thin film piezoelectric element 552 has an extension portion 554 as a portion that surrounds the outer circumference of thin region 402.

Thin film piezoelectric element 552 has a lower electrode layer 552A, a piezoelectric layer, and an upper electrode layer. Lower electrode layer 552A is connected to bonding pad 518. The upper electrode layer of thin film piezoelectric layer 552 is connected to bonding pad 516. In this configuration, thin film piezoelectric element 552 is strongly fixed to thick region 404, thereby further stabilizing the amount of strain applied to thin region 402 by thin film piezoelectric element 552. Accordingly, the accuracy of self-diagnosis can be further improved.

Third Embodiment

Figure 15:
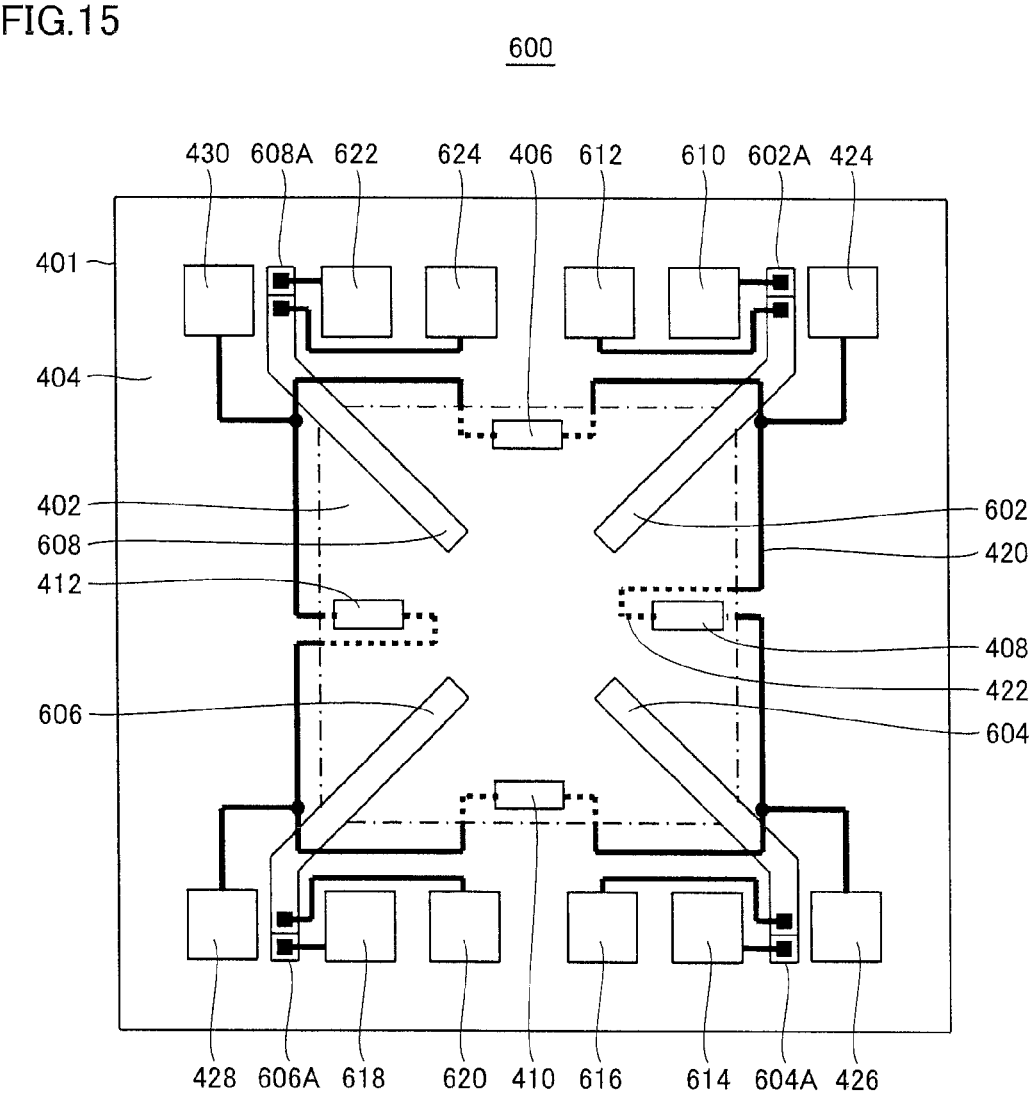
FIG. 15 is a top view of a semiconductor pressure sensor 600 according to a third embodiment of the present invention.

FIG. 15 is a top view of a semiconductor pressure sensor 600 according to a third embodiment of the present invention. Referring to FIG. 15, semiconductor pressure sensor 600 includes a plurality of thin film piezoelectric elements 602, 604, 606, and 608 provided on thin region 402. In this respect, semiconductor pressure sensor 600 is different from semiconductor pressure sensor 400 shown in FIG. 10.

Diffusion resistors 406, 408, 410, and 412 are each provided at a location where the amount of deformation is great when strain is produced in thin region 402, that is, in proximity to the midpoint of each side of thin region 402.

Thin film piezoelectric elements 602, 604, 606, and 608 are provided at positions away from diffusion resistors 406, 408, 410, and 412, for example, on the diagonal lines of thin region 402. As long as thin film piezoelectric elements 602, 604, 606, and 608 are at a prescribed distance from diffusion resistors 406, 408, 410, and 412, the locations where the thin film piezoelectric elements are provided are not limited to those on the diagonal lines of thin region 402. However, in order to minimize unexpected strain of the diffusion resistors, each thin film piezoelectric element is desirably arranged at a midway between two diffusion resistors adjacent to each other along the outer circumference of the thin region.

Thin film piezoelectric element 602 has a lower electrode layer 602A, a piezoelectric layer, and an upper electrode layer. Lower electrode layer 602A is connected to a bonding pad 610. The upper electrode layer of thin film piezoelectric element 602 is connected to a bonding pad 612.

Thin film piezoelectric element 604 has a lower electrode layer 604A, a piezoelectric layer, and an upper electrode layer. Lower electrode layer 604A is connected to a bonding pad 614. The upper electrode layer of thin film piezoelectric element 604 is connected to a bonding pad 616.

Thin film piezoelectric element 606 has a lower electrode layer 606A, a piezoelectric layer, and an upper electrode layer. Lower electrode layer 606A is connected to a bonding pad 618. The upper electrode layer of thin film piezoelectric element 604 is connected to a bonding pad 620.

Thin film piezoelectric element 608 has a lower electrode layer 608A, a piezoelectric layer, and an upper electrode layer. Lower electrode layer 608A is connected to a bonding pad 622. The upper electrode layer of thin film piezoelectric element 608 is connected to a bonding pad 624.

In this configuration, during self-diagnosis, thin film piezoelectric elements 602, 604, 606, and 608 cooperate to apply strain to thin region 402. Therefore, if the same voltage is applied to thin film piezoelectric elements 602, 604, 606, and 608, uniform strain can be applied to the entire thin region 402. Accordingly, the accuracy of self-diagnosis can be improved.

Figure 16:
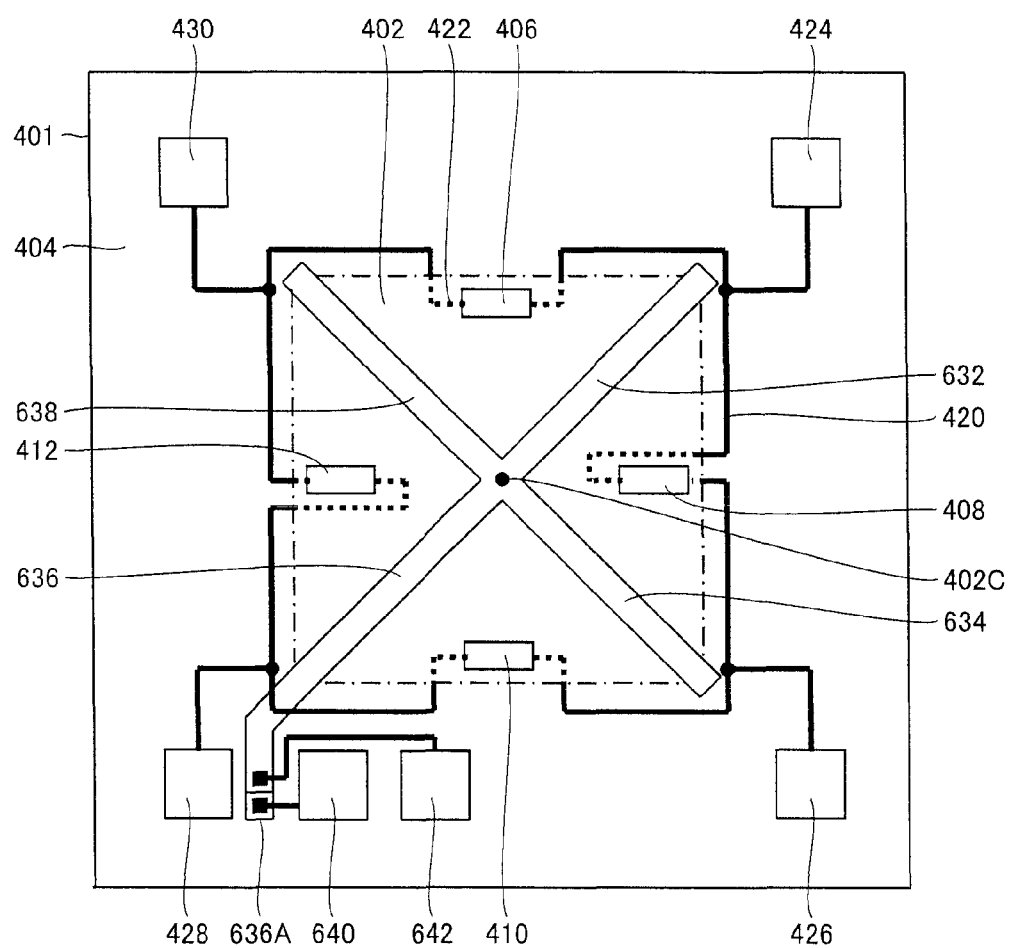
FIG. 16 is a diagram showing a modification of semiconductor pressure sensor 600 shown in FIG. 15.

FIG. 16 is a diagram showing a modification of semiconductor pressure sensor 600 shown in FIG. 15. Referring to FIG. 16, a semiconductor pressure sensor 630 includes thin film piezoelectric elements 632, 634, 636, and 638. Thin film piezoelectric elements 632, 634, 636, and 638 are provided on the diagonal lines of thin region 402 and are coupled to each other at the proximity of center 402C of thin region 402. In this respect, semiconductor pressure sensor 630 is different from semiconductor pressure sensor 600 shown in FIG. 15.

A lower electrode layer 636A is a common lower electrode layer among thin film piezoelectric elements 632, 634, 636, and 638. Lower electrode layer 636A is coupled to a bonding pad 640. Similarly, a common upper electrode layer among thin film piezoelectric elements 632, 634, 636, and 638 is connected to a bonding pad 642. In this configuration, it is only necessary to provide one wiring each for the upper electrodes of thin film piezoelectric elements 632 to 638 and for the lower electrodes of thin film piezoelectric elements 632 to 638, thereby simplifying the configuration of semiconductor pressure sensor 630.

Fourth Embodiment

Figure 17:
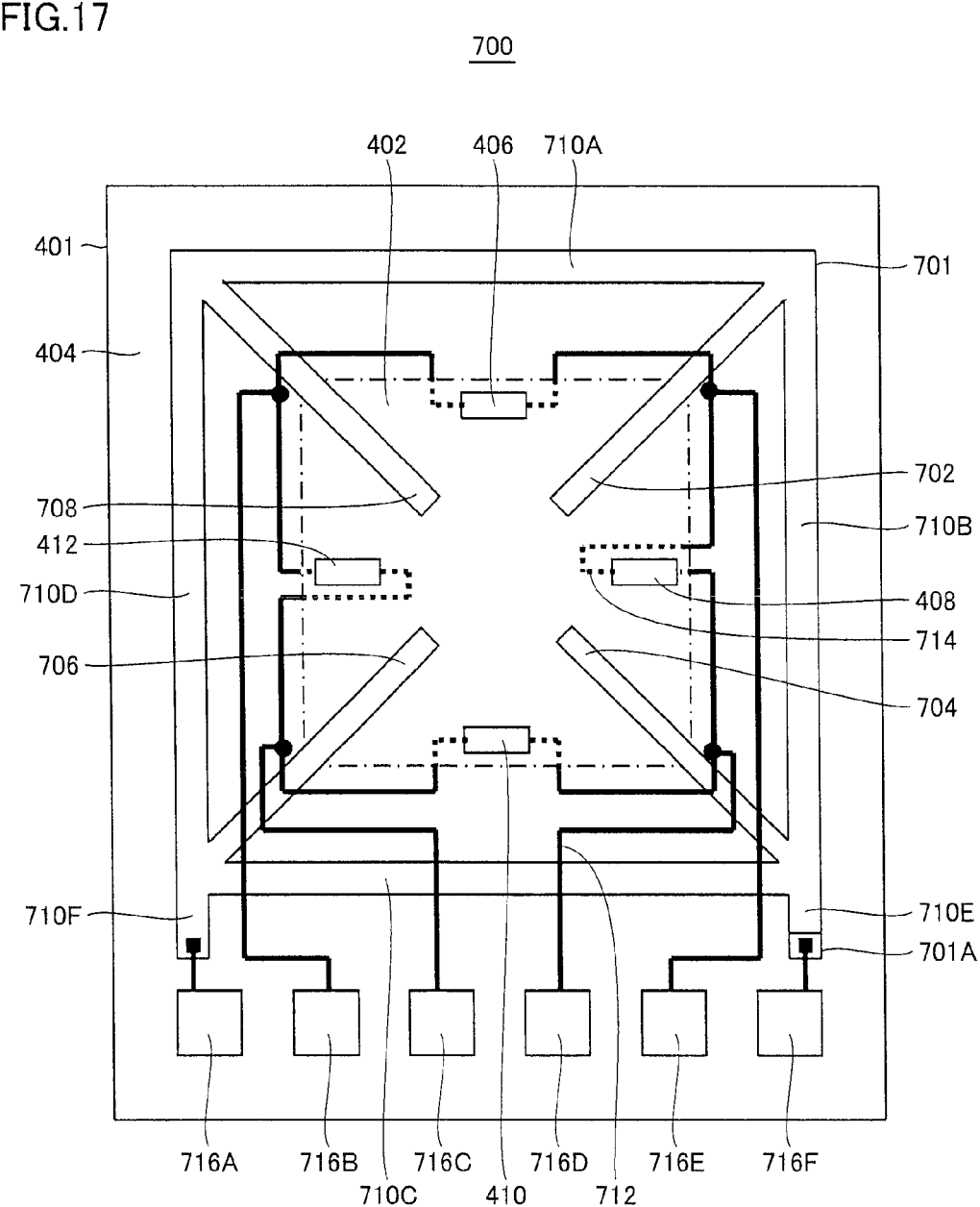
FIG. 17 is a top view of a semiconductor pressure sensor 700 according to a fourth embodiment of the present invention.

FIG. 17 is a top view of a semiconductor pressure sensor 700 according to a fourth embodiment of the present invention. Referring to FIG. 17, semiconductor pressure sensor 700 includes a thin film piezoelectric element 701. Thin film piezoelectric element 701 includes thin film piezoelectric elements 702, 704, 706, and 708, and extension portions 710A, 710B, 710C, and 710D. Thin film piezoelectric elements 702, 704, 706, and 708 are provided on the diagonal lines of thin region 402. Extension portions 710A, 710B, 710C, and 710D are arranged on thick region 404. Thin film piezoelectric elements 702, 704, 706, and 708 are coupled to each other by extension portions 710A, 710B, 710C, and 710D. In this respect, semiconductor pressure sensor 700 is different from semiconductor pressure sensor 600 shown in FIG. 15.

Thin film piezoelectric element 701 is further extended by an extension portion 710E or 710F to the proximity of a bonding pad 716F or 716A. Bonding pads 716A, 716B, 716C, 716D, 716E, and 716F are formed on a different level electrically insulated from thin film piezoelectric element 701. A method of manufacturing semiconductor pressure sensor 700 will be described later. Extension portions 710E, 710F may be extended immediately below the bonding pads.

Thin film piezoelectric elements 702, 704, 706, and 708 are coupled to each other by extension portions 710A, 710B, 710C, and 710D on the thick region. Therefore, it is only necessary to provide one wiring each for the upper electrode layer of thin film piezoelectric element 701 and for lower electrode layer 701A of thin film piezoelectric element 701. The upper electrode layer of thin film piezoelectric element 701 is connected to bonding pad 716A. Lower electrode layer 701A of thin film piezoelectric element 701 is connected to bonding pad 716F.

Thin film piezoelectric element 701 is fixed on thick region 404 by extension portions 710A, 710B, 710C, and 710D. Therefore, the amount of strain applied to thin region 402 by thin film piezoelectric element 701 can be stabilized. Accordingly, the accuracy of self-diagnosis can be improved.

Furthermore, thin film piezoelectric element 701 is extended by extension portion 710E or 710F to the proximity of bonding pad 716A or 716F. Therefore, the metal wiring of thin film piezoelectric element 701 can be shortened. This increases the space that can be used to arrange metal wiring 712 of the bridge circuit connecting diffusion resistors 406, 408, 410, and 412, thereby making it easy to adjust the wiring resistance by metal wiring 712. Extension portion 710F or 710E may be extended immediately below bonding pad 716F or 716A.

As shown in FIG. 17, bonding pads 716A, 716B, 716C, 716D, 716E, and 716F are provided side by side on one side of semiconductor substrate 401. This configuration improves the convenience in preforming wire bonding for the bonding pads.

In FIG. 17, metal wiring 712 is shown by the solid line, and diffusion wiring 714 is shown by the broken line. Diffusion resistor 406 is connected to bonding pads 716B and 716E by metal wiring 712 and diffusion wiring 714. Diffusion resistor 408 is connected to bonding pads 716D and 716E by metal wiring 712 and diffusion wiring 714. Diffusion resistor 410 is connected to bonding pads 716C and 716D by metal wiring 712 and diffusion wiring 714. Diffusion resistor 412 is connected to bonding pads 716B and 716C by metal wiring 712 and diffusion wiring 714. In order to eliminate the offset voltage of semiconductor pressure sensor 700, it is desirable that the length of metal wiring 712 and diffusion wiring 714 should be equal among the diffusion resistors.

Figure 18:
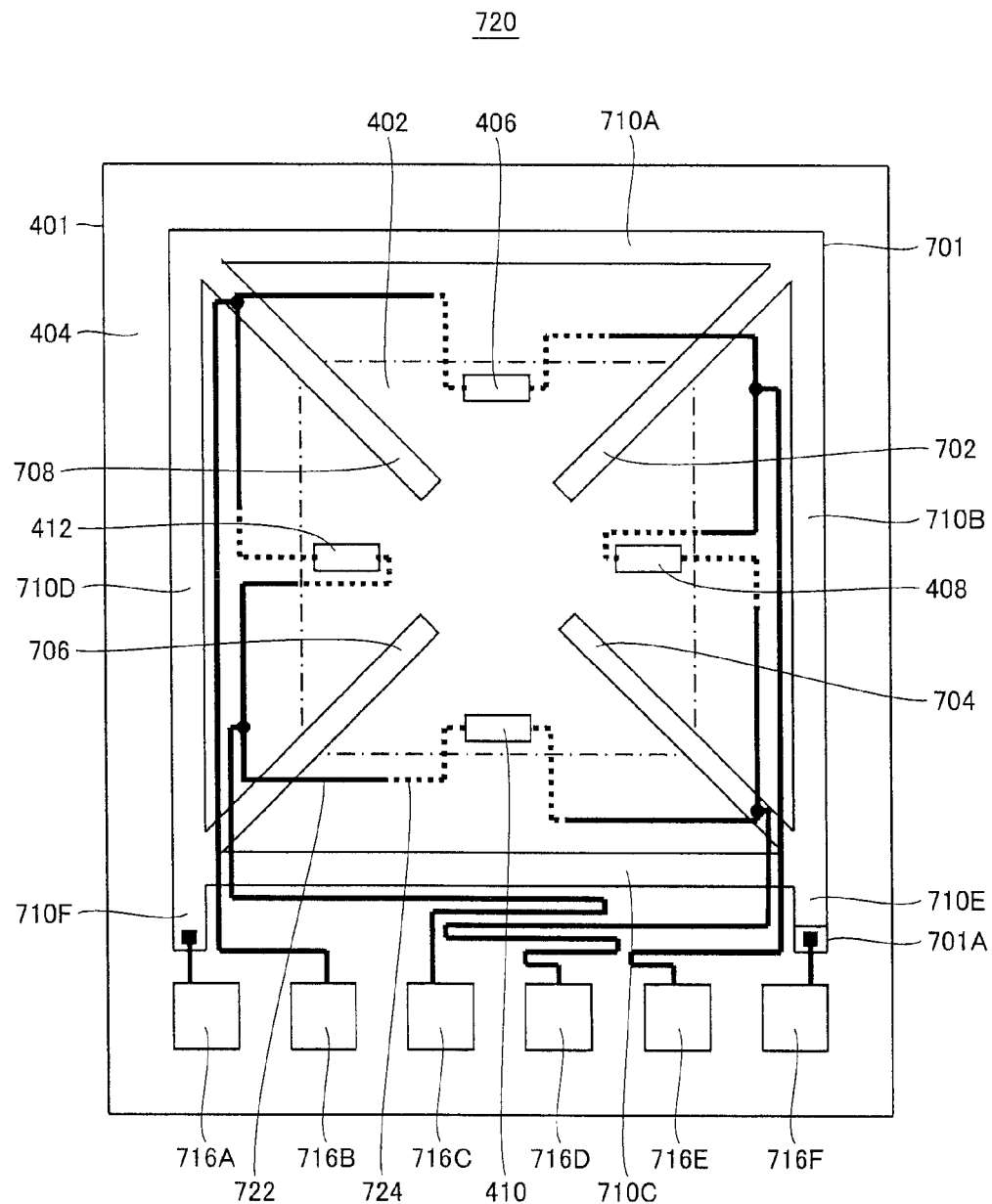
FIG. 18 is a diagram showing an example of metal wiring and diffusion wiring in which an offset voltage can be set to zero.

FIG. 18 is a diagram showing an example of metal wiring and diffusion wiring in which an offset voltage can be set to zero. Referring to FIG. 18, in a semiconductor pressure sensor 720, the length of metal wiring 722 and diffusion wiring 724 connecting each of diffusion resistors 406, 408, 410, 412 to a bonding pad is equal. This can make the resistance values of wiring resistances equal to each other. In this respect, semiconductor pressure sensor 720 is different from semiconductor pressure sensor 700 shown in FIG. 17.

Figure 19:
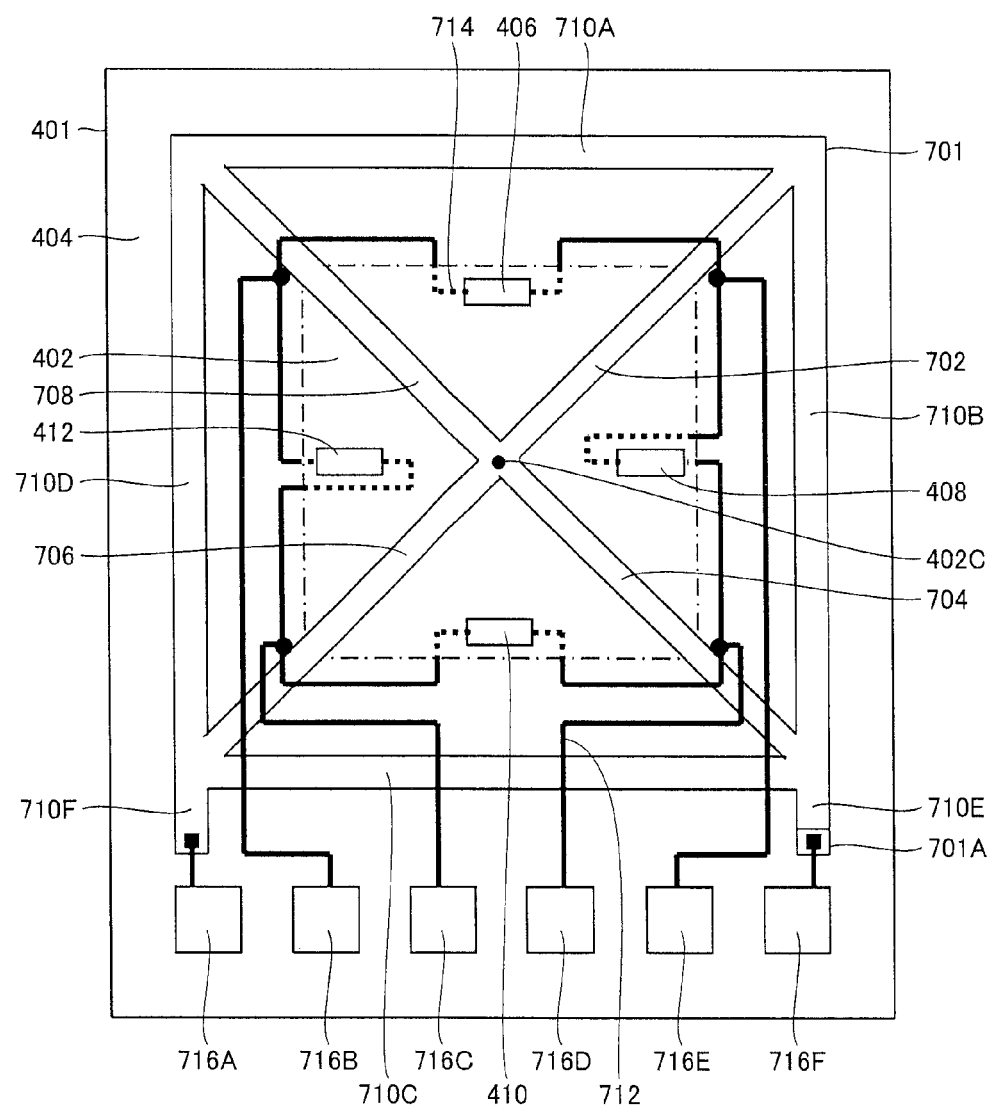
FIG. 19 is a diagram showing another modification of semiconductor pressure sensor 700 shown in FIG. 17.

FIG. 19 is a diagram showing another modification of semiconductor pressure sensor 700 shown in FIG. 17. Referring to FIG. 19, thin film piezoelectric elements 702, 704, 706, and 708 are provided on the diagonal lines of thin region 402 and are coupled to each other in proximity to center 402C of thin region 402. In this respect, semiconductor pressure sensor 730 is different from semiconductor pressure sensor 700 shown in FIG. 17. This configuration can increase the amount of strain applied by thin film piezoelectric element 701 to thin region 402. Accordingly, self-diagnosis is possible even with a low voltage applied to thin film piezoelectric element 701.

Figure 20:
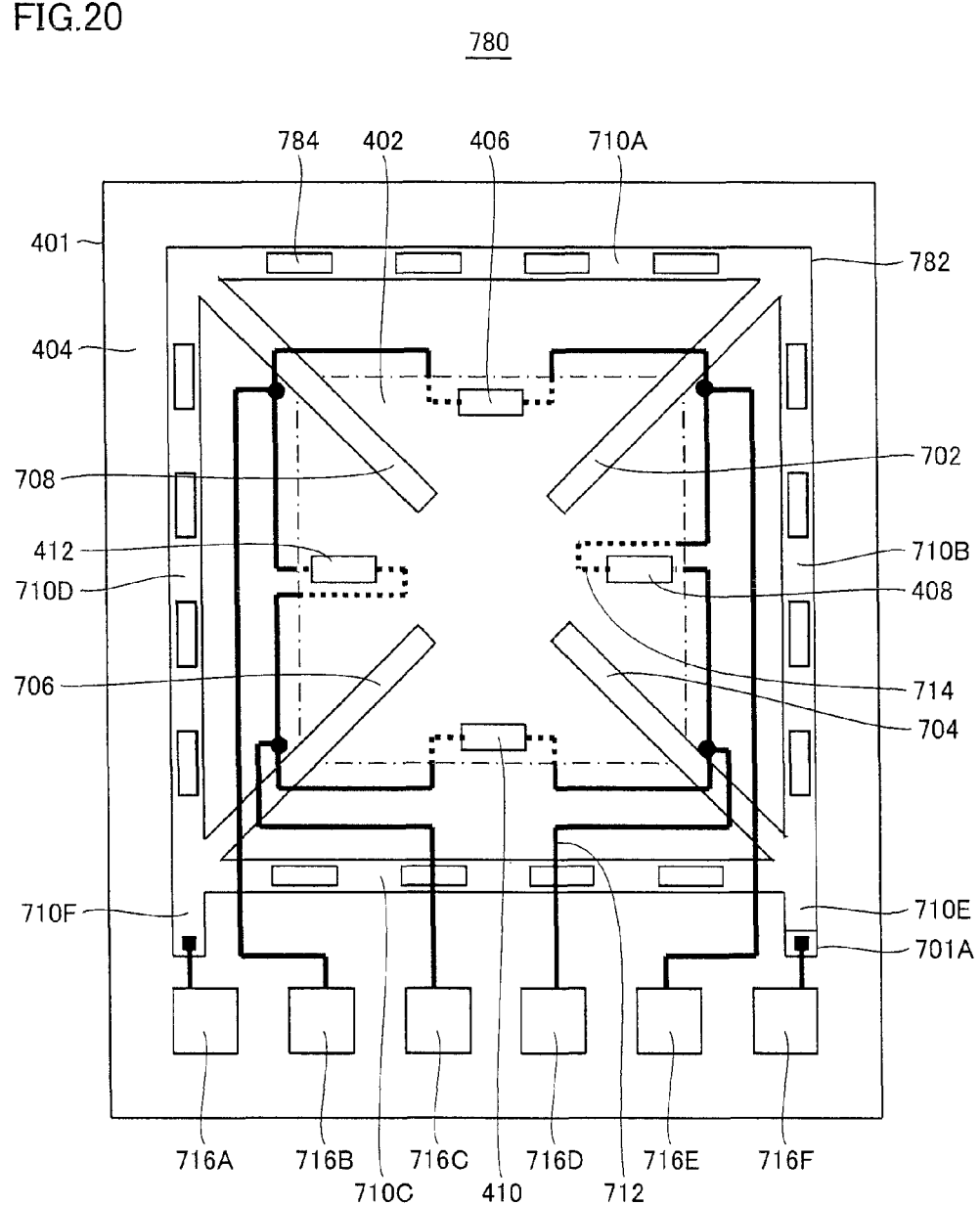
FIG. 20 is a diagram showing yet another modification of semiconductor pressure sensor 700 shown in FIG. 17.

FIG. 20 is a diagram showing yet another modification of semiconductor pressure sensor 700 shown in FIG. 17. Referring to FIG. 20, a semiconductor pressure sensor 780 has a thin film piezoelectric element 782. Thin film piezoelectric element 782 includes slit portions 784. In this respect, semiconductor pressure sensor 780 is different from semiconductor pressure sensor 700 shown in FIG. 17.

The provision of slit portions 784 in thin film piezoelectric element 782 reduces the contact area between thin film piezoelectric element 782 and semiconductor substrate 401. This can alleviate unexpected strain of semiconductor substrate 401 that is caused by the difference in thermal expansion coefficient between thin film piezoelectric element 782 and semiconductor substrate 401.

In each embodiment of the present invention, a diffusion resistor is used as a strain gauge resistor of the semiconductor pressure sensor. However, the strain gauge resistor may not be a diffusion resistor. For example, it may be a ceramics composite material or a carbon nanotube composite material formed on a semiconductor substrate.

In each embodiment of the present invention, four diffusion resistors are used as strain gauge resistors of the semiconductor pressure sensor, by way of example. However, the number of diffusion resistors may not be four. The number of diffusion resistors may be one as long as the amount of strain of the thin region can be measured with the sensitivity required for the semiconductor pressure sensor.

In each embodiment of the present invention, a circuit element such as a transistor or a diode may be formed on one main surface of the semiconductor substrate of the semiconductor pressure sensor.

[Method of Manufacturing Semiconductor Pressure Sensor According to Embodiments of the Present Invention]

Next, a method of manufacturing a semiconductor pressure sensor according to the foregoing embodiments will be described using FIG. 21 to FIG. 27. For the sake of convenience of drawing and explanation, the ratios of thickness and width in each region are not always accurate.

For example, LOCOS (Local Oxidation of Silicon) is used to form a diffusion resistor included in a semiconductor pressure sensor 800.

Figure 21:
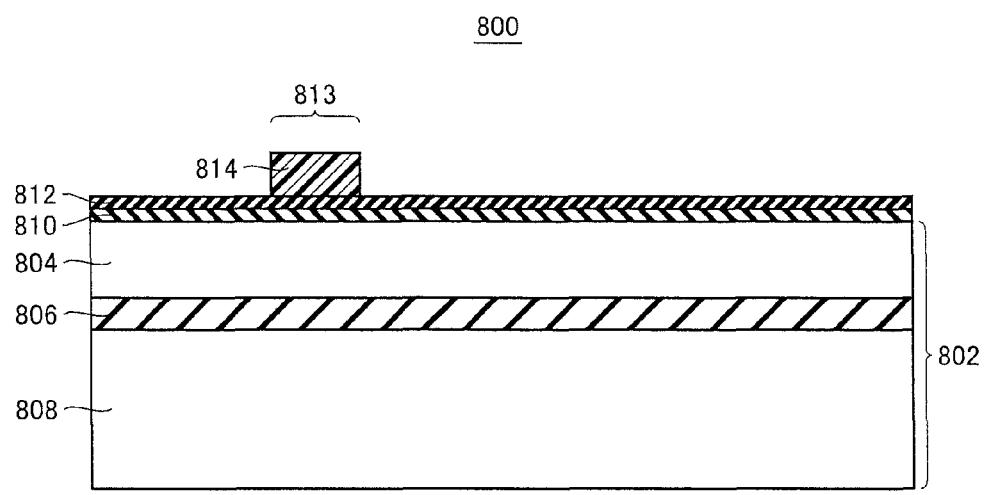
FIG. 21 is a diagram showing a first step of a manufacturing method according to the present invention.

FIG. 21 is a diagram showing a first step of a manufacturing method according to the present invention. Referring to FIG. 21, first, an SOI (Silicon on Insulator) substrate 802 is prepared. SOI substrate 802 has one main surface Si (Silicon) layer 804, a buried oxide film layer 806, and the other main surface Si layer 808. In order to protect one main surface (the surface of one main surface Si layer 804) of SOI substrate 802, a pad oxide film 810 and an SiN film 812 are formed. SOI substrate 802 is formed, for example, of two semiconductor substrates. The interface to be laminated of each of two semiconductor substrates is ground and polished in mirror finish, and the two semiconductor substrates are thereafter bonded together by thermal oxidation. The SOI substrate is thus formed. SiN film 812 is formed, for example, by CVD (Chemical Vapor Deposition).

One main surface Si layer 804 has a first conductivity type. Although one main surface Si layer is n-type semiconductor in the following description, one main surface Si layer 804 may be p-type semiconductor.

Resist 814 is applied to an active region 813 on SiN film 812. Active region 813 is a region where a diffusion resistor is later formed. Thereafter, SiN film 812 is etched, and SiN film 812 in a region where resist 814 is not applied is removed.

Figure 22:
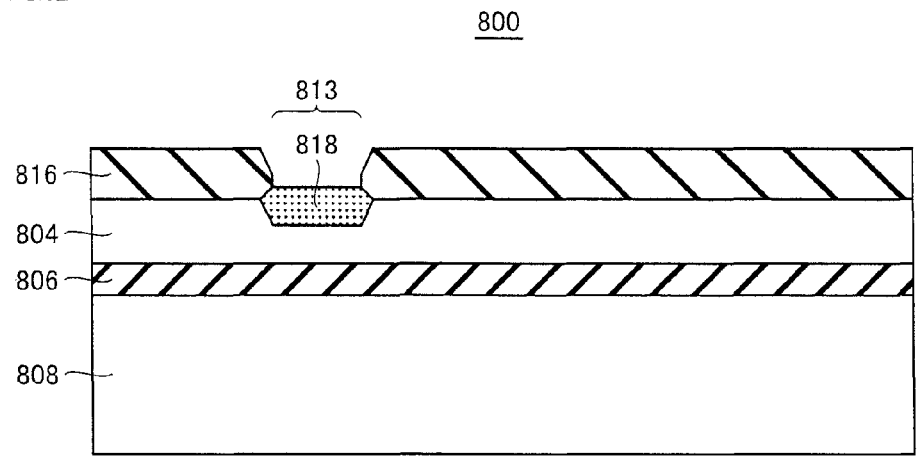
FIG. 22 is a diagram showing a second step of the manufacturing method according to the present invention.

FIG. 22 is a diagram showing a second step of the manufacturing method according to the present invention. Referring to FIG. 22, after the etching of SiN film 812, resist 814 is removed. Then, a field oxide film 816 is formed by wet oxidation or a pyrogenic method. Furthermore, SiN film 812 and pad oxide film 810 in active region 813 are removed.

Thereafter, active region 813 is doped with an impurity, for example, boron to form a diffusion resistor 818. Field oxide film 816 is removed after the formation of diffusion resistor 818.

Figure 23:
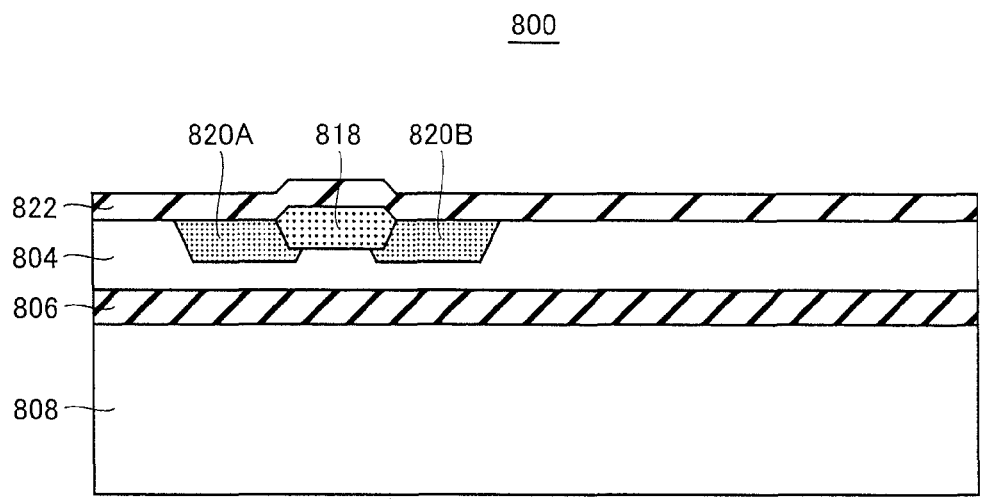
FIG. 23 is a diagram showing a third step of the manufacturing method according to the present invention.

FIG. 23 is a diagram showing a third step of the manufacturing method according to the present invention. Referring to FIG. 23, after the formation of diffusion resistor 818, diffusion wiring 820A and 820B doped with an impurity having the same conductivity type as diffusion resistor 818 is formed adjacent to diffusion resistor 818. The regions adjacent to diffusion resistor 818 are doped with an impurity of high concentration so that the impurity concentration of diffusion wiring 820A, 820B is higher than the impurity concentration of diffusion resistor 818. Thereafter, a first interlayer insulating film 822 is formed. First interlayer insulating film 822 is, for example, an NSG (Nondoped Silicate Glass) film which is silicon oxide not including an impurity such as phosphorous or boron. In the manufacturing method in this description, the NSG film may be replaced by a PSG (Phosphorous Silicate Glass) film or a BPSG (Boron Phosphorous Silicate Glass) film.

Figure 24:
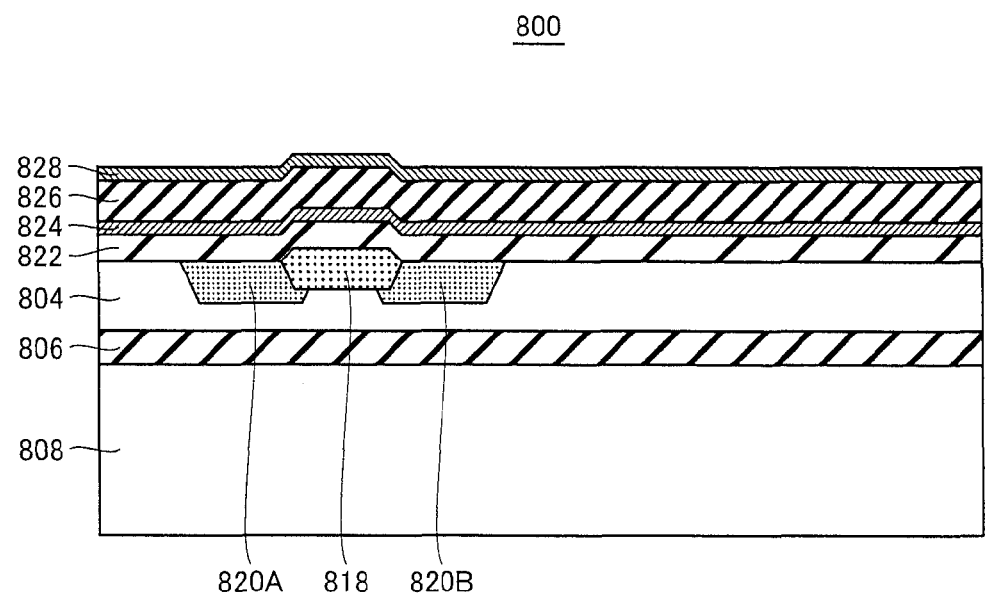
FIG. 24 is a diagram showing a fourth step of the manufacturing method according to the present invention.

FIG. 24 is a diagram showing a fourth step of the manufacturing method according to the present invention. Referring to FIG. 24, a lower electrode layer 824, a piezoelectric layer 826, and an upper electrode layer 828 are formed on first interlayer insulating film 822.

Lower electrode layer 824, piezoelectric layer 826, and upper electrode layer 828 are formed, for example, by sputtering. Platinum or titanium is used as a material of lower electrode layer 824. The thickness of lower electrode layer 824 is set, for example, to 1750 Å in the case of platinum and is set, for example, to 200 Å in the case of titanium.

For example, PZT (lead zirconate titanate) is used as a material of piezoelectric layer 826. The thickness of piezoelectric layer 826 is set, for example, to 10000 Å.

For example, iridium or iridium oxide is used as a material of upper electrode layer 828. The thickness of upper electrode layer 828 is set, for example, to 1000 Å in the case of iridium and set, for example, to 800 Å in the case of iridium oxide.

The thicknesses of lower electrode layer 824, piezoelectric layer 826, and upper electrode layer 828 are not limited to those described above. The thicknesses of lower electrode layer 824 and upper electrode layer 828 can be set in such an extent that, during formation of a contact hole as described later, the contact hole does not pass through each electrode layer.

Figure 25:
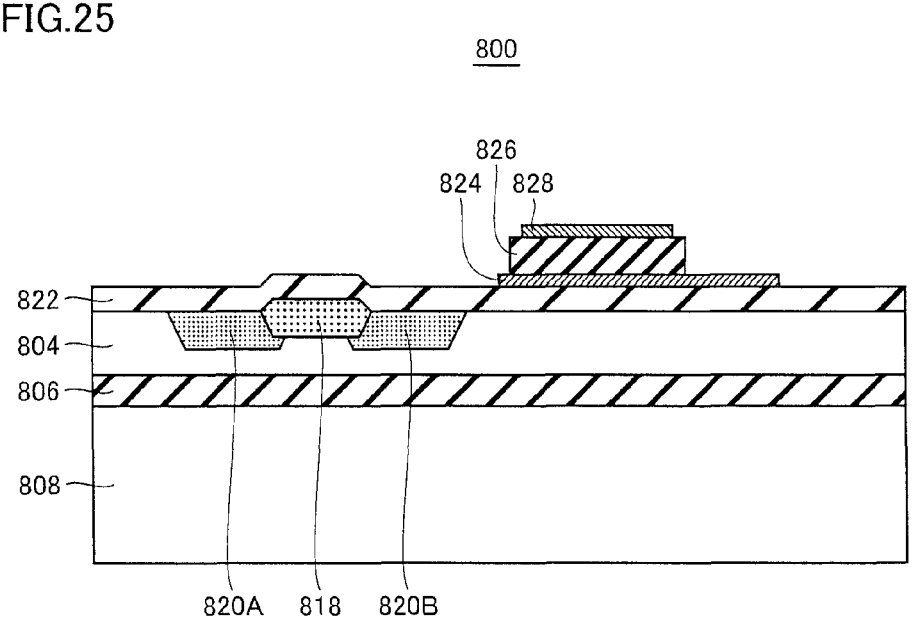
FIG. 25 is a diagram showing a fifth step of the manufacturing method according to the present invention.

FIG. 25 is a diagram showing a fifth step of the manufacturing method according to the present invention. Referring to FIG. 25, a prescribed pattern of a thin film piezoelectric element is formed by selectively etching lower electrode layer 824, piezoelectric layer 826, and upper electrode layer 828. Here, the pattern is formed such that lower electrode layer 824, piezoelectric layer 826, and upper electrode layer 828 do not overlap with diffusion resistor 818.

Figure 26:
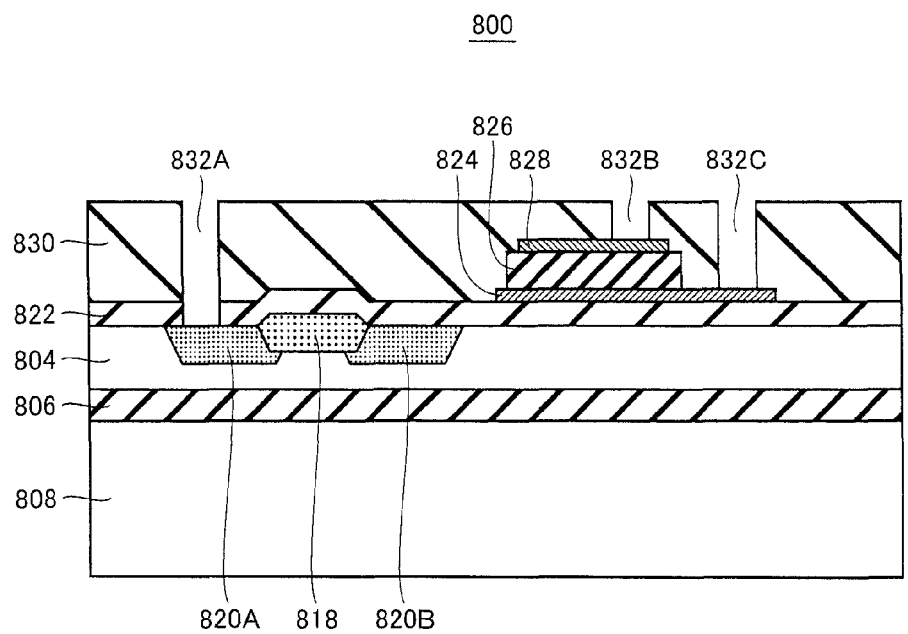
FIG. 26 is a diagram showing a sixth step of the manufacturing method according to the present invention.

FIG. 26 is a diagram showing a sixth step of the manufacturing method according to the present invention. Referring to FIG. 26, after the etching of lower electrode layer 824, piezoelectric layer 826, and upper electrode layer 828, a second interlayer insulating film 830 is formed. Furthermore, in second interlayer insulating film 830, a contact hole 832A reaching diffusion wiring 820A, a contact hole reaching diffusion wiring 820B, a contact hole 832B reaching upper electrode layer 828, and a contact hole 832C reaching lower electrode layer 824 are formed. For convenience of drawing, the contact hole reaching diffusion wiring 820B is not shown in FIG. 26.

Contact hole 832C reaching lower electrode layer 824 and contact hole 832B reaching upper electrode layer 828 are formed at the same time by etching of second interlayer insulating film 830. If the thickness of piezoelectric layer 826 is too large, the depth of contact hole 832B and the depth of contact hole 832C greatly differ from each other. Therefore, upper electrode layer 828 is exposed to etching liquid for a long time.

Furthermore, in order to fulfill the self-diagnostic function, a prescribed thickness has to be secured for the thickness of piezoelectric layer 826. Therefore, the thickness of piezoelectric layer 826 is desirably 0.01 μm or more and 5 μm or less.

Figure 27:
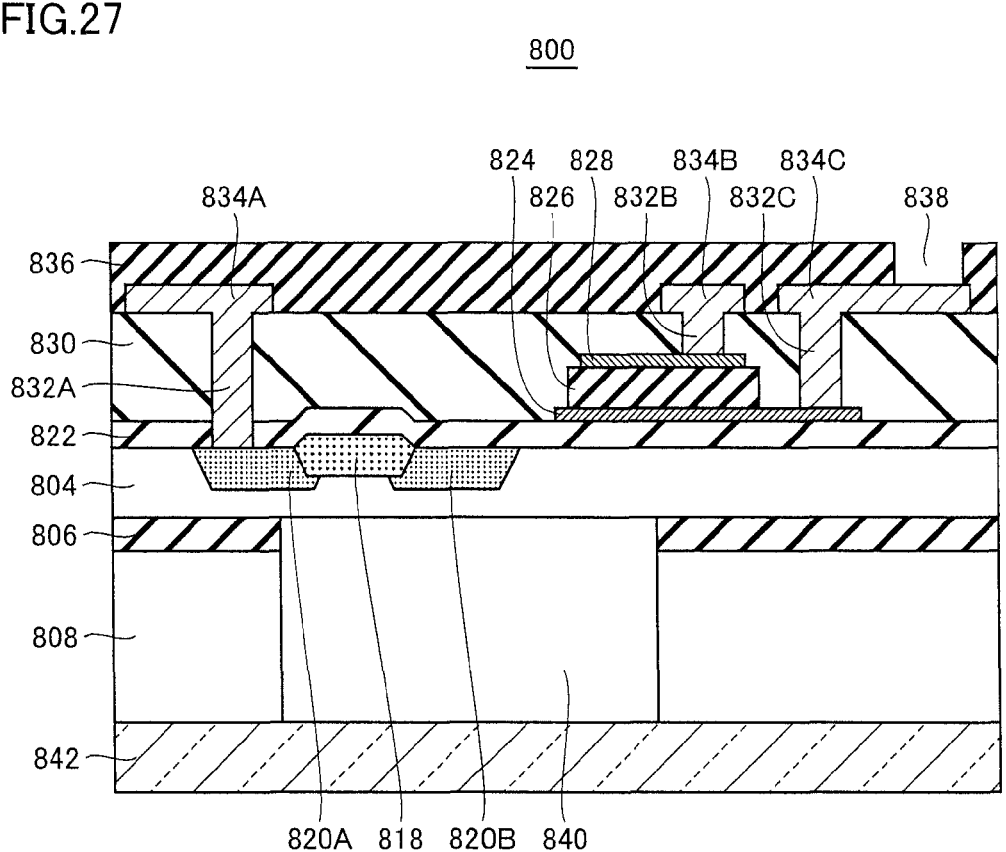
FIG. 27 is a diagram showing a seventh step of the manufacturing method according to the present invention.

FIG. 27 is a diagram showing a seventh step of the manufacturing method according to the present invention. Referring to FIG. 27, metal wiring 834A, 834B, 834C is formed on contact holes 832A, 832B, 832C and second interlayer insulating film 830. The main component of metal wiring 834A, 834B, 834C is, for example, aluminum, copper, or the like.

After the formation of metal wiring 834A, 834B, and 834C, a passivation film 836 for protecting one main surface of semiconductor pressure sensor 800 is formed. For example, an SiN film is used as passivation film 836.

An opening portion for forming a bonding pad 838 is formed in part of passivation film 836.

Next, part of the other main surface Si layer 808 and buried oxide film layer 806 is etched. A diaphragm is thus formed.

After the etching of buried oxide film layer 806, a glass substrate 842 is bonded to the bottom portion of the other main surface Si layer 808. The bonding between glass substrate 842 and the other main surface Si layer 808 is performed in a vacuum. Accordingly, the inside of a reference pressure chamber 840 formed between one main surface Si layer 804 and glass substrate 842 is a vacuum.

A method of manufacturing a semiconductor pressure sensor according to the present invention has been described above. With this manufacturing method, a semiconductor pressure sensor can be produced using conventional semiconductor device manufacturing processes.

Lower electrode layer 824, piezoelectric layer 826, and upper electrode layer 828 are formed on a different level electrically insulated from metal wiring 834A, 834B, and 834C. This can increase the flexibility of arrangement and shape of the metal wiring and the thin film piezoelectric element in the semiconductor pressure sensor.

When the thickness of piezoelectric layer 826 is 0.01 μm or more and 5 μm or less, the contact holes reaching lower electrode layer 824 and upper electrode layer 828 can be formed at the same time. This can shorten the manufacturing time of the semiconductor pressure sensor.

Fifth Embodiment

Figure 28:
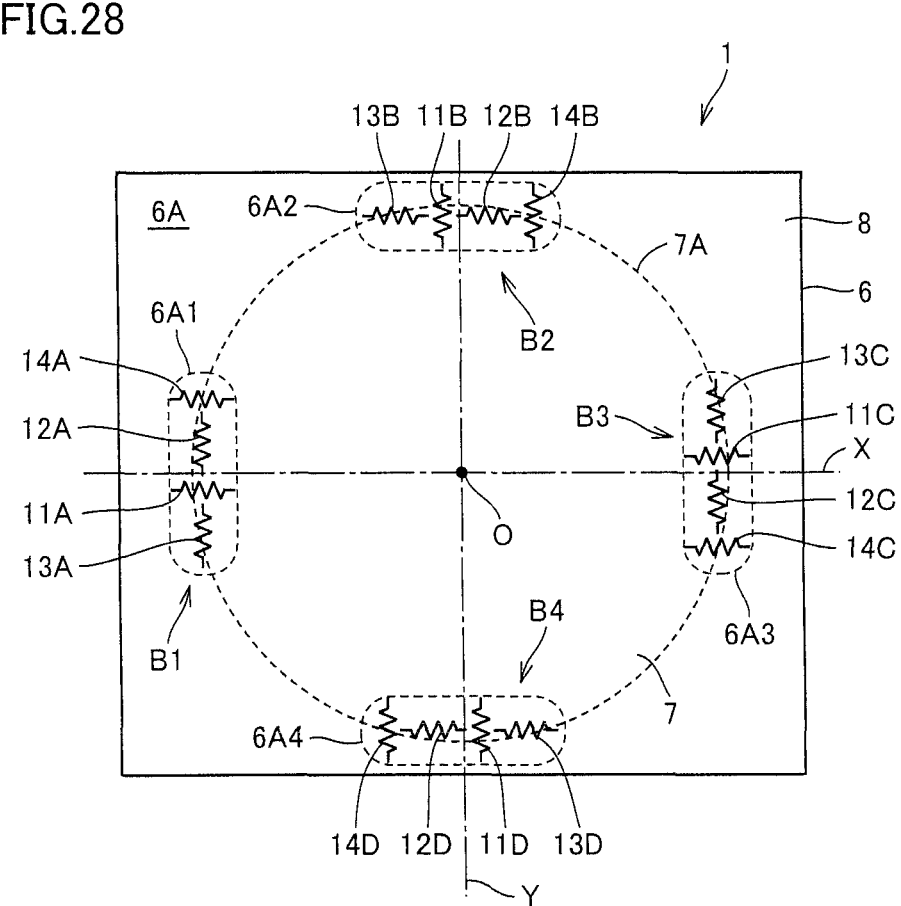
FIG. 28 is a plan view schematically showing a configuration of a sensor according to a fifth embodiment of the present invention.

FIG. 28 is a plan view schematically showing a configuration of a sensor according to a fifth embodiment of the present invention. It is noted that the same or corresponding elements as the elements shown in FIG. 1 to FIG. 4 are denoted with the same reference numerals. The following description also refers to the elements shown in FIG. 1 to FIG. 4.

Referring to FIG. 28, a sensor 1 includes a silicon substrate 6 including a diaphragm 7 and a support portion 8 for supporting an outer edge portion of diaphragm 7. Sensor 1 further includes resistance bridges B1 to B4. Each of resistance bridges B1 to B4 includes a plurality of resistor elements arranged on a main surface 6A of silicon substrate 6.

Each of resistance bridges B1 to B4 includes four resistor elements. Specifically, resistance bridge B1 includes resistor elements 11A, 12A, 13A, and 14A. Resistance bridge B2 includes resistor elements 11B, 12B, 13B, and 14B. Resistance bridge B3 includes resistor elements 11C, 12C, 13C, and 14C. Resistance bridge B4 includes resistor elements 11D, 12D, 13D, and 14D. The four resistor elements constitute a Wheatstone bridge as described in detail later. Each resistor element is a resistor element whose resistance value changes according to a pressure, for example, it is a piezoelectric element. It is noted that a diffusion resistor can be used as the resistor element as in the first to fourth embodiments.

The four resistor elements included in one resistance bridge are collectively arranged in a partial region of main surface 6A that includes part of a boundary 7A between diaphragm 7 and support portion 8. Specifically, resistor elements 11A to 14A are arranged in a region 6A1 including part of boundary 7A. Resistor elements 11B to 14B are arranged in a region 6A2 including part of boundary 7A. Resistor elements 11C to 14C are arranged in a region 6A3 including part of boundary 7A. Resistor elements 11D to 14D are arranged in a region 6A4 including part of boundary 7A.

Resistance bridges B1 and B3 are arranged on main surface 6A of silicon substrate 6 so as to oppose to each other. Similarly, resistance bridges B2 and B4 are arranged on main surface 6A of silicon substrate 6 to oppose to each other. Straight lines X and Y shown in FIG. 5 are lines passing through a central point O of diaphragm 7 and being orthogonal to each other. Resistance bridges B1 and B3 are arranged on straight line X. Resistance bridges B2 and B4 are arranged on straight line Y. Therefore, resistance bridges B1 to B4 are isotropically arranged around point O on main surface 6A of silicon substrate 6.

In this embodiment, the number of resistance bridges is not specifically limited as long as it is more than one. However, the greater is the number of resistance bridges, the larger is power consumption in a plurality of resistance bridges as a whole when a constant voltage is applied to each bridge. On the other hand, when current through a plurality of resistance bridges as a whole is controlled to be constant, the greater is the number of resistance bridges, the smaller is current flowing through one bridge. Therefore, a change of output voltage of a resistance bridge with respect to voltage applied to diaphragm 7 is reduced.

The number of resistance bridges is determined in view of the points above. For example, as shown in FIG. 28, four resistance bridges are arranged on a main surface of a semiconductor substrate. Preferably, the plurality of resistance bridges are isotropically arranged on main surface 6A of silicon substrate 6.

Figure 29:
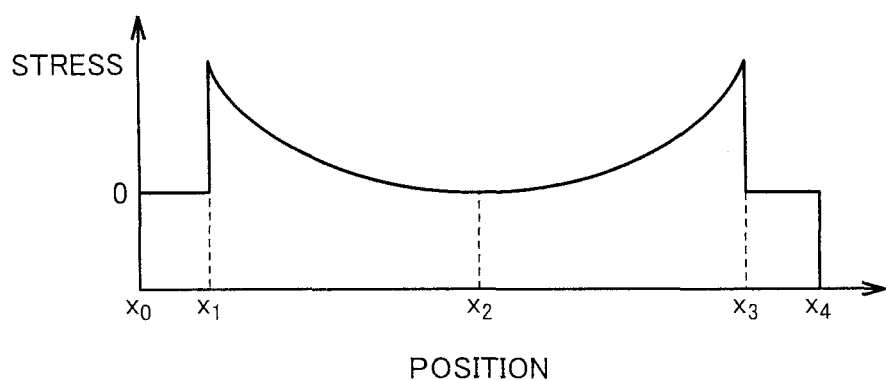
FIG. 29 is a diagram showing the relation between stress and position on a main surface 6A of a silicon substrate 6 shown in FIG. 28.

FIG. 29 is a diagram showing the relation between stress and position on main surface 6A of a silicon substrate 6 shown in FIG. 28. Referring to FIG. 29, the horizontal axis in the graph shows positions on straight line X shown in FIG. 28. A position $x_0$ is a position at one end of silicon substrate 6 (for example, an end portion of silicon substrate 6 that is located on the left side of the drawing sheet). Position $x_1$ corresponds to a position at a first intersection of straight line X and boundary 7A (the intersection located on the left side of the drawing sheet with respect to straight line Y). Position $x_2$ corresponds to a position at central point O of diaphragm 7. Position $x_3$ corresponds to a position at a second intersection of straight line X and boundary 7A (the intersection located on the right side of the drawing sheet with respect to straight line Y). Position $x_4$ shows a position at the other end of silicon substrate 6 (for example, an end portion of silicon substrate 6 that is located on the right side of the drawing sheet).

As shown in FIG. 29, the stress acting on diaphragm 7 is the largest at the outer edge portion of diaphragm 7. The stress acting on the outer edge portion of diaphragm 7 changes according to the pressure applied to diaphragm 7. The four resistor elements that constitute the resistance bridge are arranged at the outer edge portion of diaphragm 7. Therefore, the resistance value of each resistor element can greatly be changed by the pressure applied to diaphragm 7.

Figure 30:
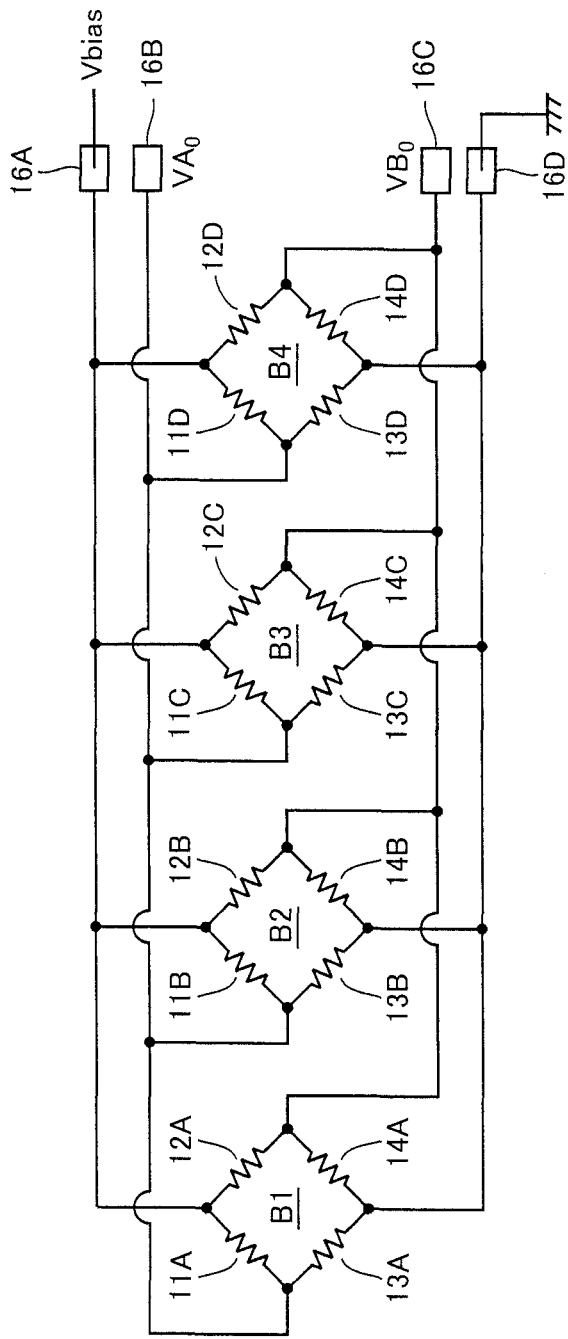
FIG. 30 is a circuit diagram of resistance bridges B1 to B4 shown in FIG. 28.

FIG. 30 is a circuit diagram of resistance bridges B1 to B4 shown in FIG. 28. Referring to FIG. 30, in this embodiment, four resistance bridges B1 to B4 electrically connected in parallel are provided on a main surface of a semiconductor substrate.

Each of four resistance bridges B1 to B4 is a Wheatstone bridge. The configurations of resistance bridges B1 to B4 are equal to each other, and therefore the configuration of resistance bridge B1 is representatively described.

Resistance bridge B1 includes resistor elements 11A to 14A. Resistor elements 11A and 13A are connected in series between an electrode 16A and an electrode 16D. Similarly, resistor elements 12A and 14A are connected in series between electrode 16A and electrode 16D. A voltage Vbias is applied to electrode 16A. Electrode 16D is grounded. The connection point between resistor elements 11A and 13A is connected to electrode 16B. The connection point between resistor elements 12A and 14A is connected to an electrode 16C. Electrodes 16A to 16D are, for example, bonding pads formed on main surface 6A of silicon substrate 6 to be connected to wiring 5.

In a state in which no pressure is applied to diaphragm 7 (that is, in a vacuum state), the resistance values of resistor elements 11A to 14A are equal to each other. In response to a change of pressure applied to diaphragm 7, the resistance values of resistor elements 11A and 14A and the resistance values of resistor elements 12A and 13A change in directions opposite to each other. Similarly, for each of resistance bridges B2 to B4, the resistance values of four resistor elements included in each bridge change according to the pressure applied to diaphragm 7.

In a state in which no pressure is applied to diaphragm 7, voltage $VA_0$ of electrode 16B and voltage $VB_0$ of electrode 16C are both ½ Vbias. With a pressure applied on diaphragm 7, the resistance values of the resistor elements in each bridge change, so that voltage $VA_0$ decreases from ½ Vbias while voltage $VB_0$ increases from ½ Vbias.

Figure 31:
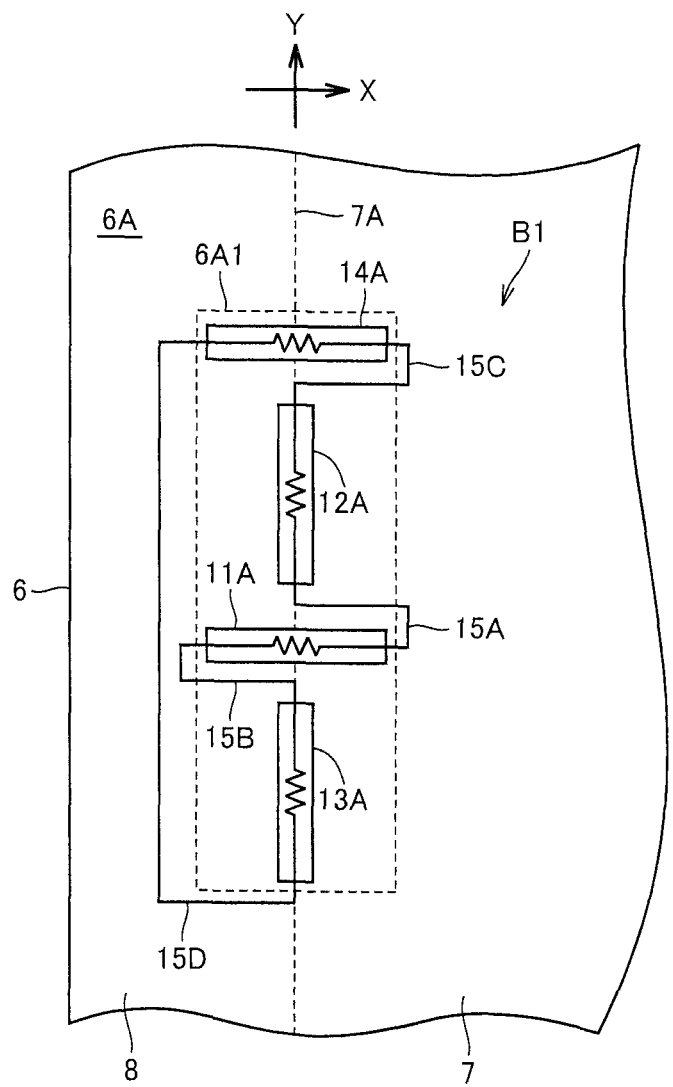
FIG. 31 is a diagram showing resistance bridge B1 shown in FIG. 28 in detail.

FIG. 31 is a diagram showing resistance bridge B1 shown in FIG. 28 in detail. The configuration of each of resistance bridges B2 to B4 is similar to the configuration of resistance bridge B1 shown in FIG. 31.

Referring to FIG. 31, resistance bridge B1 includes resistor elements 11A to 14A arranged in region 6A1 including part of boundary 7A between diaphragm 7 and support portion 8. Resistor elements 11A and 12A are arranged adjacent to each other. Resistor element 11A is electrically connected to resistor element 12A by wiring 15A.

Resistor elements 11A and 13A are arranged adjacent to each other. Resistor element 11A is electrically connected to resistor element 13A by wiring 15B.

Resistor elements 12A and 14A are arranged adjacent to each other. Resistor element 12A is electrically connected to resistor element 14A by wiring 15C.

One of the two resistor elements arranged adjacent to each other is formed in region 6A1 of main surface 6A of silicon substrate 6 so as to extend along the direction parallel to boundary 7A between diaphragm 7 and support portion 8. The other of the two resistor elements is formed in region 6A1 so as to extend along the direction crossing boundary 7A.

Specifically speaking, resistor element 13A is formed in region 6A1 of main surface 6A of silicon substrate 6 so as to extend along the direction parallel to boundary 7A. Resistor element 11A is formed in region 6A1 so as to extend along the direction crossing boundary 7A. A similar relation is established between resistor elements 11A and 12A as well as between resistor elements 12A and 14A.

In FIG. 31, boundary 7A is shown by a straight line. As shown in FIG. 28, when the outline of diaphragm 7 is circular, resistor elements 12A and 13A may be formed so as to extend along the tangent of the circle.

The two resistor elements arranged adjacent to each other are formed so as to extend along different directions with respect to the boundary. Accordingly, their resistance values can be changed in opposite directions according to the pressure applied to diaphragm 7. Therefore, a plurality of resistor elements can function as a resistance bridge.

Figure 32:
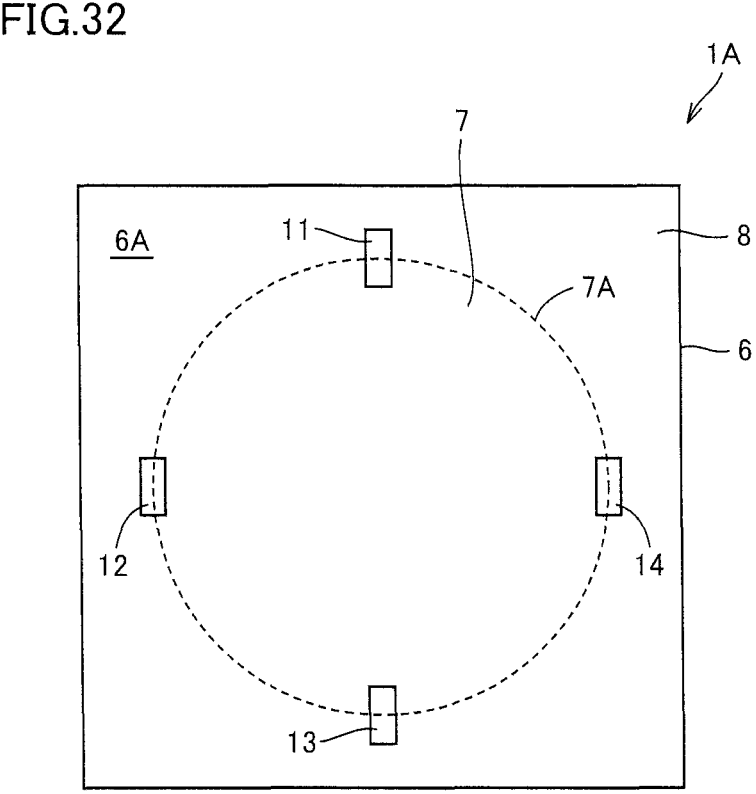
FIG. 32 is a plan view showing a configuration of a comparative example of a sensor according to the fifth embodiment.

FIG. 32 is a plan view showing a configuration of a comparative example of a sensor according to the fifth embodiment. Referring to FIG. 32, a sensor 1A includes one resistance bridge including four resistor elements 11 to 14. Resistor elements 11 to 14 are dispersively arranged on main surface 6A of silicon substrate 6. The configuration shown in FIG. 32 may increase variations in characteristic of the resistance bridge due to the processing accuracy of sensor 1A.

Figure 33:
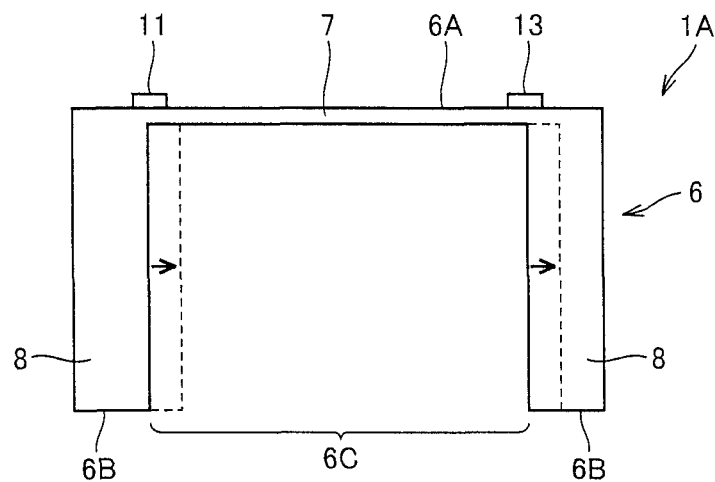
FIG. 33 is a first diagram for explaining a problem that may arise during production of a sensor 1A shown in FIG. 32.

FIG. 33 is a first diagram for explaining a problem that may arise during production of sensor 1A shown in FIG. 32. Referring to FIG. 33, resistor elements 11 to 14 are formed on main surface 6A of silicon substrate 6 having diaphragm 7. It is noted that FIG. 33 only shows resistor elements 11 and 13 among four resistor elements.

An opening portion 6C is formed in a main surface 6B (back surface) located opposite to main surface 6A. Opening portion 6C is formed in main surface 6B by performing etching (either anisotropic etching or isotropic etching) on main surface 6B.

Resistor elements 11 and 13 are preferably arranged to overlap with boundary 7A between diaphragm 7 and support portion 8. In general, resistor elements are arranged on main surface 6A of silicon substrate 6 before diaphragm 7 and support portion 8 are formed. Therefore, the position of opening portion 6C of main surface 6B may be shifted with respect to the positions of resistor elements 11 to 14 on main surface 6A. The degree of the positional shift depends on the processing accuracy of the sensor. When the degree of the shift is great, the sensitivity of the resistance bridge, that is, the ratio of voltage change to pressure applied to the diaphragm may vary. Accordingly, the detection accuracy of the sensor deteriorates.

Figure 34:
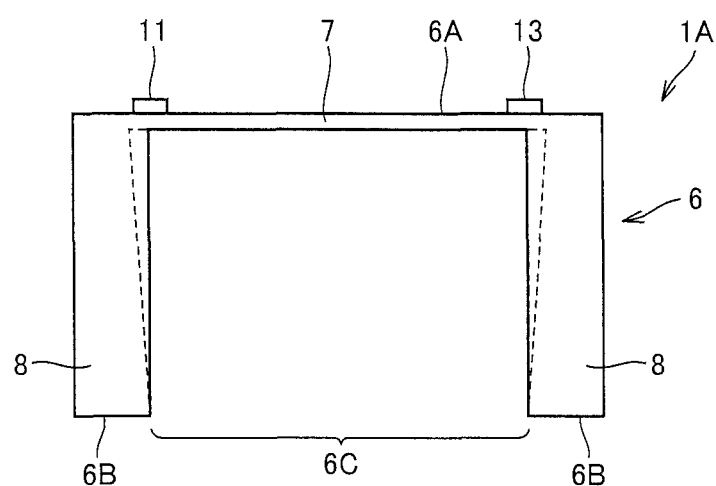
FIG. 34 is a second diagram for explaining a problem that may arise during production of sensor 1A shown in FIG. 32.

FIG. 34 is a second diagram for explaining a problem that may arise during production of sensor 1A shown in FIG. 32. Referring to FIG. 34, silicon is etched in a direction from main surface 6B of silicon substrate 6 toward main surface 6A. The interior of silicon substrate 6 is processed in a tapered shape. Therefore, the positions of resistor elements 11 to 14 may be shifted with respect to the position of the boundary between diaphragm 7 and support portion 8.

Returning to FIG. 31, in this embodiment, a plurality of resistor elements that constitute a resistance bridge are collectively arranged in one region. Resistor elements 11A to 14A are resistors of the same kind and are formed through the same process step. Since resistor elements 11A to 14A are collectively arranged in one region, an increase of variations in characteristics (for example, resistance value, temperature characteristics, and the like) among resistor elements 11A to 14A can be prevented. As a result, the balance state of resistance bridge B1 can be achieved in a state in which no pressure is applied to the diaphragm.

The resistance values of resistor elements may vary among a plurality of sensors. However, if variations in resistance value among a plurality of resistor elements included in one resistance bridge are small, the balance state of the resistance bridge can be achieved. Therefore, variations in characteristics of resistance bridges among a plurality of sensors can be reduced.

Furthermore, in this embodiment, a first resistor element and a second resistor element electrically connected to the first resistor element are arranged adjacent to each other. Because of the adjacent arrangement of two resistor elements electrically connected to each other, the changing directions of resistance values of the two resistor elements can be equal to each other even if a positional shift of the boundary between diaphragm 7 and support portion 8 occurs. Accordingly, variations in characteristics of the resistance bridge can be reduced. In addition, the wiring for connecting two resistor elements can be shortened.

Furthermore, in this embodiment, the sensor includes a plurality of resistance bridges electrically connected in parallel. If boundary 7A is shifted in at least one of X and Y directions with respect to resistance bridge B1, the characteristics of each of resistance bridges B1 to B4 vary. However, since a plurality of resistance bridges are electrically connected in parallel, the variations in characteristics of one resistance bridge are cancelled by variations in characteristics of the other resistance bridges. As a result, variations in characteristics of resistance bridges can be reduced among a plurality of sensors.

It is noted that in the fifth embodiment, the shape of diaphragm 7, that is, the thin region is not limited to a circular shape. Similar to the first to fourth embodiments, the shape of the diaphragm (thin region) may be approximately square.

Sixth Embodiment

This embodiment relates to a circuit for processing a signal output from a semiconductor pressure sensor. This signal processing circuit can be combined with any one of the semiconductor pressure sensors according to the foregoing first to fifth embodiments.

Figure 35:
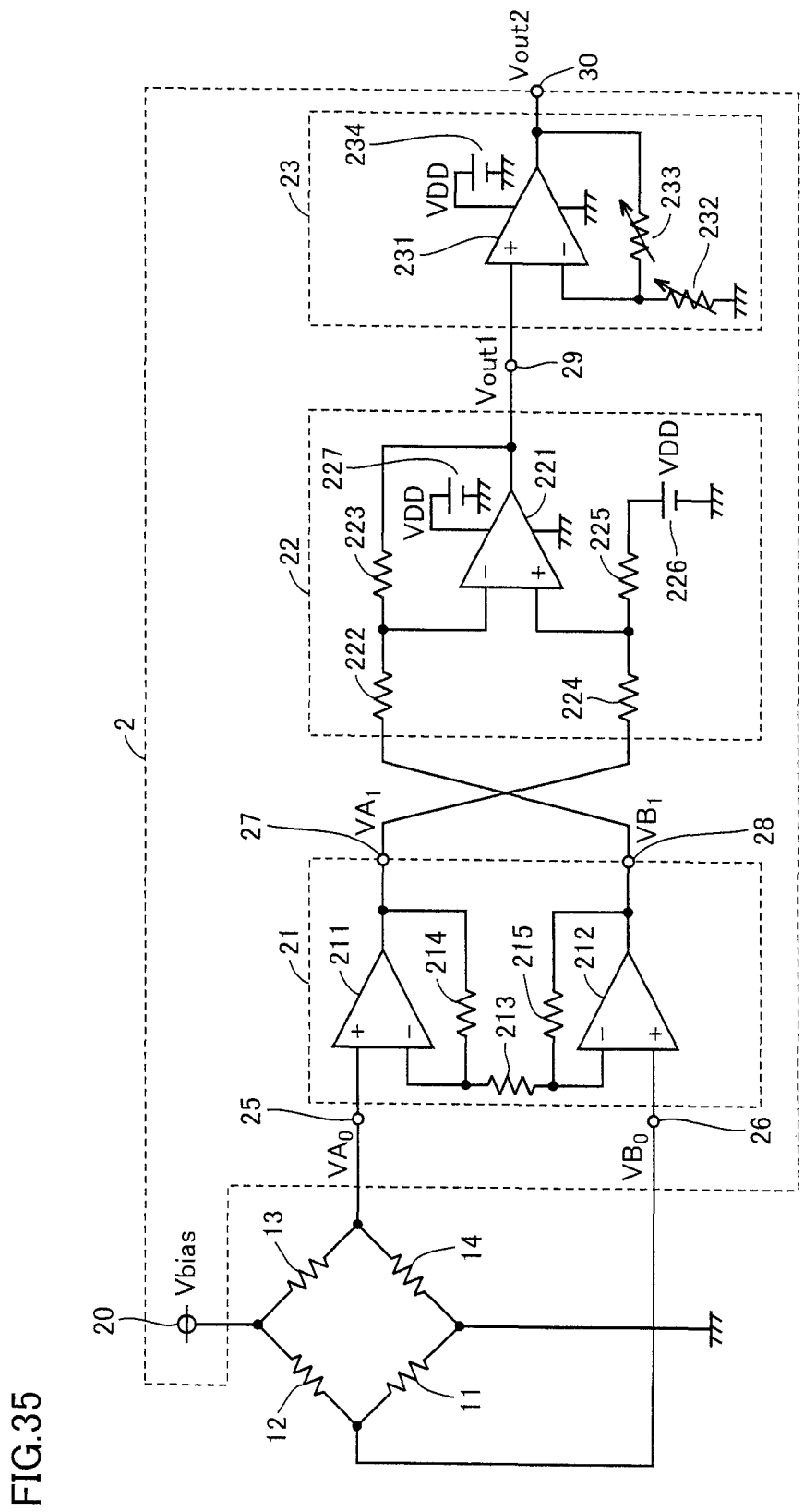
FIG. 35 is a circuit diagram of a signal processing circuit according to a sixth embodiment.

FIG. 35 is a circuit diagram of a signal processing circuit according to a sixth embodiment. Referring to FIG. 35, resistor elements 11 to 14 constitute a Wheatstone bridge. Specifically speaking, resistor elements 11 and 12 are connected in series between a node 20 and a ground node. Similarly, resistor elements 13 and 14 are connected in series between node 20 and the ground node. Voltage Vbias is applied to node 20. The connection point between resistor elements 13 and 14 is connected to a node 25. The connection point between resistor elements 11 and 12 is connected to a node 26. Resistor elements 11 to 14 correspond to, for example, diffusion resistors 406, 408, 410, and 412 shown in FIG. 5. Alternatively, resistor elements 11 to 14 may be replaced by resistance bridges B1 to B4 shown in FIG. 30, respectively.

Signal processing circuit 2 includes an amplification unit 21, and operation units 22 and 23. Amplification unit 21 includes differential amplifiers 211, 212 and resistors 213, 214, 215.

Differential amplifier 211 includes a non-inverting input terminal (shown by a symbol "+", which is applicable in the following description) connected to node 25, an inverting input terminal (shown by a symbol "−", which is applicable in the following description) connected to both of one end of resistor 213 and one end of resistor 214, and an output terminal connected to a node 27. The other end of resistor 214 as well as the output terminal of differential amplifier 211 is connected to node 27.

Differential amplifier 212 includes a non-inverting input terminal connected to node 26, an inverting input terminal connected to both of the other end of resistor 213 and one end of resistor 215, and an output terminal connected to a node 28. The other end of resistor 215 as well as the output terminal of differential amplifier 212 is connected to node 28.

Operation unit 22 includes a differential amplifier 221, resistors 222 to 225, an offset power supply 226, and a driving power supply 227.

Differential amplifier 221 operates with a power supply voltage VDD supplied from driving power supply 227. Resistor 222 is connected between node 28 and the inverting input terminal of differential amplifier 221. Resistor 223 is connected between the inverting input terminal of differential amplifier 221 and the output terminal of differential amplifier 221. Resistor 224 is connected between node 27 and the non-inverting input terminal of differential amplifier 221. Resistor 225 is connected between the non-inverting input terminal of differential amplifier 221 and offset power supply 226.

Offset power supply 226 generates voltage VDD. In the configuration shown in FIG. 35, offset power supply 226 and driving power supply 227 are shown as power supplies independent from each other, but they may be a common one power supply.

Operation unit 23 includes a differential amplifier 231, resistors 232, 233, and a driving power supply 234. Differential amplifier 221 operates with power supply voltage VDD supplied from driving power supply 234. Differential amplifier 221 includes a non-inverting input terminal connected to a node 29, an inverting input terminal connected to one end of resistor 232 and one end of resistor 233, and an output terminal connected to a terminal 30. The other end of resistor 233 as well as the output terminal of differential amplifier 231 is connected to terminal 30. Each of resistors 232 and 233 is a variable resistor. Therefore, the resistance values of resistors 232 and 233 are variable.

Next, an operation of signal processing circuit 2 will be described in detail. Voltage $VA_0$ at node 25 and voltage $VB_0$ at node 26 change with changes of resistance values of resistor elements 11 to 14. In other words, voltages $VA_0$ and $VB_0$ change according to the pressure applied to diaphragm 7. When no pressure is applied to diaphragm 7, voltages $VA_0$ and $VB_0$ are both ½ Vbias. With a pressure applied to diaphragm 7, voltages $VA_0$ and $VB_0$ change from ½ Vbias.

Figure 36:
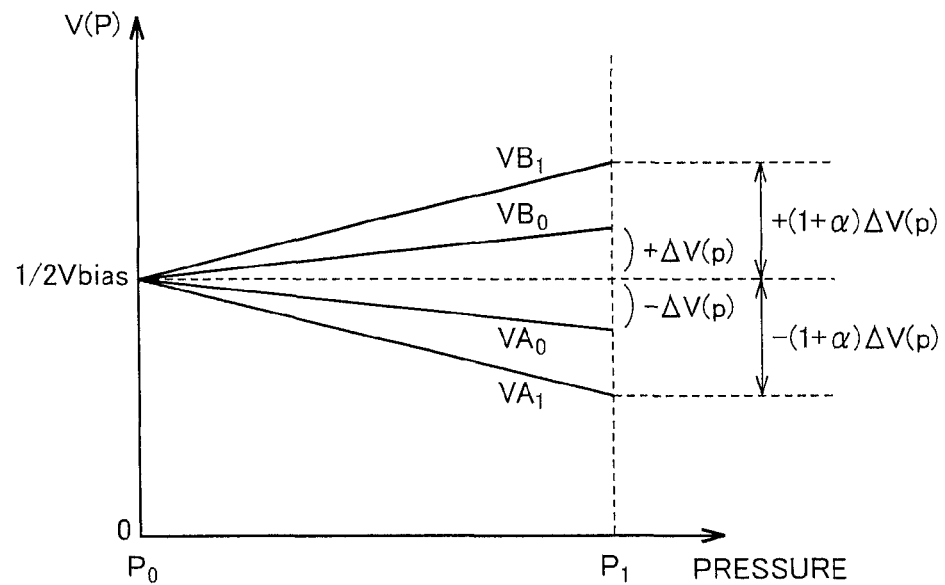
FIG. 36 is a diagram showing the relation between pressure applied to the diaphragm and voltage output from a Wheatstone bridge.

FIG. 36 is a diagram showing the relation between pressure applied to the diaphragm and voltage output from the Wheatstone bridge. Referring to FIG. 36, when the pressure applied to diaphragm 7 is $P_0$, voltage V(P) is ½ Vbias. Pressure $P_0$ is equal to the reference pressure.

As the pressure applied to diaphragm 7 increases from $P_0$, voltage $VA_0$ decreases from ½ Vbias. On the other hand, voltage $VB_0$ rises from ½ Vbias as the pressure applied to diaphragm 7 increases. The increase amount of voltage $VB_0$ with respect to pressure P and the decrease amount of voltage $VA_0$ with respect to pressure P are equal. Therefore, voltage $VB_0$ is represented as $VB_0$=½ Vbias+$\Delta V(P)$, and voltage $VA_0$ is represented as $VA_0$=½ Vbias−$\Delta V(P)$. $\Delta V(P)$ changes according to pressure P. The difference between voltages $VB_0$ and $VA_0$ is $2\Delta V(P)$. The voltage difference between voltages $VB_0$ and $VA_0$ is equivalent to the signal voltage output from sensor 1.

Amplification unit 21 amplifies the voltage corresponding to the difference between voltages $VB_0$ and $VA_0$. The amplification degree (gain) of amplification unit 21 is represented as α. Amplification degree α is determined according to the resistance values of resistors 213 to 215. The resistance value of resistor 213 is denoted by $R_1$, and the resistance value of each of resistors 214 and 215 is denoted by $R_2$. The amplification degree α is represented as $α=R_2/R_1$.

Voltage $VB_1$ at node 28 is represented as $VB_1$=½ Vbias+$(1+α)\Delta V(P)$. On the other hand, voltage $VA_1$ at node 27 is represented as $VA_1$=½ Vbias−$(1+α)$ $\Delta V(P)$. The difference between voltages $VB_0$ and $VA_0$ is $2(1+α)$ $\Delta V(P)$. In other words, amplification unit 21 amplifies the signal voltage output from sensor 1 and outputs the amplified voltage.

Pressure $P_1$ is an upper limit value in a range of pressure that is detected by sensor 1. In this embodiment, the detection range of sensor 1 is determined as follows. Specifically, the detection range includes the value of the standard atmosphere (about 101.3 [kPa]), and pressure $P_1$ is located in the neighborhood of the standard atmosphere. The value of pressure $P_1$ is, for example, 110 [kPa]. In this embodiment, pressure sensor apparatus 10 is used, for example, as a barometric pressure sensor. Therefore, the range of pressure actually detected by pressure sensor apparatus 10 is the range in the neighborhood of the upper limit value of the detection range of sensor 1.

Returning to FIG. 35, operation unit 22 generates a voltage Vout1 changing according to the pressure applied to diaphragm 7, based on voltages $VA_1$ and $VB_1$. Specifically, operation unit 22 generates voltage Vout1 by subtracting the voltage proportional to the difference between voltages $VA_1$ and $VB_1$ from offset voltage VDD.

Figure 37:
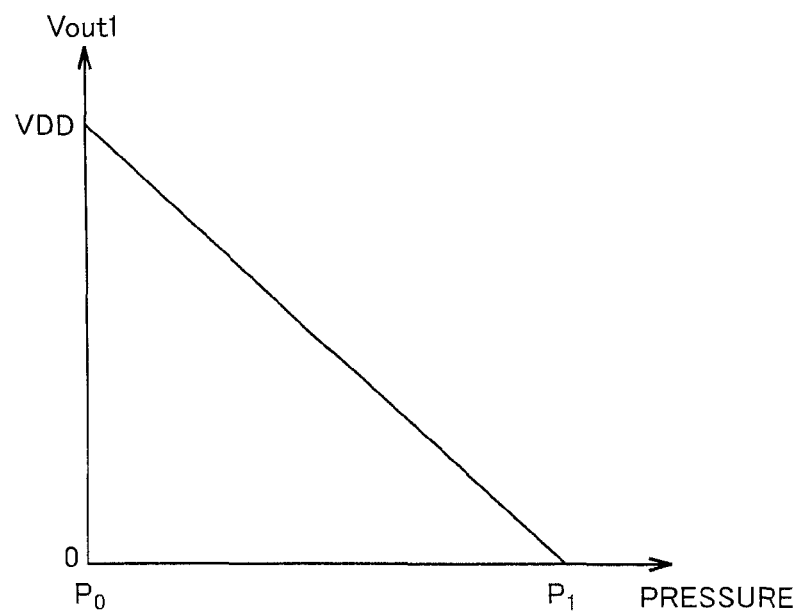
FIG. 37 is a diagram showing the relation between pressure applied to the diaphragm and a voltage Vout1 output from an operation unit 22 of signal processing circuit 2.

FIG. 37 is a diagram showing the relation between pressure applied to the diaphragm and voltage Vout1 output from operation unit 22 of signal processing circuit 2. Referring to FIG. 37, voltage Vout1 at pressure $P_0$ is VDD, and voltage Vout1 at pressure $P_1$ is zero. The decrease amount of voltage Vout1 is proportional to the increase amount of the pressure. In this embodiment, the resistance values of resistors 222 and 224 are both $R_3$, and the resistance values of resistors 223 and 225 are both $R_4$. Voltage Vout1 is represented according to the following equation:

$$Vout1 = VDD - R_4/R_3(VB_1 - VA_1).$$

In this manner, in this embodiment, voltage Vout1 is generated by subtracting the voltage proportional to output voltage ($VB_1 - VA_1$) of amplification unit 21 from offset voltage (VDD). The factor of proportionality ($R_4/R_3$) is determined such that voltage Vout1 at pressure $P_1$ is zero.

Voltage Vout1 takes a value in the vicinity of zero, in the region in the neighborhood of pressure $P_1$. Accordingly, the sensitivity of the pressure sensor apparatus in the region in the neighborhood of pressure $P_1$ can be enhanced. In this description, "sensitivity" means a ratio of the amount of change of voltage to the range of pressure. If the range of pressure is from $P_0$ to pressure $P_1$, the sensitivity of the pressure sensor apparatus is represented as $VDD/(P_1-P_0)$.

Operation unit 22 is configured to generate a voltage having a prescribed correlation with the voltage output from amplification unit 21. The "prescribed correlation" is such a relation in that the voltage generated by operation unit 22 is uniquely determined based on the voltage output from amplification unit 21. Therefore, the correlation is not limited to a proportional relation.

Referring to FIG. 35 again, operation unit 23 outputs a voltage Vout2 from terminal 30 by amplifying voltage Vout1. The resistance value of resistor 232 is denoted by $R_5$, and the resistance value of resistor 233 is denoted by $R_6$. Voltage Vout2 is represented according to the following equation:

$$Vout2=(R_5+R_6)/R_5 \times Vout1.$$

In general, a differential amplifier cannot output a voltage higher than a power supply voltage. Therefore, the maximum value of voltage Vout2 is VDD.

Figure 38:
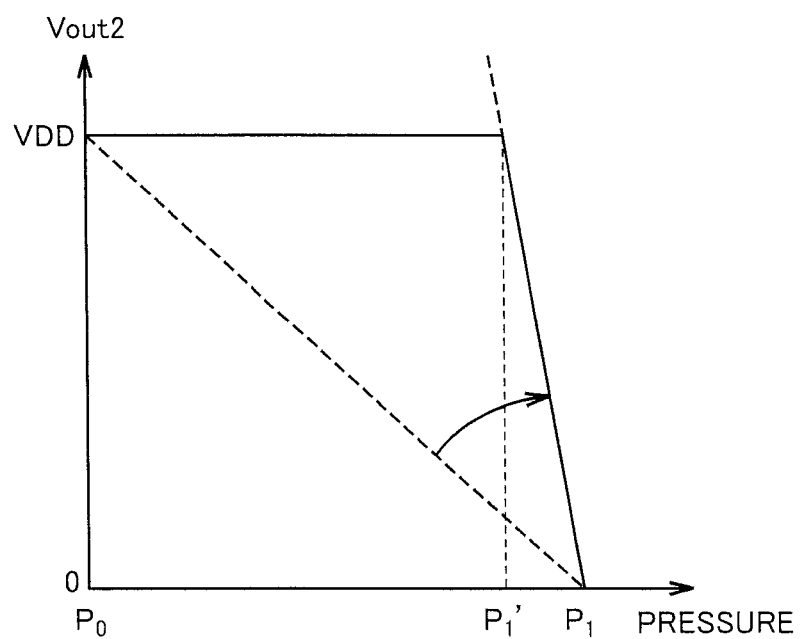
FIG. 38 is a diagram showing the relation between pressure applied to the diaphragm and a voltage Vout2 output from an operation unit 23 of signal processing circuit 2.

FIG. 38 is a diagram showing the relation between pressure applied to the diaphragm and voltage Vout2 output from operation unit 23 of signal processing circuit 2. Referring to FIG. 38, below pressure P1', voltage Vout2 is VDD. As the pressure increases from $P_1'$, voltage Vout2 decreases from voltage VDD. Voltage Vout2 is zero at pressure $P_1$.

Operation unit 23 differentiates the rate of change of voltage Vout2 from the rate of change of voltage Vout1. Here, the "rate of change" means the absolute value of the ratio of the amount of change of voltage to the amount of change of pressure. More specifically, operation unit 23 makes the rate of change of voltage Vout2 greater than the rate of change of voltage Vout1. This can enhance the detection sensitivity of the pressure sensor apparatus in the region in the vicinity of the upper limit value of the detection range. Both resistors 232 and 233 are variable resistors. The rate of change of voltage Vout2 can be modified by changing the resistance value of at least one of resistors 232 and 233. In other words, the sensitivity can be adjusted.

In a case where the signal processing circuit is configured such that the higher is the pressure applied to the sensor (diaphragm), the greater is the output voltage, it is not easy to enhance the sensitivity of the pressure sensor apparatus in the region in the vicinity of the upper limit value of the detection range. This point will be described with a comparative example of the signal processing circuit according to the sixth embodiment.

Figure 39:
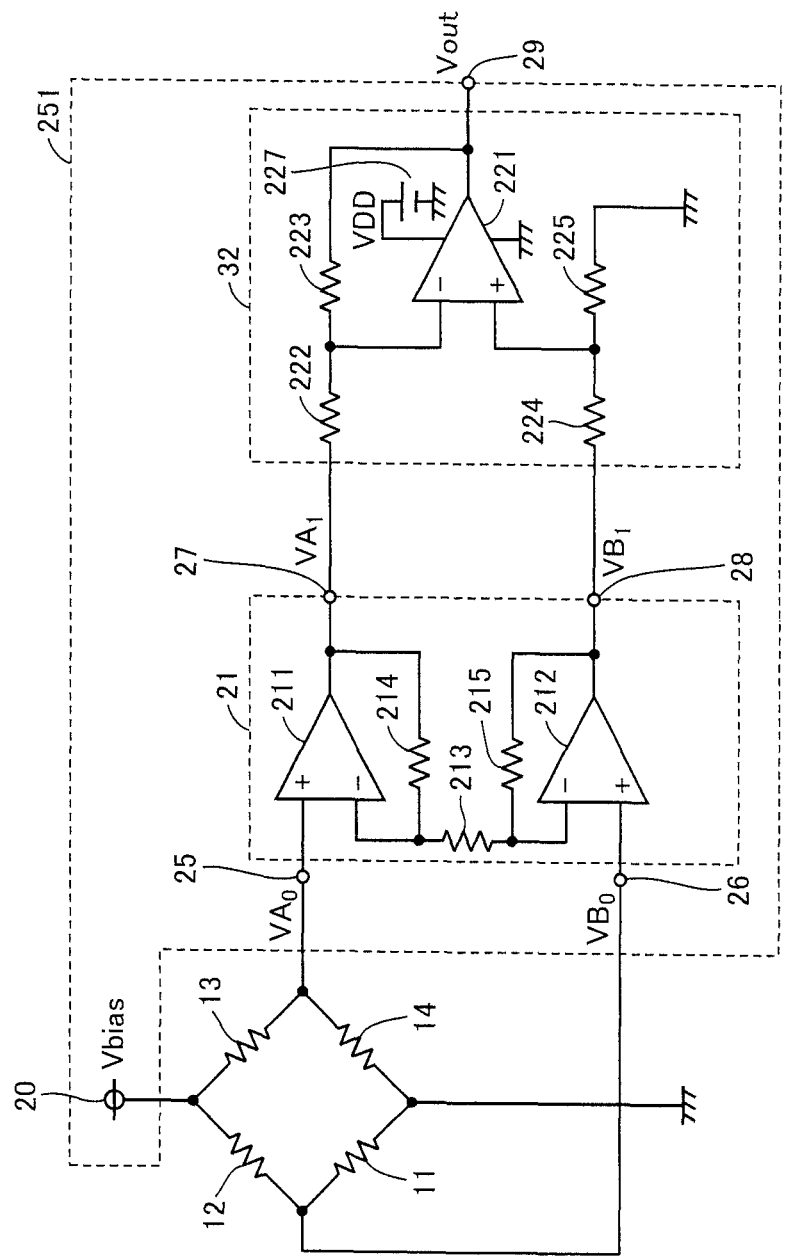
FIG. 39 is a circuit diagram showing a configuration of a comparative example of a signal processing circuit according to the sixth embodiment.

FIG. 39 is a circuit diagram showing a configuration of a comparative example of the signal processing circuit according to the sixth embodiment. Referring to FIG. 39, a signal processing circuit 251 differs from signal processing circuit 2 in that it includes an operation unit 32 in place of operation unit 22 and it does not include operation unit 23. One end of resistor 222 is connected to node 27, and one end of resistor 224 is connected to node 28. In this respect, operation unit 32 is different from operation unit 22. In addition, operation unit 32 differs from operation unit 22 in that it does not include offset power supply 226 and one end of resistor 225 is grounded. Operation unit 32 output a voltage Vout.

Figure 40:
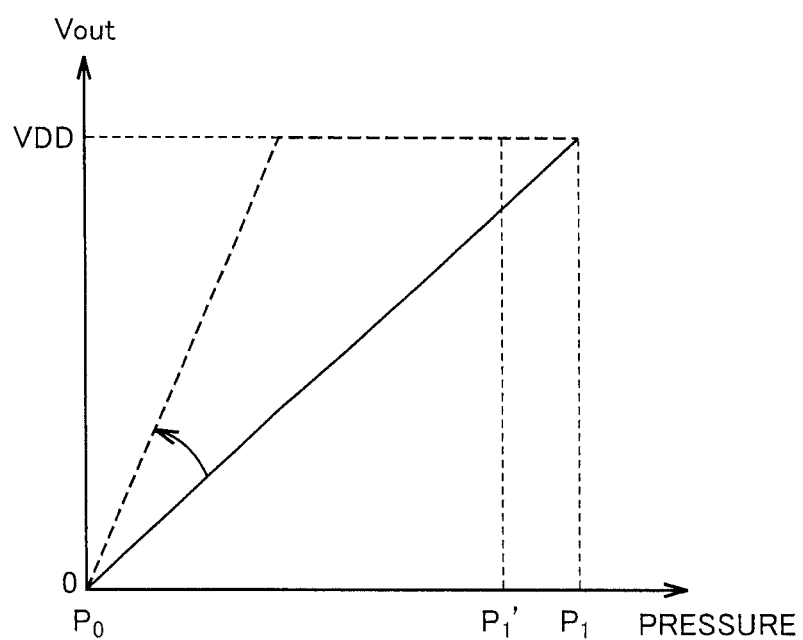
FIG. 40 is a diagram showing the relation between pressure applied to the diaphragm and a voltage Vout output from an operation unit 32 of a signal processing circuit 251.

FIG. 40 is a diagram showing the relation between pressure applied to the diaphragm and voltage Vout output from operation unit 32 of signal processing circuit 251. Referring to FIG. 40, voltage Vout is zero at pressure $P_0$ and is proportional to the pressure. At pressure $P_1$, voltage Vout is VDD. In the configuration shown in FIG. 40, the maximum sensitivity of the pressure sensor apparatus is $VDD/(P_1-P_0)$. The sensitivity of the pressure sensor apparatus in the range from pressure $P_1'$ to pressure $P_1$ cannot be made higher than the above-noted sensitivity.

In order to enhance the sensitivity of the pressure sensor apparatus, for example, operation unit 23 having the configuration shown in FIG. 35 may be connected to the output of operation unit 32 shown in FIG. 39. However, as shown in FIG. 40, the sensitivity of the pressure sensor apparatus increases for pressures in a range in which the upper limit value is smaller than $P_1'$. On the other hand, in the range from pressure $P_1'$ to pressure $P_1$, Vout is constant. In other words, the sensitivity of the pressure sensor apparatus decreases in this range.

Figure 41:
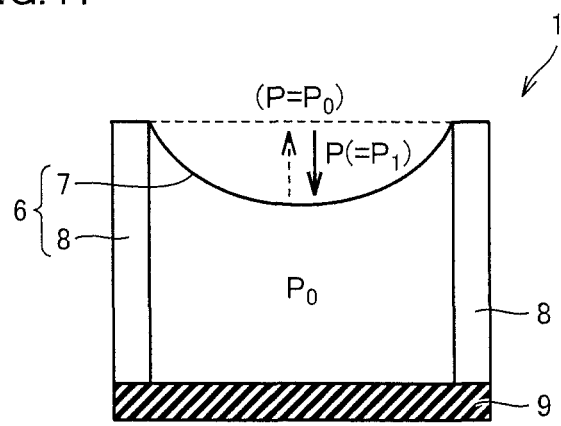
FIG. 41 is a cross-sectional view schematically showing a state of a sensor 1 included in a pressure sensor apparatus 10.

FIG. 41 is a cross-sectional view schematically showing a state of sensor 1 included in pressure sensor apparatus 10. Referring to FIG. 41, the pressure in the inside of sensor 1 (reference pressure) is $P_0$. In this embodiment, the inside of sensor 1 is almost a vacuum. Therefore, the value of pressure $P_0$ is almost zero.

As pressure (atmospheric pressure) P is higher than $P_0$, diaphragm 7 is deformed by the pressure from the outside of sensor 1. On the other hand, when the environment surrounding sensor 1 is also a vacuum, that is, when pressure P applied to sensor 1 is $P_0$, strain of diaphragm 7 is not produced. Therefore, diaphragm 7 moves as shown by the solid arrow and the dashed arrow in accordance with pressure P.

In the configuration shown in FIG. 39, the voltage corresponding to the state of diaphragm 7 where pressure $P=P_0$ is the reference voltage of pressure sensor apparatus 10. In other words, when the internal pressure of sensor 1 and the external pressure of sensor 1 are equal, the output voltage of pressure sensor apparatus 10 is the reference voltage (0). However, when the pressure sensor apparatus is used as a barometric pressure sensor, a situation in which pressure P applied to sensor 1 (diaphragm 7) changes in the neighborhood of $P_0$ does not occur.

Furthermore, the output voltage of the pressure sensor apparatus attains a voltage close to the upper limit (VDD) in the range from pressure $P_1'$ to pressure $P_1$. Therefore, with the configuration shown in FIG. 39, it is difficult to enhance the sensitivity of the pressure sensor apparatus in the above-noted range.

In this embodiment, the voltage corresponding to a state of diaphragm 7 where pressure $P=P_1$ is set as the reference voltage of pressure sensor apparatus 10. Then, the output voltage of the pressure sensor apparatus is changed from the reference voltage as the state of diaphragm 7 changes with pressure P. Accordingly, the sensitivity of the pressure sensor apparatus can be increased in the desired region including the standard atmosphere.

Figure 42:
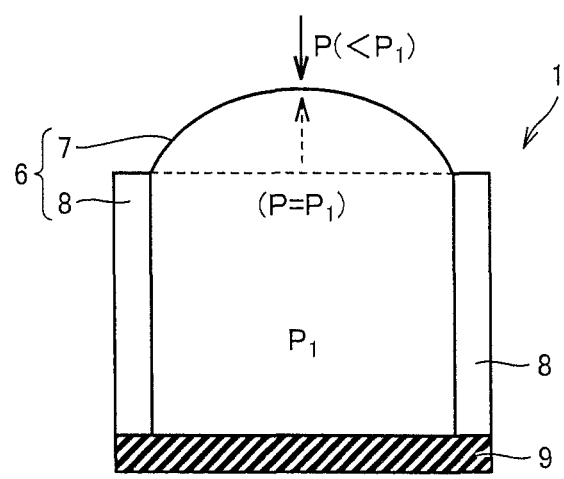
FIG. 42 is a cross-sectional view schematically showing a possible example of the sensor.

The relation between voltage and pressure shown in FIG. 37 can be obtained by using a sensor having a structure different from the structure shown in FIG. 41, for example. FIG. 42 is a cross-sectional view schematically showing a possible example of a sensor. Referring to FIG. 42, the internal pressure of sensor 1 is equal to the upper limit value ($P_1$) of the detection range of sensor 1. The atmospheric pressure (pressure P) surrounding sensor 1 is smaller than the internal pressure $P_1$ of sensor 1. Therefore, diaphragm 7 is deformed so as to protrude toward the outside of semiconductor pressure sensor 1.

Similarly to the foregoing explanation, when the internal pressure of sensor 1 and the external pressure of sensor 1 are equal, the output voltage of pressure sensor apparatus 10 is the reference voltage (0). Therefore, when pressure $P=P_1$, the output voltage of pressure sensor apparatus 10 is the reference voltage. Pressure P changes to be smaller than pressure $P_1$. As a result, the output voltage of pressure sensor apparatus 10 can be changed in accordance with the relation shown in FIG. 37.

However, it is not easy to manufacture semiconductor pressure sensor 1 such that the internal pressure of semiconductor pressure sensor 1 is exactly $P_1$. Therefore, the inside of semiconductor pressure sensor 1 is generally a vacuum as shown in FIG. 41. According to the present embodiment, when such a general pressure sensor is used as a barometric pressure sensor, the sensitivity in the desired region including the standard atmosphere can be increased.

It is noted that the signal processing circuit according to this embodiment is not limited to the one having the configuration shown in FIG. 35. Modifications of the signal processing circuit according to the present embodiment will be described below.

Figure 43:
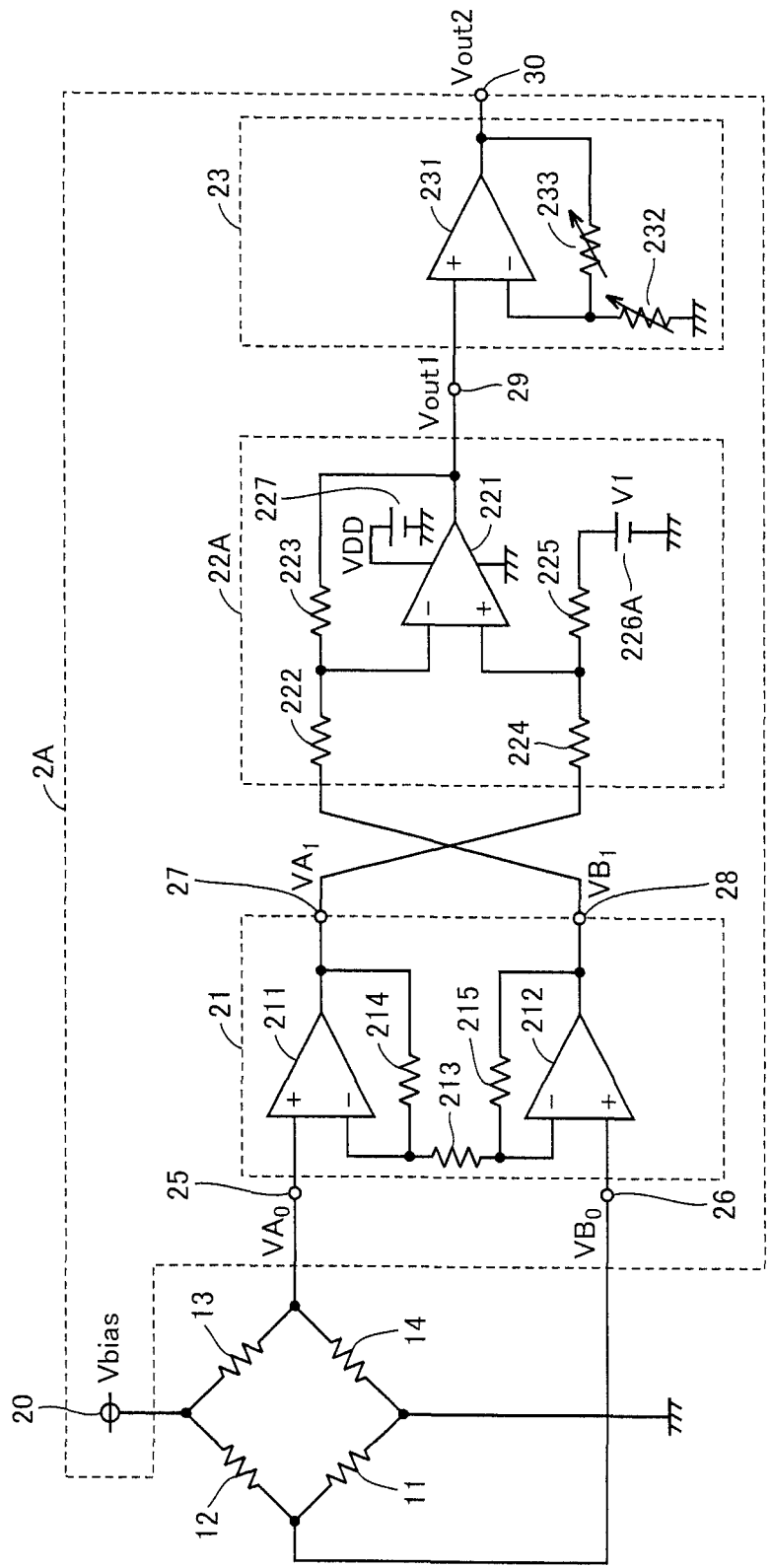
FIG. 43 is a diagram showing a first modification of the signal processing circuit according to the sixth embodiment.

FIG. 43 is a diagram showing a first modification of the signal processing circuit according to the sixth embodiment. Referring to FIG. 43, a signal processing circuit 2A differs from signal processing circuit 2 in that it includes an operation unit 22A in place of operation unit 22. Operation unit 22A differs from operation unit 22 in that it includes an offset power supply 226A in place of offset power supply 226. The configuration of the rest of signal processing circuit 2A is similar to the configuration of the corresponding part of signal processing circuit 2.

Offset power supply 226A generates an offset voltage V1. Voltage V1 is a voltage lower than power supply voltage VDD of differential amplifier 221.

Figure 44:
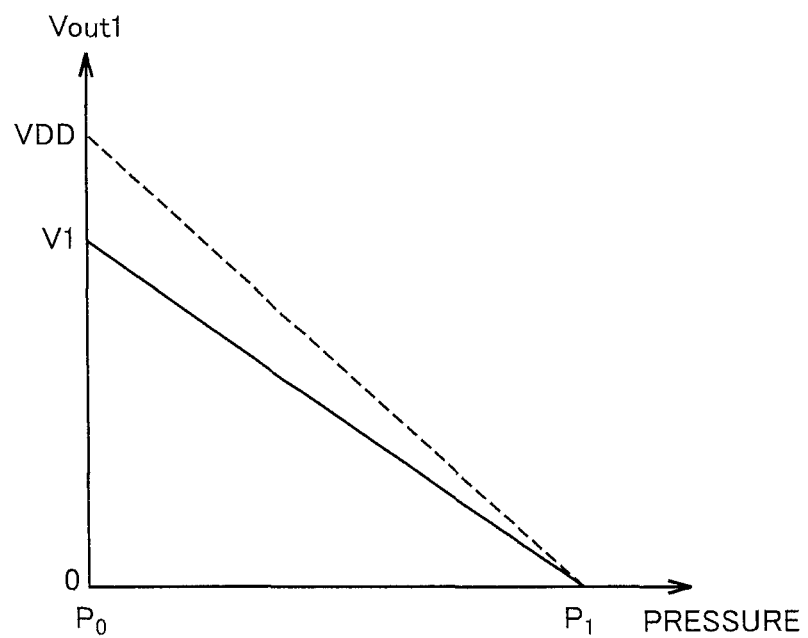
FIG. 44 is a diagram for explaining voltage Vout1 output from an operation unit 22A shown in FIG. 43.

FIG. 44 is a diagram for explaining voltage Vout1 output from operation unit 22A shown in FIG. 43. Referring to FIG. 44, voltage Vout1 is V1 at pressure $P_0$ and reaches zero at pressure $P_1$. Voltage Vout1 decreases in proportion to the pressure. It is noted that the factor of proportionality is determined by the ratio between resistance value $R_3$ of resistors 222, 224 and resistance value $R_4$ of resistors 223, 225. Here, $R_4/R_3 = V1/(P_1 - P_0)$ holds.

Also in the configuration shown in FIG. 43, voltage Vout1 is a voltage in the vicinity of zero in a region close to the upper limit value (pressure $P_1$) of the detection range of semiconductor pressure sensor 1. Therefore, it is possible to increase the sensitivity of the pressure sensor apparatus in a region close to pressure $P_1$.

Figure 45:
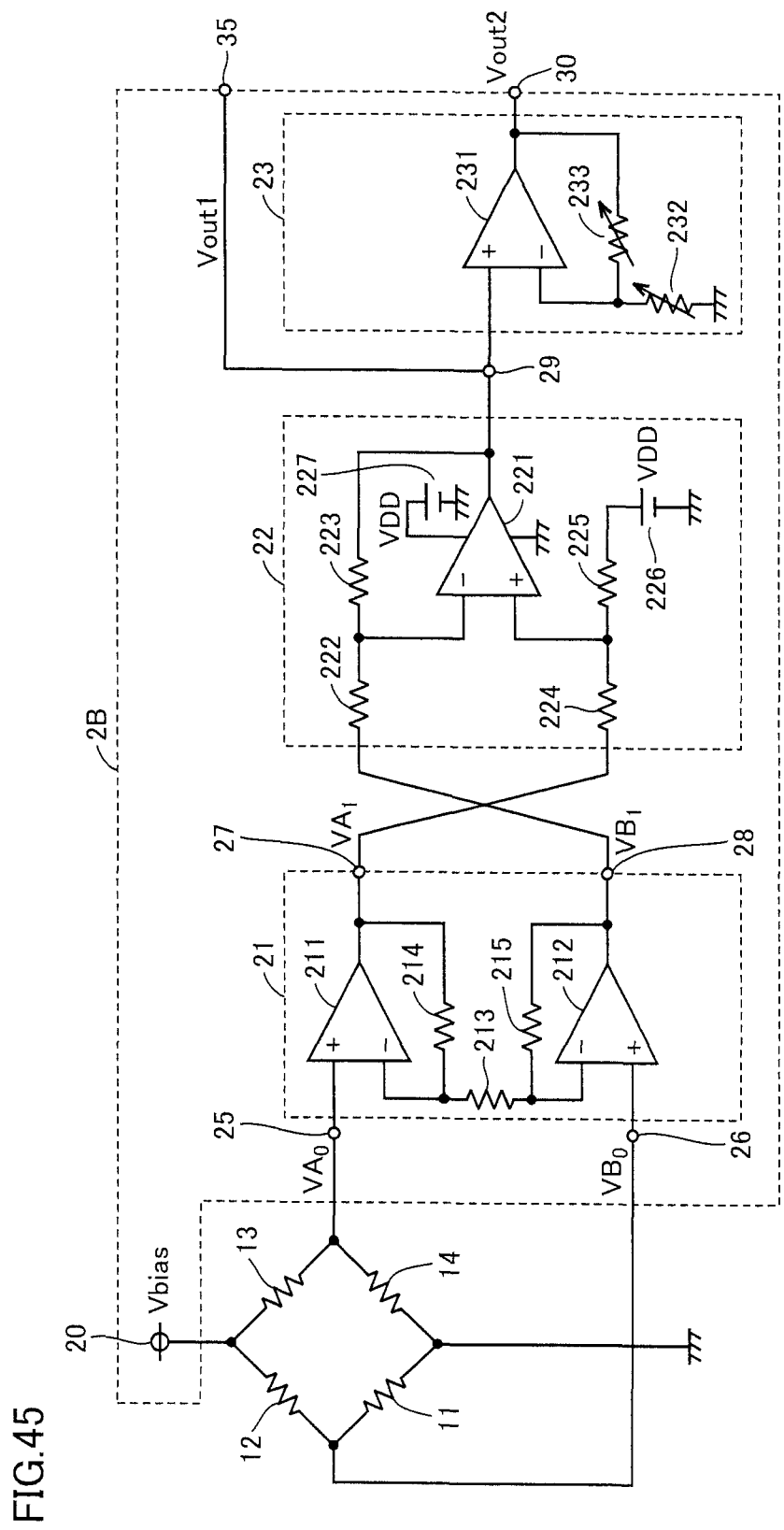
FIG. 45 is a diagram showing a second modification of the signal processing circuit according to the sixth embodiment.

FIG. 45 is a diagram showing a second modification of the signal processing circuit according to the sixth embodiment. Referring to FIG. 45, a signal processing circuit 2B differs from signal processing circuit 2 in that it further includes a terminal 35. Terminal 35 is connected to node 29. Signal processing circuit 2B can output both voltages Vout1 and Vout2 to the outside. For example, pressures in a wide range can be detected based on voltage Vout1. Furthermore, the detection sensitivity can be increased in a desired region including the standard atmosphere (a region close to the upper limit value of the detection range) based on voltage Vout2.

Figure 46:
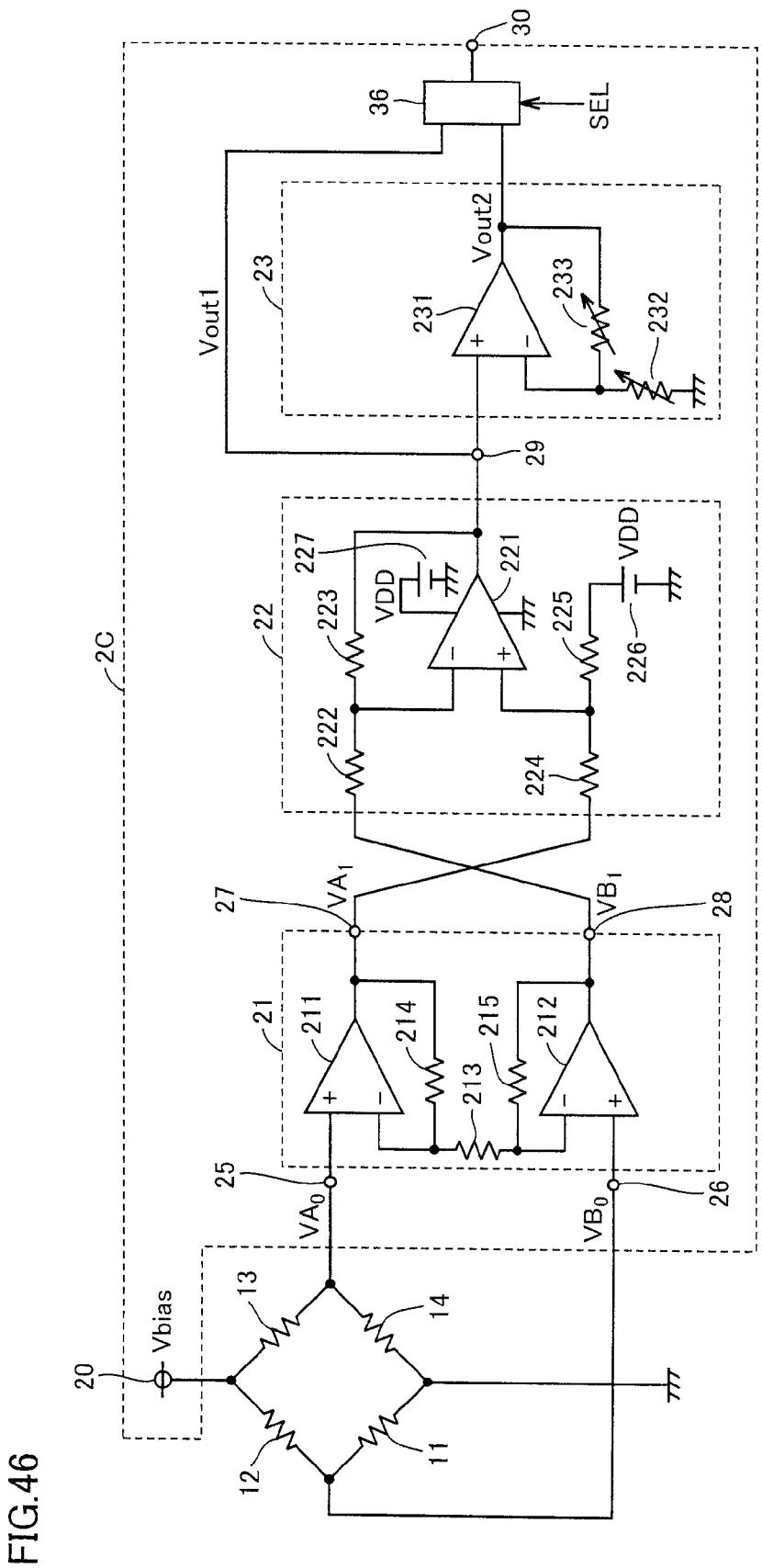
FIG. 46 is a diagram showing a third modification of the signal processing circuit according to the sixth embodiment.
Figure 47:
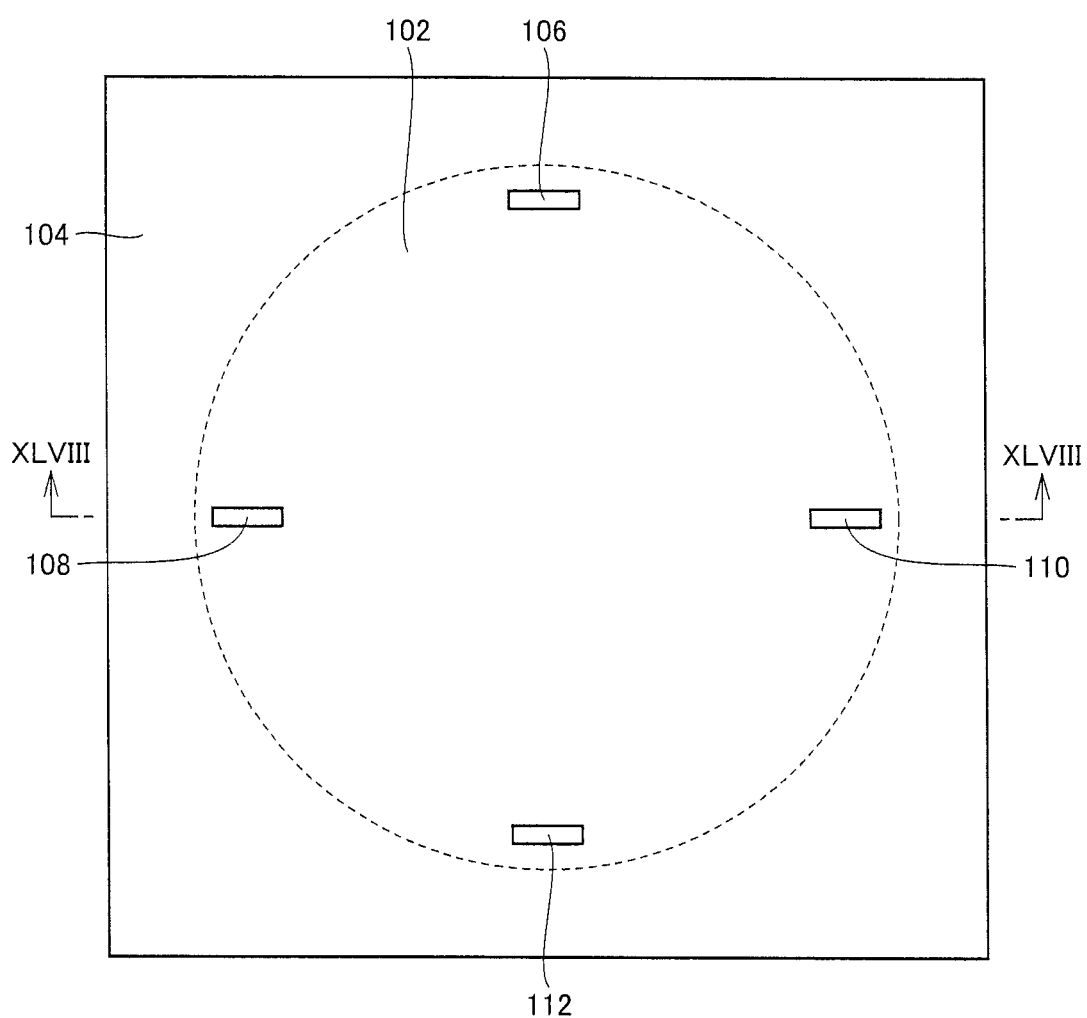
FIG. 47 is a diagram showing an example of a conventional semiconductor pressure sensor.
Figure 48:
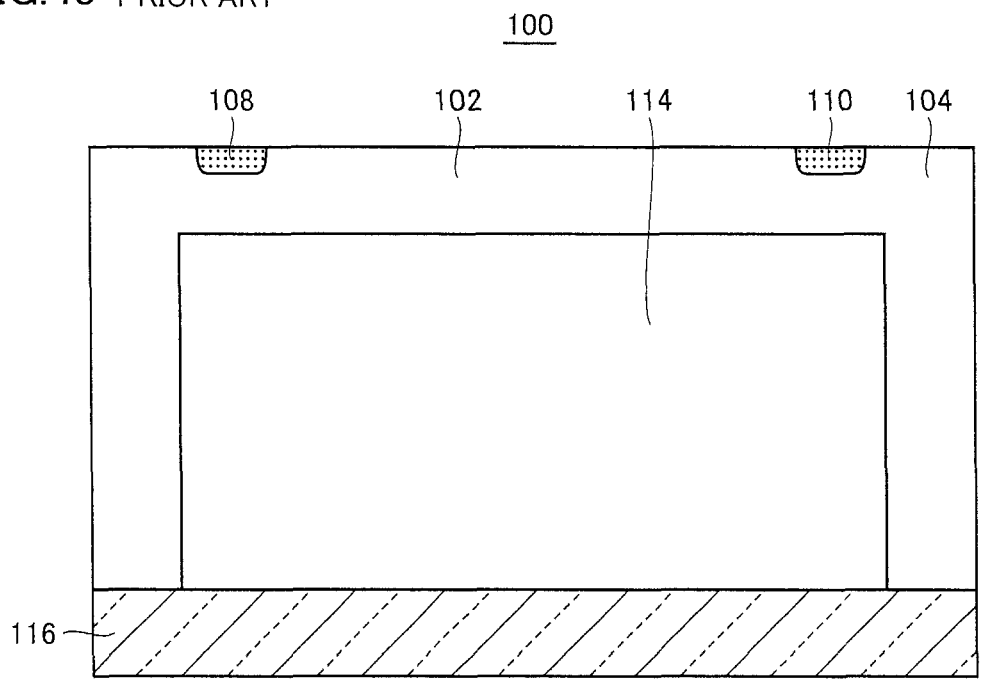
FIG. 48 is a XLVIII-XLVIII cross-sectional view of a semiconductor pressure sensor 100 shown in FIG. 47.
Figure 49:
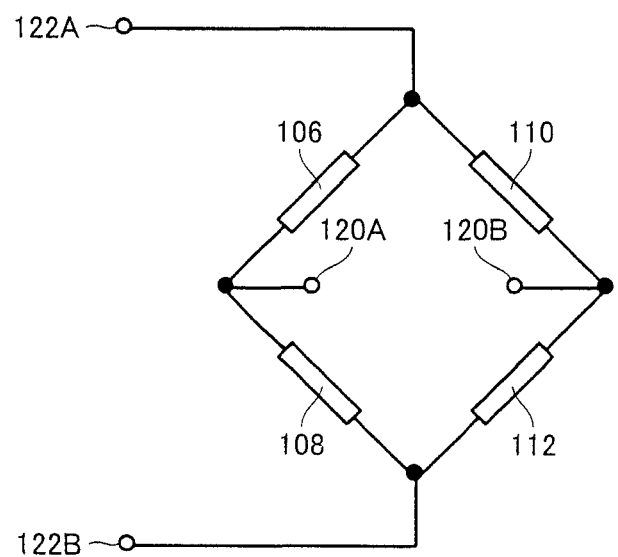
FIG. 49 is a diagram showing a bridge circuit 150 configured with strain gauge resistors 106, 108, 110, and 112 shown in FIG. 47.
Figure 50:
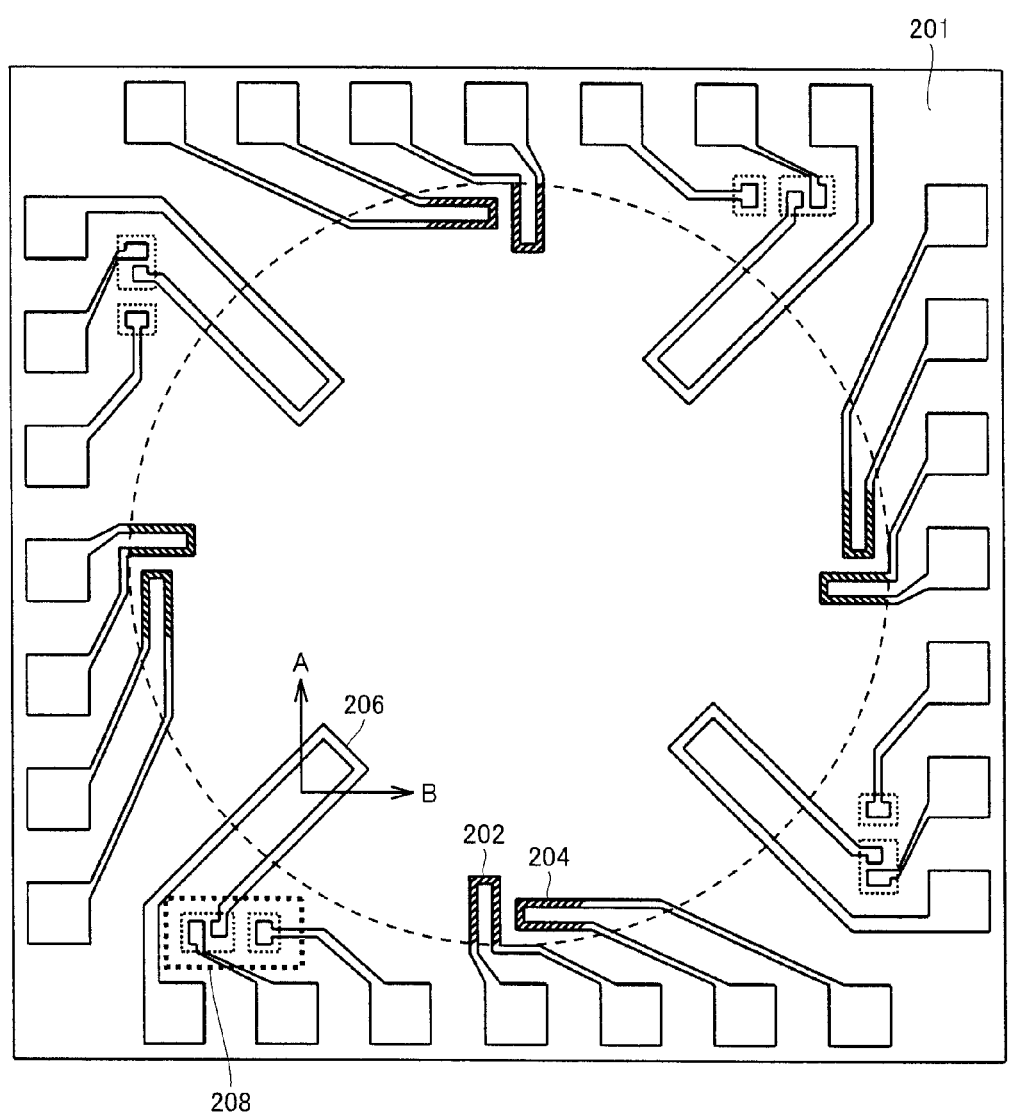
FIG. 50 is a diagram for explaining a semiconductor pressure sensor shown in FIG. 1 of Patent Literature 2.
Figure 51:
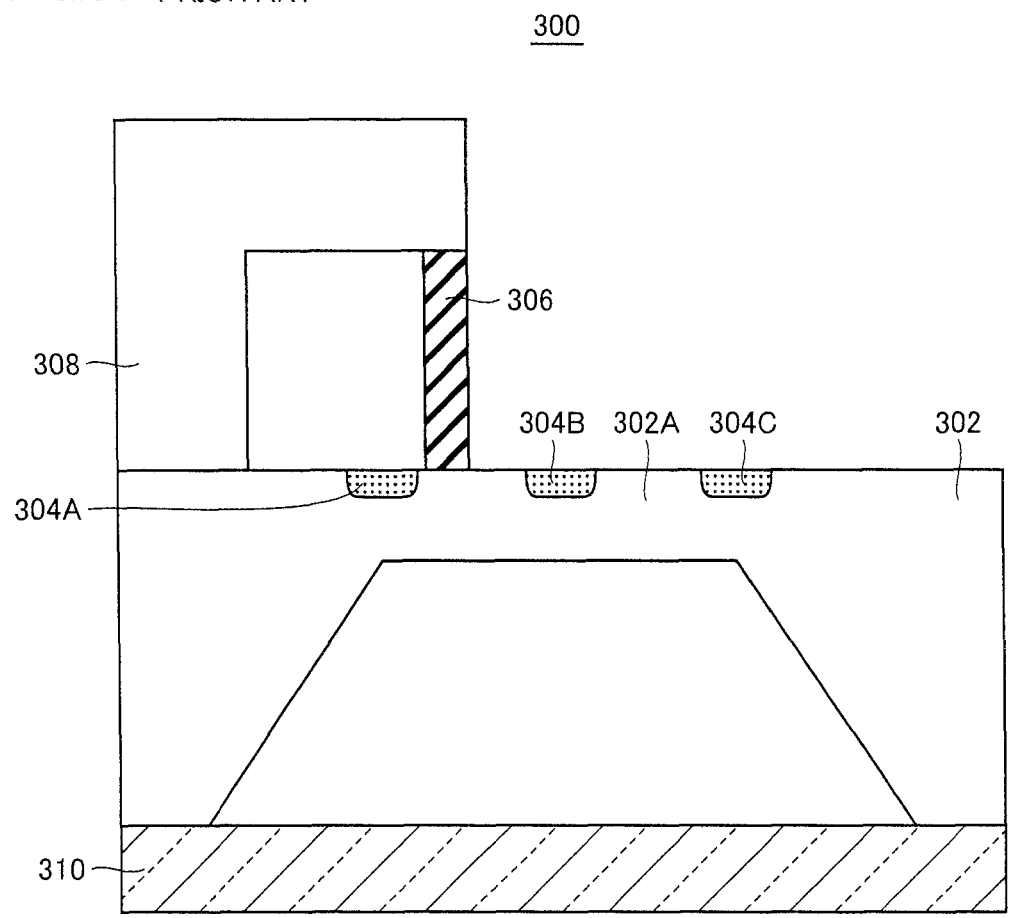
FIG. 51 is a diagram for explaining a semiconductor pressure sensor shown in FIG. 1 of Patent Literature 3.

FIG. 46 is a diagram showing a third modification of the signal processing circuit according to the sixth embodiment. Referring to FIG. 46, a signal processing circuit 2C differs from signal processing circuit 2 in that it includes a selection unit 36 selecting one of voltages Vout1 and Vout2. Selection unit 36 selects one of voltages Vout1 and Vout2 in response to a signal SEL and outputs the selected voltage to terminal 30. Signal SEL is applied to selection unit 36, for example, from the outside of signal processing circuit 2C. As shown in FIG. 46, the signal processing circuit may be configured such that one of Voltages Vout1 and Vout2 is selectively output.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

INDUSTRIAL APPLICABILITY

As described above, the semiconductor pressure sensor of the present invention includes a self-diagnostic function by means of a thin film piezoelectric element. With voltage applied to the thin film piezoelectric element, a structural defect in the semiconductor pressure sensor can be sensed. Furthermore, the thin film piezoelectric element is formed at a distance away from a diffusion resistor functioning as a strain gauge resistor. Accordingly, it is possible reduce deformation of the diffusion resistor due to the difference in thermal expansion coefficient between the thin film piezoelectric element and the semiconductor substrate, thereby reducing an unexpected change of resistance value of the diffusion resistor.

The thin film piezoelectric element extends to a prescribed region on the thick region. Accordingly, it is possible to stabilize the amount of strain applied by the thin film piezoelectric film to the thin region, thereby improving the self-diagnostic accuracy of the semiconductor pressure sensor.

Furthermore, the thin film piezoelectric element is formed on a different level electrically insulated from the metal wiring for bridge-connecting the diffusion resistors. This can increase the flexibility of arrangement and shape of the thin film piezoelectric element and the metal wiring. For example, it is advantageous in that the wiring length of metal wiring and diffusion wiring can be adjusted easily. Therefore, the industrial applicability of the present invention is high.

REFERENCE SIGNS LIST

1, 400, 500, 530, 550, 600, 630, 700, 720, 730, 780, 800 semiconductor pressure sensor, 1A sensor, 2, 2A, 2B, 2C, 251 signal processing circuit, 3 package, 3A container, 3B cover, 4, 6C opening portion, 5, 15A, 15B, 15C wiring, 6 silicon substrate, 6A, 6B main surface, 6A1, 6A2, 6A3, 6A4 region, 7 diaphragm, 7A boundary, 8 support portion, 9 base, 10 pressure sensor apparatus, 11-14, 11A-14A, 11B-14B, 11C-14C, 11D-14D resistor element, 16A, 16B, 16C, 16D electrode, 20, 25-29 node, 21 amplification unit, 22, 23, 22A, 32 operation unit, 30, 35 terminal, 36 selection unit, 50 main unit, 211, 212, 221, 231 differential amplifier, 213-215, 222-225, 232, 233 resistor, 226, 226A offset power supply, 227, 234 driving power supply, 401 semiconductor substrate, 402 thin region, 402A thin portion, 402C center, 404 thick region, 404A thick portion, 406, 408, 410, 412, 818 diffusion resistor, 414, 502, 532, 552, 602, 604, 606, 608, 632, 634, 636, 638, 701, 702, 704, 706, 708, 782 thin film piezoelectric element, 414A, 502A, 532A, 552A, 602A, 604A, 606A, 608A, 636A, 701A, 824 lower electrode layer, 414B, 826 piezoelectric layer, 414C, 828 upper electrode layer, 415 arrow, 416, 842 glass substrate, 418, 840 reference pressure chamber, 420, 432, 504, 712, 722, 834A metal wiring, 422, 714, 724, 820A, 820B diffusion wiring, 424, 426, 428, 434, 438, 516, 518, 610, 612, 614, 616, 618, 620, 622, 624, 640, 642, 716, 716A, 716B, 716C, 716D, 716F, 838 bonding pad, 532X, 532Y, 554, 710A, 710E, 710F extension portion, 784 slit portion, 802 substrate, 804 one main surface Si layer, 806 buried oxide film layer, 808 the other main surface Si layer, 810 pad oxide film, 812 SiN film, 813 active region, 814 resist, 816 field oxide film, 822 first interlayer insulating film, 830 second interlayer insulating film, 832A, 832B, 832C contact hole, 836 passivation film, 1000 electronic equipment, B1-B4 resistance bridge, O central point, X, Y straight line.

The invention claimed is:

1. A semiconductor pressure sensor comprising:
    a semiconductor substrate having a thin region and a thick region provided to surround said thin region;
    at least one strain gauge resistor formed on one main surface of said semiconductor substrate and having a resistance value changing according to strain of a portion of said semiconductor substrate that corresponds to said thin region; and
    at least one thin film piezoelectric element formed in a region at least including part of said thin region on said semiconductor substrate, and having a lower electrode layer, a piezoelectric layer, and an upper electrode layer, wherein said at least one thin film piezoelectric element is formed in a region at a distance away from said at least one strain gauge resistor.

2. The semiconductor pressure sensor according to claim 1, wherein said at least one thin film piezoelectric element has an elongated shape having a longitudinal axis in a direction toward a central portion of said thin region.

3. The semiconductor pressure sensor according to claim 2, wherein said at least one thin film piezoelectric element is provided to extend across a boundary between said thin region and said thick region to reach said thick region.

4. The semiconductor pressure sensor according to claim 3, wherein said at least one thin film piezoelectric element is provided to further extend along an outer circumference of said thin region, in said thick region.

5. The semiconductor pressure sensor according to claim 3, wherein said at least one thin film piezoelectric element includes a plurality of thin film piezoelectric elements formed on said semiconductor substrate.

6. The semiconductor pressure sensor according to claim 5, wherein said plurality of thin film piezoelectric elements are coupled to each other on said thick region.

7. The semiconductor pressure sensor according to claim 5, wherein said plurality of thin film piezoelectric elements are extended to a central portion of said thin region and are coupled to each other at said central portion of said thin region.

8. The semiconductor pressure sensor according to claim 3, wherein
    said semiconductor pressure sensor further comprises a plurality of bonding pads provided on said thick region,
    said at least one thin film piezoelectric element is provided to extend to the proximity of at least one bonding pad of said plurality of bonding pads.

9. The semiconductor pressure sensor according to claim 8, wherein said plurality of bonding pads are provided side by side on one side of said semiconductor substrate.

10. The semiconductor pressure sensor according to claim 9, wherein said upper electrode layer and said lower electrode layer are connected to a first bonding pad located at a first end and a second bonding pad located at a second end, respectively, of said plurality of bonding pads provided side by side on said one side of said semiconductor substrate.

11. The semiconductor pressure sensor according to claim 1, wherein
    said semiconductor pressure sensor comprises four strain gauge resistors as said at least one strain gauge resistor,
    said thin region is approximately quadrilateral, and
    said four strain gauge resistors are each formed in proximity to a midpoint of each side of said thin region.

12. The semiconductor pressure sensor according to claim 11, wherein said at least one thin film piezoelectric element is formed on a diagonal line of said thin region.

13. The semiconductor pressure sensor according to claim 1, wherein said thin region is approximately circular.

14. The semiconductor pressure sensor according to claim 1, wherein said at least one strain gauge resistor is a diffusion resistor formed by diffusing an impurity in one main surface of said semiconductor substrate.

15. The semiconductor pressure sensor according to claim 1, wherein a main component of said piezoelectric layer is PZT.

16. The semiconductor pressure sensor according to claim 1, wherein
    said at least one strain gauge resistor is connected to wiring on said thin region, and
    said wiring includes diffusion wiring.

17. The semiconductor pressure sensor according to claim 1, wherein a thickness of said piezoelectric layer is 0.01 µm or more and 5 µm or less.

18. The semiconductor pressure sensor according to claim 1, wherein said semiconductor substrate is an SOI (Silicon on Insulator) substrate.

19. A method of manufacturing a semiconductor pressure sensor, comprising the steps of:
    preparing a semiconductor substrate having one main surface Si layer having a first conductivity type and the other main surface Si layer;
    forming a strain gauge resistor having a second conductivity type different from said first conductivity type, on said one main surface Si layer;
    forming diffusion wiring having said second conductivity type and having a higher impurity concentration than said strain gauge resistor, in a region adjacent to said strain gauge resistor in said one main surface Si layer;
    forming a first interlayer insulating film on said one main surface Si layer;
    forming a lower electrode layer on said first interlayer insulating film;
    forming a piezoelectric layer on said lower electrode layer;
    forming an upper electrode layer on said piezoelectric layer;
    forming a second interlayer insulating film on said first interlayer insulating film, said lower electrode layer, said piezoelectric layer, and said upper electrode layer;
    forming contact holes reaching said diffusion wiring, said lower electrode layer, and said upper electrode layer, in said second interlayer insulating film;
    forming metal wiring on said second interlayer insulating film and in said contact holes; and
    forming a reference pressure chamber in said other main surface Si layer.

20. The method of manufacturing a semiconductor pressure sensor according to claim 19, wherein the contact hole reaching said lower electrode layer and the contact hole reaching said upper electrode layer are formed at the same time.

* * * * *